US 6,630,950 B1

(12) United States Patent
Ohkawara et al.

(10) Patent No.: US 6,630,950 B1
(45) Date of Patent: Oct. 7, 2003

(54) APPARATUS FOR IMPROVING IMAGE VIBRATION SUPPRESSION

(75) Inventors: Hiroto Ohkawara, Toride (JP); Toshimichi Kudo, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/270,870

(22) Filed: Mar. 17, 1999

(30) Foreign Application Priority Data

| Mar. 19, 1998 | (JP) | .......................... 10-069596 |
| Mar. 31, 1998 | (JP) | .......................... 10-086356 |
| Apr. 13, 1998 | (JP) | .......................... 10-115879 |
| Jul. 24, 1998 | (JP) | .......................... 10-209355 |

(51) Int. Cl.$^7$ ............................................. H04N 5/228
(52) U.S. Cl. ............................ 348/208.12; 348/208.2; 348/208.5; 348/208.11
(58) Field of Search ..................... 348/207.99, 208.99, 348/208.1–208.4, 208.5–208.12; 396/52–55; H04N 5/228

(56) References Cited

U.S. PATENT DOCUMENTS

| 5,502,484 A | * | 3/1996 | Okada | ..................... 348/208.6 |
| 5,678,071 A | * | 10/1997 | Ohtake | ..................... 396/55 |
| 5,745,802 A | * | 4/1998 | Imura | ..................... 396/55 |
| 5,802,403 A | * | 9/1998 | Ohishi | ..................... 396/53 |
| 5,805,212 A | * | 9/1998 | Fujiwara | ..................... 348/208.8 |
| 5,845,156 A | * | 12/1998 | Onuki | ..................... 348/208.11 |
| 5,946,032 A | * | 8/1999 | Ishizuka | ..................... 348/208.8 |
| 5,959,666 A | * | 9/1999 | Naganuma | ..................... 348/208.3 |
| 6,046,768 A | * | 4/2000 | Kaneda | ..................... 348/208.2 |
| 6,130,709 A | * | 10/2000 | Sekine | ..................... 348/208.8 |
| 6,172,707 B1 | * | 1/2001 | Ouchi | ..................... 348/208.6 |
| 2002/0027599 A1 | * | 3/2002 | Yamazaki | ..................... 348/208.99 |

FOREIGN PATENT DOCUMENTS

| JP | 5-142614 | 6/1993 | ............ G03B/5/00 |
| JP | 8-313950 | 11/1996 | ............ G03B/5/00 |
| JP | 9-051466 | 2/1997 | ............ H04N/5/232 |

* cited by examiner

*Primary Examiner*—Ngoc-Yen Vu
(74) *Attorney, Agent, or Firm*—Morgan & Finnegan, LLP

(57) ABSTRACT

An image sensing apparatus having a function of correcting vibration of an image limits operation of a vibration correction unit in correspondence with the ratio of the correction amount as an output from the vibration correction unit to the maximum correction range of that unit.

16 Claims, 42 Drawing Sheets

AT MOST WIDE-SCOPIC POSITION

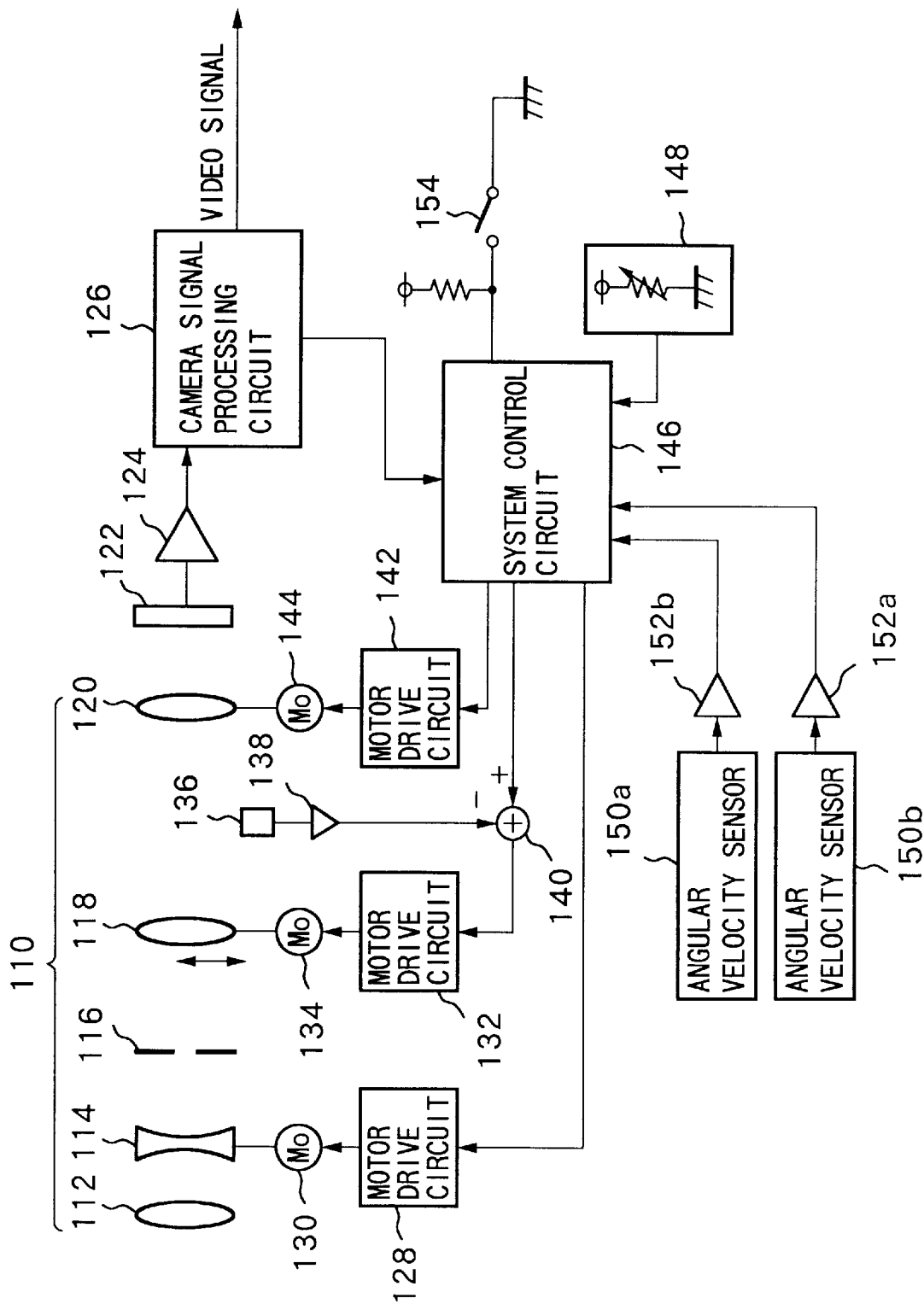

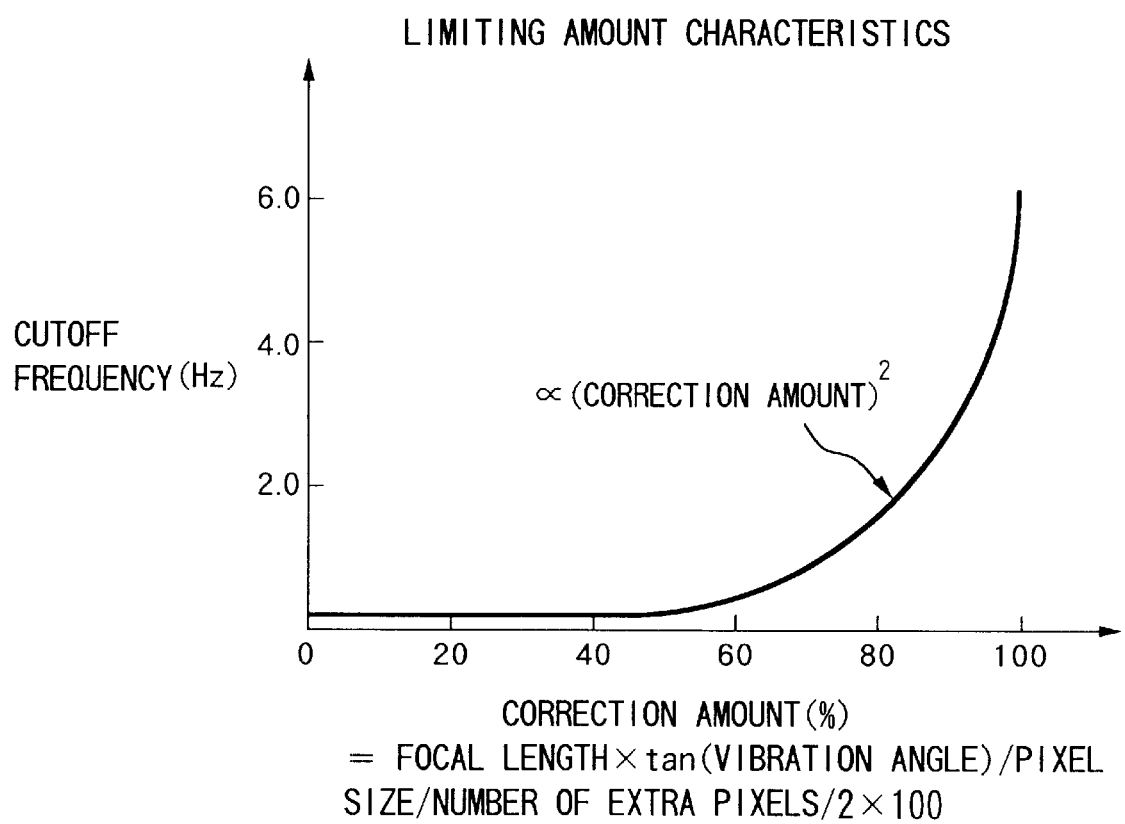

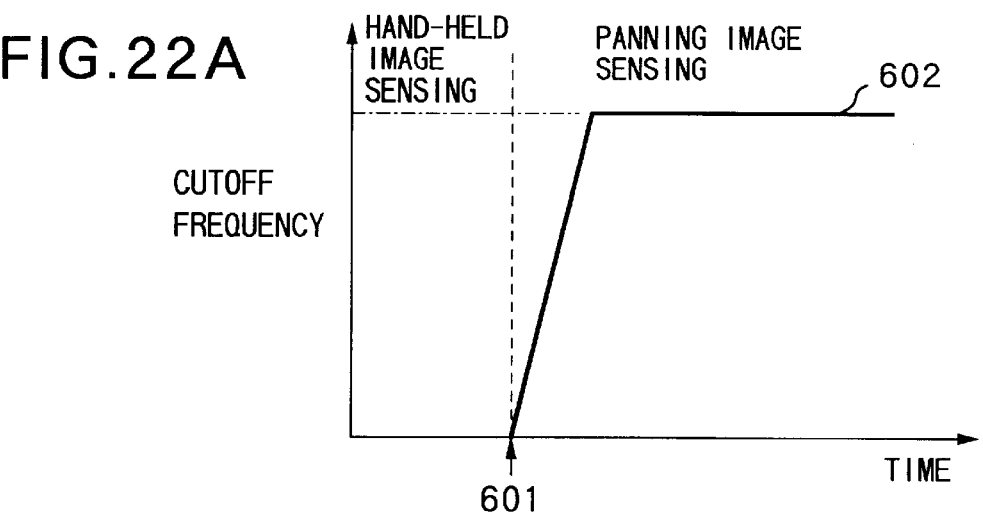
FIG.22A CHANGE IN LIMITING AMOUNT AT THE BEGINNING OF PANNING
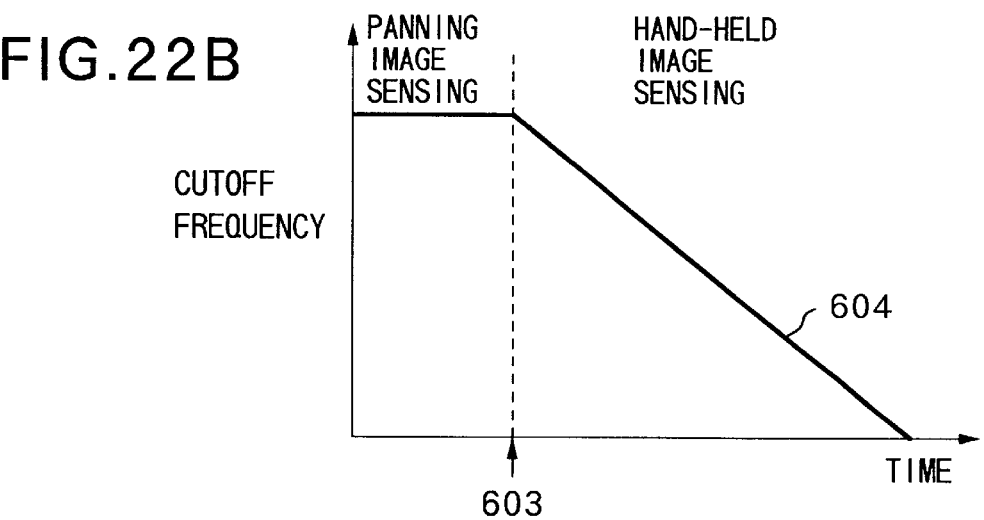
FIG.22B CHANGE IN LIMITING AMOUNT AT THE END OF PANNING
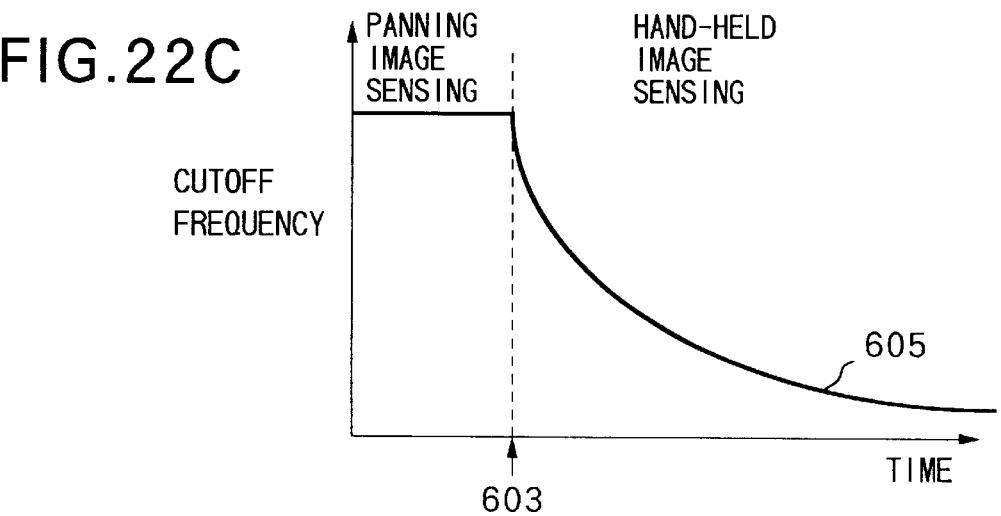
FIG.22C CHANGE IN LIMITING AMOUNT AT THE END OF PANNING FIG. 29A CHANGE IN ANGULAR VELOCITY SIGNAL UPON PANNING ALONG WITH ELAPSE OF TIME FIG. 29B CHANGE IN ANGULAR VELOCITY DIFFERENTIAL SIGNAL UPON PANNING ALONG WITH ELAPSE OF TIME

| LOOK-UP ADDRESS | VARIABLE a | VARIABLE b |
|---|---|---|
| 0 | a(0) | b(0) |
| ⋮ | ⋮ | ⋮ |
| An | a(An) | b(An) |
| ⋮ | ⋮ | ⋮ |
| 256 | a(256) | b(256) |

CHANGE IN LIMITING AMOUNT AT THE BEGINNING OF PANNING

CHANGE IN LIMITING AMOUNT AT THE END OF PANNING

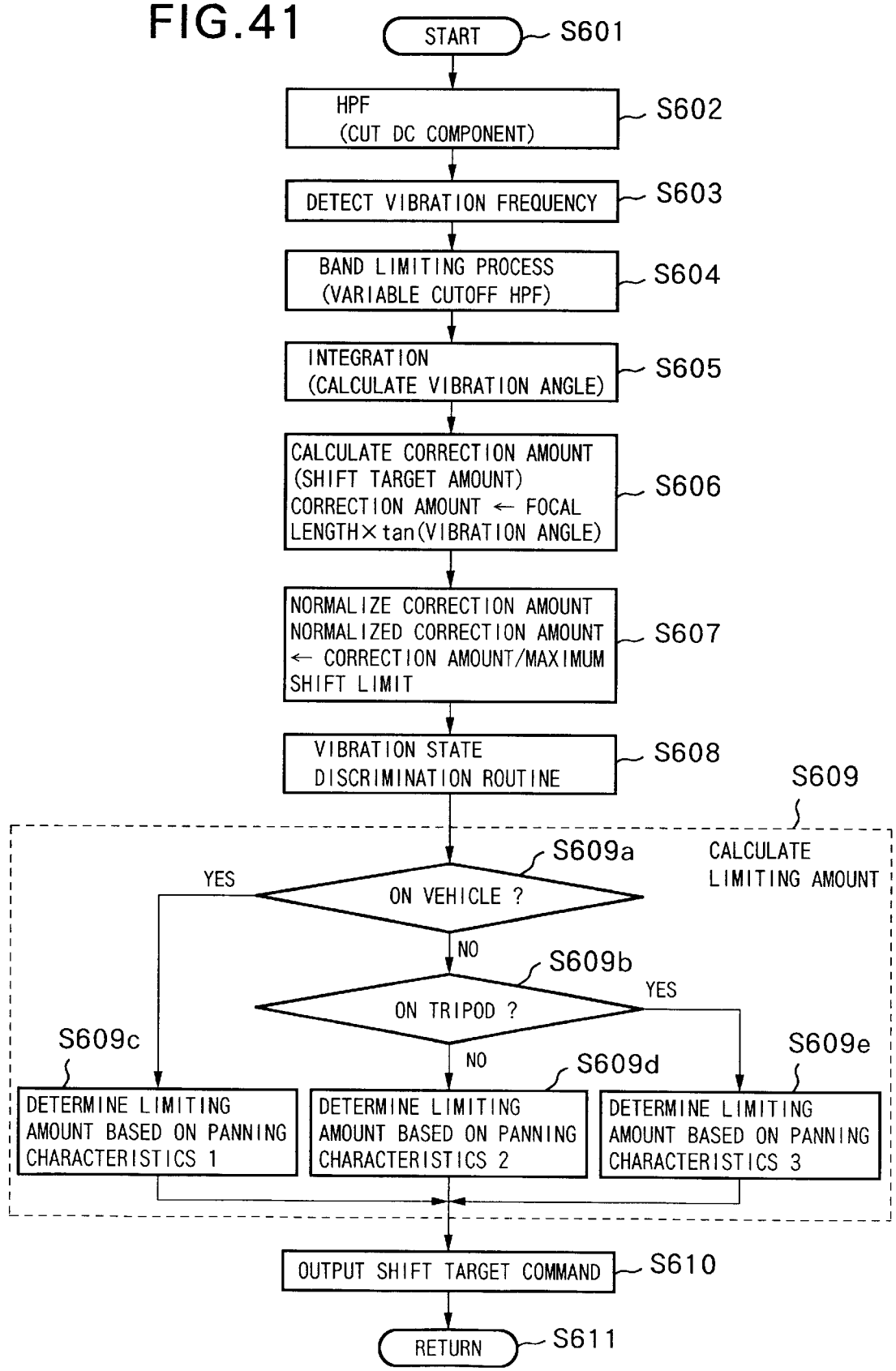

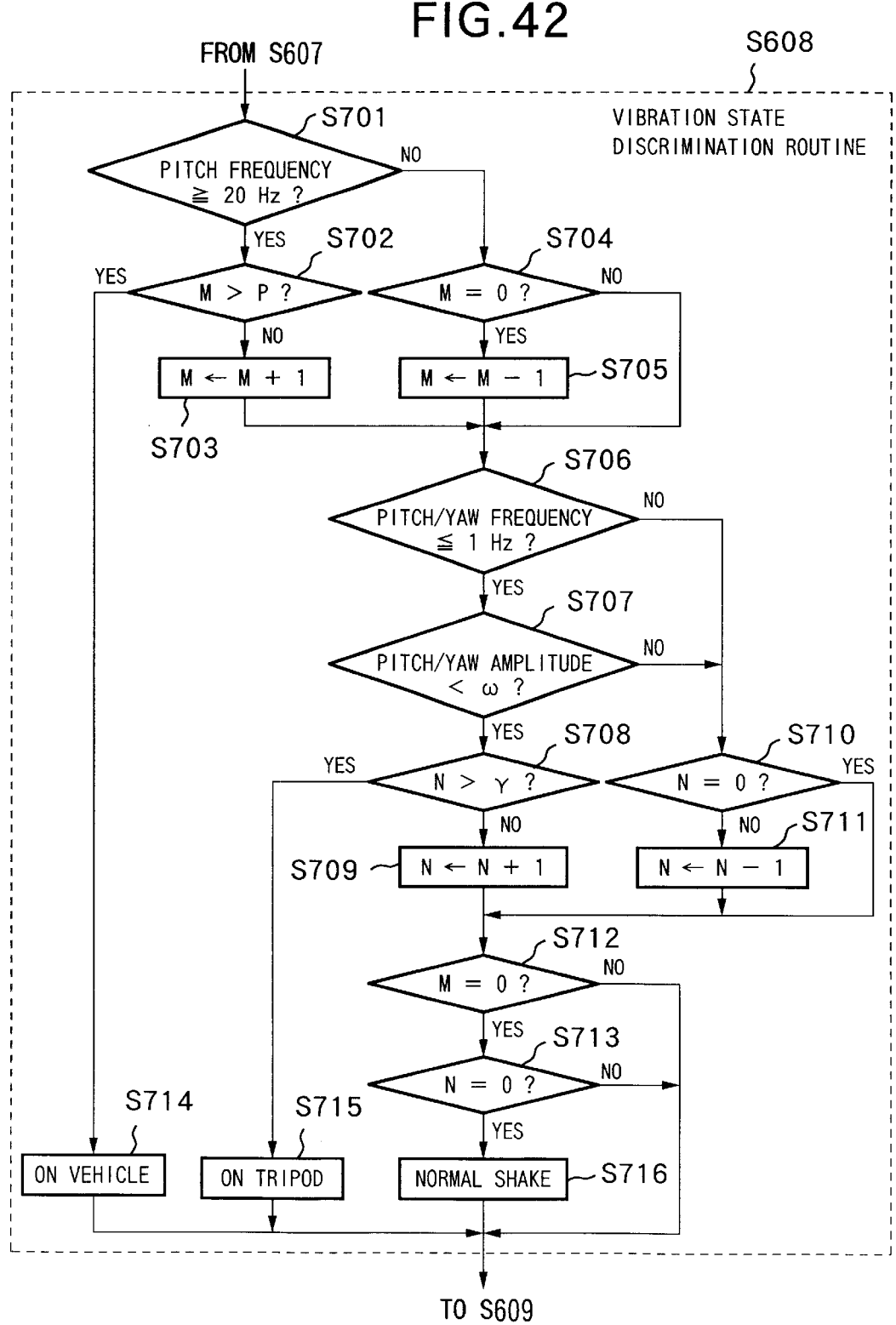

PANNING CHARACTERISTICS I (ON-VEHICLE MODE)

= FOCAL LENGTH × tan(VIBRATION ANGLE)/MAXIMUM SHIFT LIMIT AMOUNT/2×100

PANNING CHARACTERISTICS II (HAND-HELD IMAGE SENSING MODE)

= FOCAL LENGTH × tan(VIBRATION ANGLE)/MAXIMUM SHIFT LIMIT AMOUNT/2×100

PANNING CHARACTERISTICS III (TRIPOD MODE)

= FOCAL LENGTH × tan(VIBRATION ANGLE)/MAXIMUM SHIFT LIMIT AMOUNT/2×100

APPARATUS FOR IMPROVING IMAGE VIBRATION SUPPRESSION

BACKGROUND OF THE INVENTION

The present invention relates to an apparatus for preventing or suppressing vibrations of an image due to hand shakes and, more particularly, to an image sensing apparatus such as a video camera or the like, which comprises an anti-vibration function.

Recent video cameras normally have an anti-shake function. The anti-shake function includes optical correction and electronic correction.

In optical shake correction, a prism or lens member that can displace the optical axis of image sensing light is inserted into the optical path of the image sensing light that becomes incident on an image sensing element, and the optical axis is deflected in correspondence with shake, thus canceling a motion of an image arising from shake. As a shake detection means, it is a common practice to directly detect vibration components acting on a camera using an angular velocity sensor such as a vibration gyro and to integrate the outputs from the sensor so as to detect angular displacement of the camera.

On the other hand, the electronic shake correction function is often used together with motion vector detection that calculates the moving amount of a camera on the basis of a change in video signal between adjacent fields. When a partial video signal is extracted and read out from an image stored in a field memory for motion vector detection, the video signal is extracted to remove the detected motion of the image. As another electronic shake correction, an angular velocity sensor is used in vibration detection, and a partial image is extracted from an image output from the image sensing element to cancel a motion of that image and to output the extracted image.

Electronic shake correction is done at field periods since it is implemented by an electronic process for a video signal. Hence, the electronic shake correction cannot remove shake during exposure, but can attain a size and weight reductions compared to optical correction. Also, when a high-density, large image sensing element is used, the resolution of an image extracted from the sensed image signal can be increased, and deterioration of image quality which is inferior to the optical correction can be improved to some extent.

With a video camera, the user often senses an image while making a camera work such as panning, tilting, or the like, i.e., while he or she is intentionally moving the camera. Upon image sensing with such camera work, if the shake correction function is enabled, the limit of the correction range is reached soon to disturb the sensed image, and a response in a direction desired by the photographer is delayed. As a means for preventing such problems, an arrangement that suppresses correction capability by limiting shake correction is proposed (e.g., Japanese Patent Laid-Open No. 5-142614). Also, an invention that realizes natural panning even when the focal length enters an ultra telescopic range is proposed (Japanese Patent Laid-Open No. 9-51466).

In conventional panning control, when the level of a shake detection signal (or its processed signal) has exceeded a predetermined threshold value, the vibration correction capability is suppressed. Hence, in continuous video sensing, i.e., motion image sensing, the panning control makes the motion of an image on the frame during a transition to a panning mode unnatural.

In order to avoid such problems, an invention that changes the vibration correction characteristics to smoothly change the vibration correction capability along with an elapse of time is also proposed (Japanese Patent Laid-Open No. 8-313950).

However, where the proposed technique is applied to an optical or electronic anti-vibration device-in which a vibration correction means is placed behind a zoom lens, it requires setting parameters for panning operation for each change in focal length, hence such device cannot be realized in practice.

Further, the proposed technique has not given a full consideration to various image sensing conditions in how applying restraints to the anti-vibration correction.

SUMMARY OF THE INVENTION

It is an object of the present invention to provide an image vibration prevention apparatus or image sensing apparatus that, in response to a panning operation, can easily and appropriately limit an correcting operation of the apparatus.

The above object is achieved by providing an image vibration prevention apparatus or image sensing apparatus comprising:

a vibration correction device for correcting a vibration of an image; and a limiting device for calculating a ratio of an amount of vibration correction to be effected by said vibration correction device in accordance with an image shake condition, to a maximum value of vibration correction by said vibration correction device, and limiting an operation of said vibration correction device in correspondence with a calculation result.

The above object is also achieved by an image vibration prevention apparatus or image sensing apparatus comprising:

a vibration correction device for correcting a vibration of an image; and a limiting device for, in response to a panning operation, limiting a correction operation of said vibration correction device, by applying different limitations in pitch and yaw directions to said vibration correction device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is a schematic diagram showing an arrangement according to the second embodiment of the present invention;

FIG. 21 is a graph showing the limiting amount characteristics of the fourth embodiment;

FIGS. 22A to 22C are graphs showing the limiting strength change characteristics of the fourth embodiment;

FIG. 41 is a flow chart for explaining vibration correction;

FIG. 42 is a flow chart for explaining vibration state discrimination;

DETAILED DESCRIPTION OF THE INVENTION

The embodiments (first to eighth embodiments) of the present invention will be described in detail hereinafter with reference to the accompanying drawings.

The first and third embodiments are premised on the electronic anti-vibration scheme, i.e., a scheme that implements anti-vibration by moving the read position of image data read out from an image sensing element and stored in a memory in accordance with the amount of vibration, and the second embodiment is premised on the optical anti-vibration scheme.

First Embodiment . . . FIGS. 1 to 7

Figure 1:
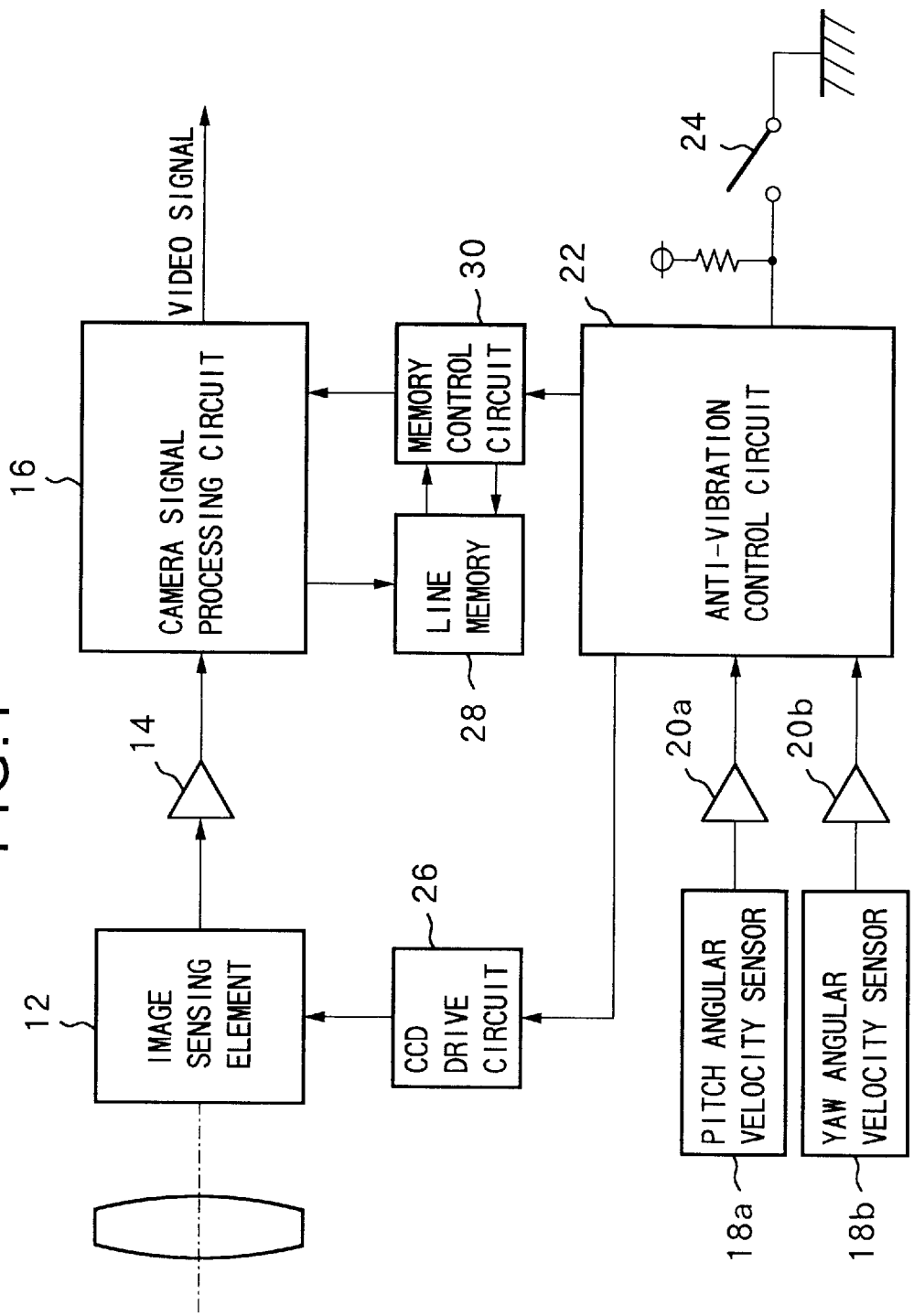
FIG. 1 is a schematic block diagram showing an arrangement according to the first embodiment of the present invention.
Figure 2:
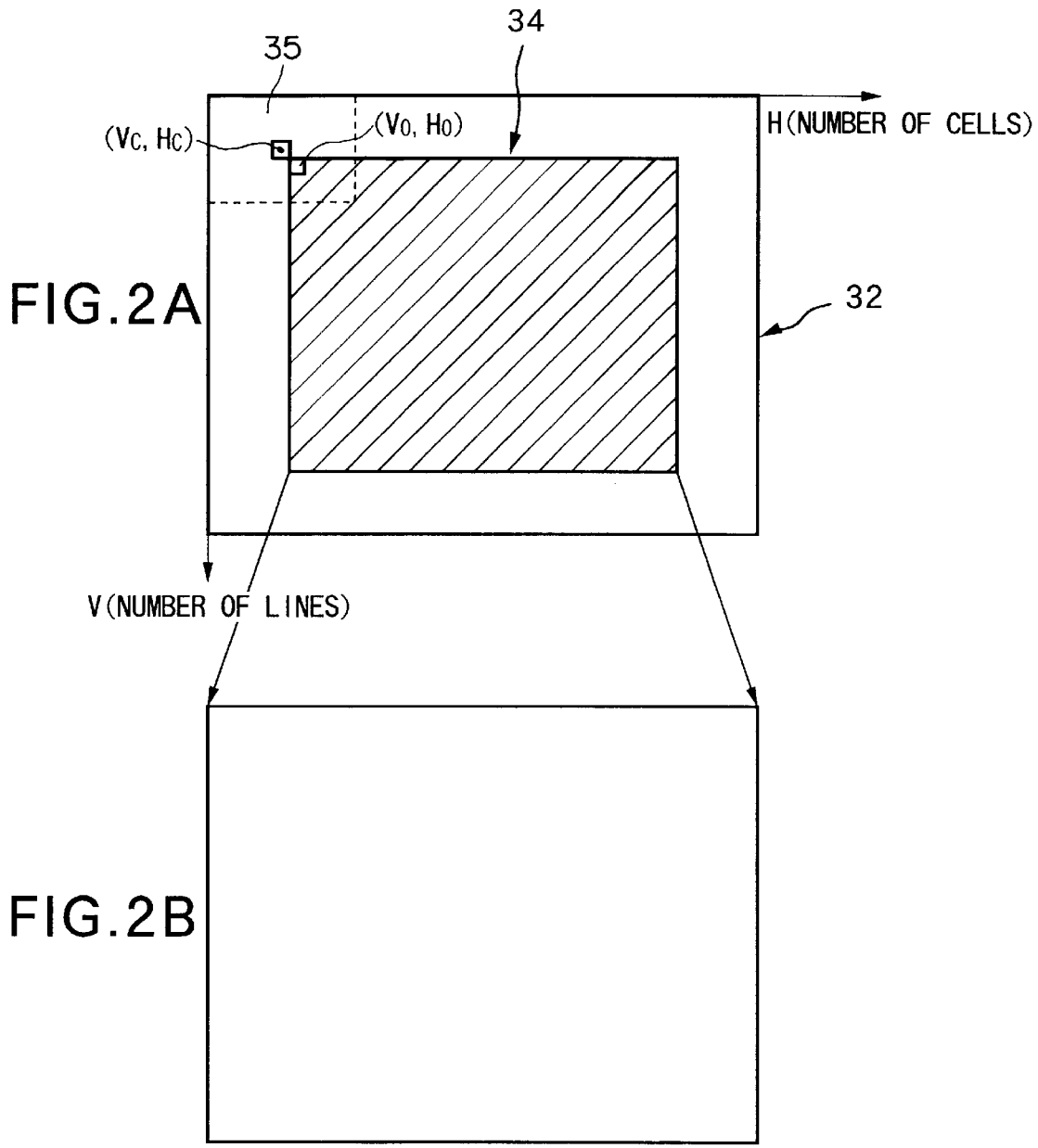
FIGS. 2A and 2B are views showing the relationship between the entire image sensing area and extraction range.

FIG. 1 is a schematic block diagram showing the arrangement according to the first embodiment of the present invention, in which a video camera has an electronic anti-vibration function. Referring to FIG. 1, reference numeral 10 denotes a photographing lens; and 12, a CCD image sensing element that converts an optical image formed by the photographing lens 10 into an electrical signal. The output signal from the image sensing element 12 is amplified by an amplifier 14, and is input to a camera signal processing circuit 16. The camera signal processing circuit 16 performs known camera signal processes such as gain adjustment, color balance adjustment, Y correction, and the like for the image signal received from the amplifier 14, and forms and outputs a standard video signal.

Reference numeral 18a denotes an angular velocity sensor in a pitch direction; 18b, an angular velocity sensor in a yaw direction; 20a and 20b, amplifiers for respectively amplifying the outputs from the angular velocity sensors 18a and 18b; and 22, an anti-vibration control circuit for detecting vibration of the camera main body and its angle from the outputs (i.e., angular velocities in the pitch and yaw directions) from the amplifiers 20a and 20b, and canceling the vibration. More specifically, the anti-vibration control circuit 22 comprises a microcomputer, which incorporates an A/D converter (not shown in FIG. 1) that converts the outputs from the amplifiers 20a and 20b into digital signals. Reference numeral 24 denotes an anti-vibration ON/OFF switch that the user uses to instruct an anti-vibration function to the anti-vibration control circuit 22; 26, a CCD drive circuit for driving the image sensing element 12 in accordance with a command from the anti-vibration control circuit 22 to read out a desired line portion; 28, a line memory for selecting an output image portion in a line direction; and 30, a memory control circuit for controlling the line memory 28 in accordance with a command from the anti-vibration control circuit 22.

The anti-vibration control circuit 22 calculates angular displacements by integrating the detected angular velocities (the outputs from the amplifiers 20a and 20b), calculates the pixel movement amount (nearly corresponding to $f \times \tan\theta$) on the image sensing element 12 resulting from vibration on the basis of the obtained angular displacements, i.e., vibration angles $\theta$ of the camera and a focal length f of the photographing lens 10, changes the memory read start position to cancel that pixel movement amount, and reads out an image signal from the image sensing surface of the image sensing element or the corresponding area in the memory.

An image region extracted by electronic anti-vibration control will be briefly explained below.

FIG. 2A shows the relationship between an image obtained from the entire image sensing area of the image sensing element 12, and an image to be output extracted from that area. Reference numeral 32 denotes an entire image sensing area; and 34, an extraction range of the entire image sensing area 32 from which an image to be output is extracted. The coordinate position of the extraction range 34 is defined by its upper left position coordinates ($V_0$, $H_0$). An image extracted from the extraction range 34 is edited and output to have an output image size or pixel format, as shown in FIG. 2B.

By moving the position of the extraction range 34 on the entire image sensing area 32 to cancel vibration, the vibration can be corrected. The range within which the position of the extraction range 34 can be changed, i.e., vibration correction capability, is determined by differences of the numbers of horizontal/vertical pixels (to be referred to as the "numbers of extra pixels" hereinafter) between the entire image sensing area 32 and extraction range 34. The range can be represented by a dotted area 35 within which the upper left corner of the extraction range 34, for example, can move. The reference position (initial position) of the extraction range 34, denoted as ($V_c$, $H_c$) is determined in advance at a position when the vibration correction is OFF, specifically, at the position of the upper left corner of the range 34 when it is positioned so that the center position of the range 34 matches that of the entire range 32, more specifically at the position having vertical and horizontal offsets with the half numbers of the extra pixels from the upper left corner of the entire range 32. In the example of FIG. 2A, the reference position ($V_c$, $H_c$) is occasionally close to the corner position ($V_0$, $H_0$) of the range 34. $V_c$ will be referred to as a vertical origin position hereinafter, and $H_c$ will be referred to as a horizontal origin position hereinafter.

As methods of extracting an image contained in the extraction range 34, the first method of storing the entire image of the entire image sensing area 32 in the field memory and interpolating only an image of the extraction range 34 in the horizontal and vertical directions to obtain a display size while reading out that image, and the second method of using a high-density, high-resolution type large-scale image sensing element, the extraction range 34 of which satisfies the number of scanning lines and the number of horizontal pixels required for a standard video signal, are available.

In the first embodiment, the image sensing element 12 uses a versatile PAL CCD image sensing element, and the output video signal complies with NTSC. The PAL CCD image sensing element has a high vertical pixel density. Using this fact, in the first embodiment, the vertical extraction position can be changed by changing the number of lines which undergo fast discharging control within the range of extra lines exceeding the number of lines of NTSC, in correspondence with the vibration angle value. In the horizontal scanning direction, the relationship between the write start pixel position and the read start pixel position with respect to the line memory 28 is changed while executing enlargement in correspondence with the selected aspect ratio using the line memory 28 and memory control circuit 30, thus changing the horizontal frame position.

In the first embodiment, the anti-vibration control circuit 22 makes the CCD drive circuit 26 execute fast discharging control in the vertical direction, thereby reading out only a desired vertical scanning line portion from the image sensing element 12. On the other hand, in the horizontal scanning direction, a line image processed by the camera signal processing circuit 16 is temporarily written in the line memory 28, and enlargement (which can be implemented by decimating and reading out pixel data by changing the memory read rate) is simultaneously made in correspondence with the selected aspect ratio while changing the read position of the line image in the line memory 28 in accordance with the pixel movement amount for vibration correction by the memory control circuit 30. With this control, read control for anti-vibration control can be implemented in the vertical and horizontal directions even upon using a PAL CCD.

A signal read out from the line memory 28 undergoes a color process or the like in the camera signal processing circuit 16, and is converted into a standard video signal to be output.

The anti-vibration control by the anti-vibration control circuit 22 will be described in detail below with reference to FIGS. 3 and 4.

One objective of the first embodiment is to smoothly switch anti-vibration control in response to panning. In the first embodiment, the limiting amount is changed according to characteristics which change in proportion to the n-th power (n is an integer equal to or larger than 1) of the vibration correction amount, thereby automatically adjusting the effect of vibration correction.

Figure 3:
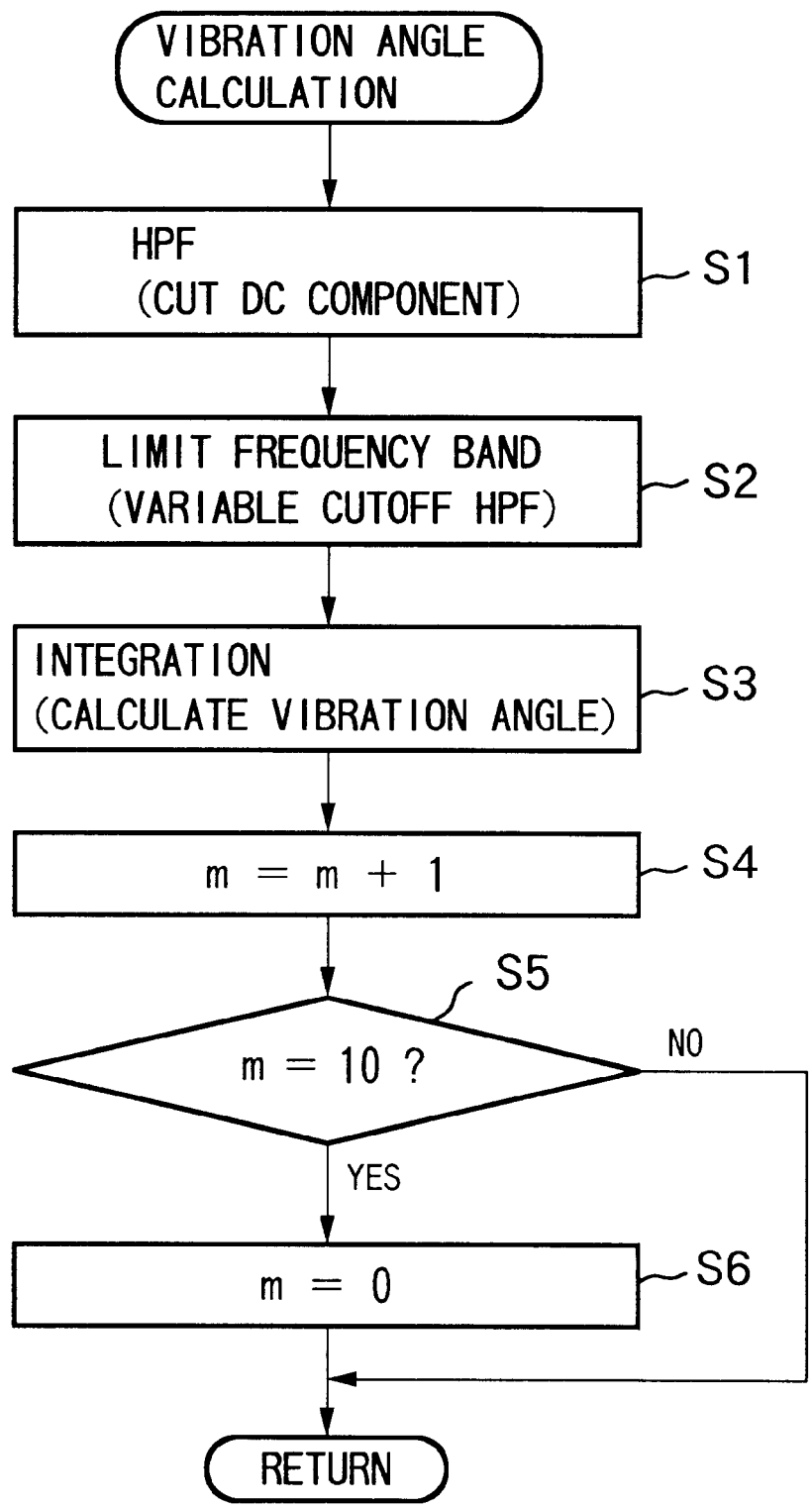
FIG. 3 is a flow chart showing the process for calculating angular displacement from angular velocity signals detected by angular velocity sensors 18a and 18b.

FIG. 3 is a flow chart of a process for calculating angular displacements by integrating angular velocity signals detected by the angular velocity sensors 18a and 18b. This process is an interrupt process at a given period. In the first embodiment, this processing is executed at a frequency 10 times the field frequency, i.e., at 600 Hz in case of NTSC. This frequency corresponds to the sampling frequency of angular velocity signals, i.e., the calculation frequency of angular displacements. An interrupt signal for this process can be generated by a known method. For example, clock signals are counted up or down, and upon counting clock signals corresponding to 1/600 sec, an interrupt signal is generated. The anti-vibration control circuit 22 samples the angular velocity signals by converting them into digital signals using its internal A/D converter. In the first embodiment, assume that the A/D converter operates in a scan mode, and always converts an input signal into a digital signal, for the sake of easy understanding.

The DC component is removed from the angular velocity signal sampled by the A/D converter (step S1), and the band of the angular velocity signal is limited by cutting its AC component (step S2). The band limitation is the same high-pass filter process as that for removing the DC component, except that its cutoff frequency is fixed in step S1 but is variable in step S2. By changing the cutoff frequency from the low- to high-frequency side, a desired band component is extracted. In the first embodiment, the cutoff frequency is increased to lower the suppression capability of anti-vibration during camera work such as panning or the like, and is decreased to obtain a sufficient vibration correction effect in normal image sensing. In order to also prevent an unnatural image from being formed when a correction limit is reached in correcting vibration larger than the upper limit of the vibration correction range, the cutoff frequency in step S2 is preferably adjusted. How to control the cutoff frequency will be explained later with reference to FIG. 4.

Angular displacement is calculated by integrating the band-limited angular velocity signal (step S3). The calculated angular displacement corresponds to the vibration angle acting on the camera main body. A variable m indicating the number of times of vibration angle calculations is incremented (step S4). If m=10 (step S5), 0 is substituted in m (step S6) to end the interrupt process; if m≠10 (step S5), the process ends directly. More specifically, if 10 interrupts have been generated per field period, m is reset to 0.

Steps S1 to S3 are executed for both the pitch and yaw directions.

Figure 4:
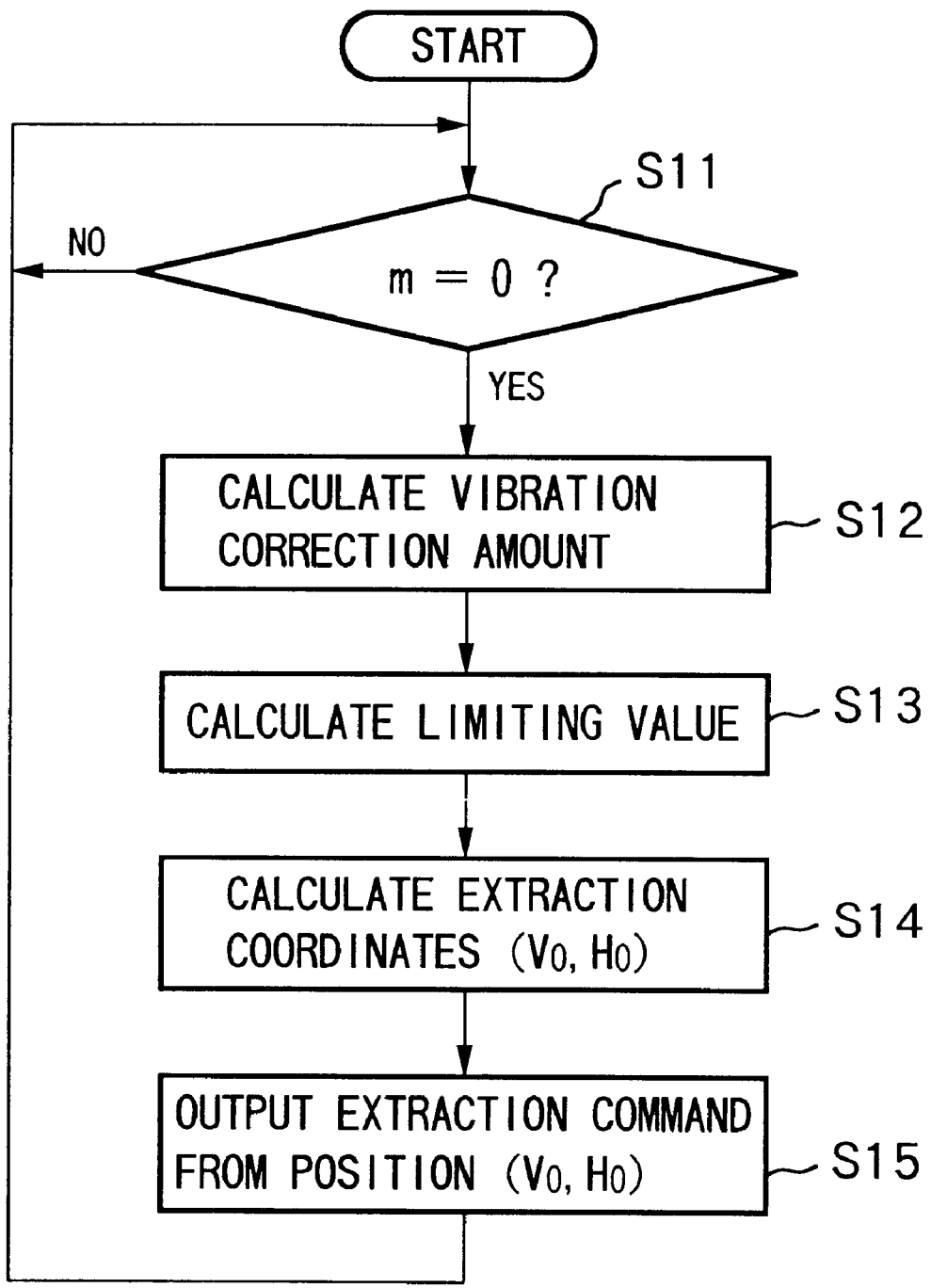
FIG. 4 is a flow chart showing the process for determining the extraction range from the angular displacement calculated by the process shown in FIG. 3.

A process shown in FIG. 4 is executed once per field. More specifically, the process shown in FIG. 4 is executed when m=0, i.e., immediately after the end of the process shown in FIG. 3 for one field.

The control waits until m equals 0 (step S11). When the interrupt process shown in FIG. 3 has been executed 10 times for the current field, m is reset to 0 (step S6). If m=0 (step S11), the vibration correction amount is calculated (step S12). The vibration correction amount is calculated by f×tanθ using the vibration angle θ and the focal length f of the optical system. A limiting threshold that limits vibration correction capability is calculated from the calculated vibration correction amount (step S13). The limiting threshold to be calculated is the cutoff frequency used in step S2 in FIG. 3, in practice.

The target position coordinates ($V_0$, $H_0$) of the extraction range are calculated (step S14). The target position coordinates are given by:

$$V_0 = V_C \pm \text{number of pixels to be moved to correct pitch vibration angle} \quad (1)$$
$$= V_C \pm (-1) \times \text{focal length} \times \tan \frac{\text{pitch vibration angle}}{\text{vertical cell size}}$$

$$H_0 = H_C \pm \text{number of pixels to be moved to correct yaw vibration angle} \quad (2)$$
$$= H_C \pm (-1) \times \text{focal length} \times \tan \frac{\text{yaw vibration angle}}{\text{horizontal cell size}}$$

where $$\text{vibration correction amount} = \text{focal length} \times \tan \frac{\text{vibration angle}}{\text{vertical cell size}} \quad (3)$$

With these equations, the numbers of pixels to be moved required for vibration correction are obtained.

A predetermined command, which includes the calculated target position coordinates ($V_0$, $H_0$) as the reference position coordinates of the extraction range, is output to the CCD drive circuit 26 and memory control circuit 30 (step S15). The CCD drive circuit 26 and memory control circuit 30 operate to execute extraction according to the command in the next field. After that, the flow returns to step S11 to prepare for the next field, and the control waits until integration repeats itself 10 times.

Figure 5:
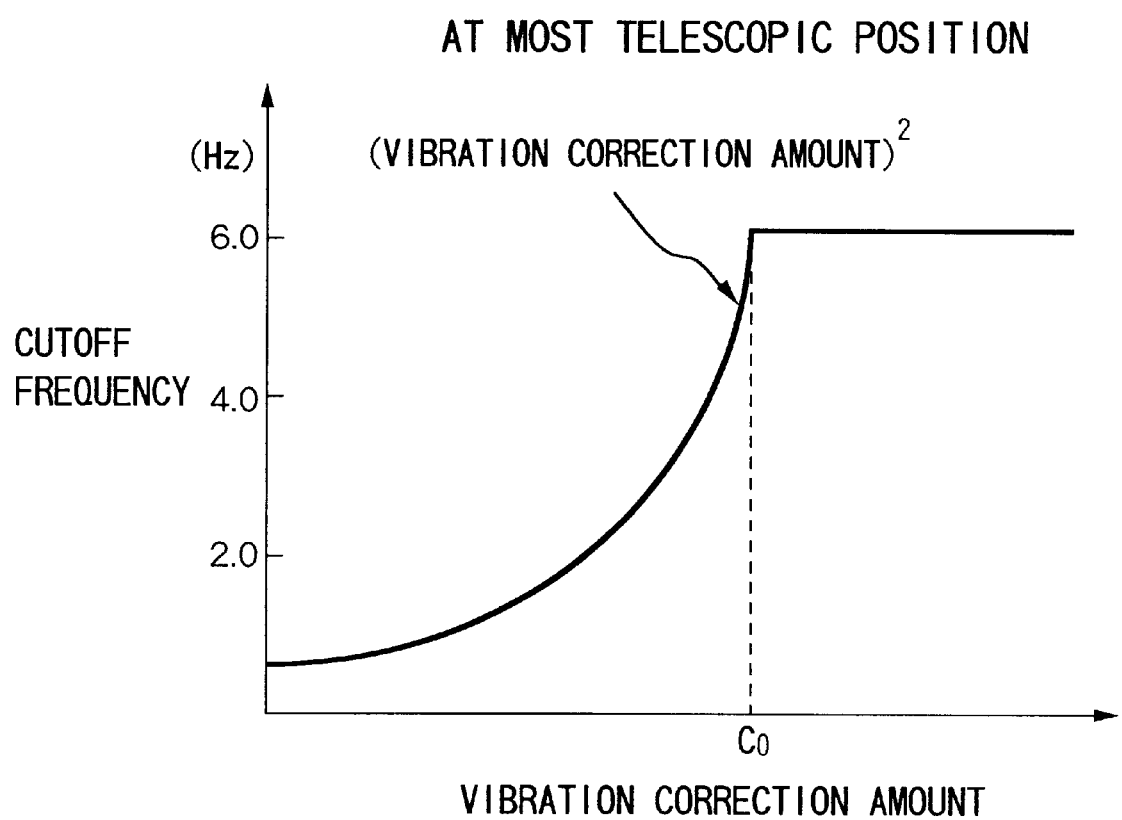
FIG. 5 is a graph showing the cut-off frequency characteristics as a function of the vibration correction amount at the most telescopic position.
Figure 6A:
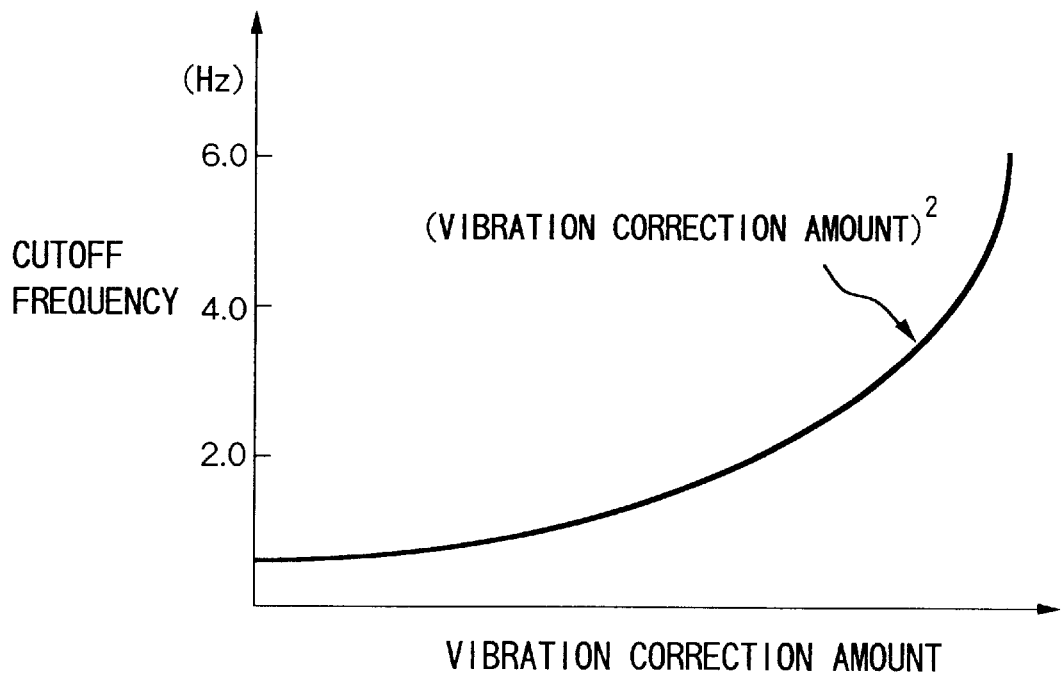
FIG. 6A is a graph showing the cut-off frequency characteristics as a function of the vibration correction amount at the most wide-scopic position.

FIGS. 5 and 6A show the cutoff frequency characteristics as a function of the vibration correction amount. FIG. 5 shows the characteristics when the lens is located at the most telescopic position, and FIG. 6A shows the characteristics when the lens is located at the most wide-scopic position. In both FIGS. 5 and 6A, the abscissa plots the vibration correction amount (=f·tanθ), and the ordinate plots the cutoff frequency $f_c$. Since the cutoff frequency is determined as a function of the vibration correction amount, the suppression capability of anti-vibration can be finely controlled in correspondence with the required vibration correction level, and can be smoothly switched even upon panning. In the first embodiment, the maximum cutoff frequency is set at 6 Hz. This is because principal vibration frequency components fall within the range below 5 Hz.

The reason why the cutoff frequency is changed in proportion to the square of the correction amount in a region where the vibration correction amount is small (a region where the correction amount $<c_0$ in FIG. 5) is to sharply raise the cutoff frequency compared to a case wherein the cutoff frequency linearly changes in proportion to the correction amount, when the vibration correction amount increases, and to set a low cutoff frequency as much as possible so as to improve the anti-vibration effect, when the vibration correction amount is in the neighborhood of zero.

When the range with a high anti-vibration effect (a range where the vibration correction amount is around zero) is to be maximized, the order of the vibration correction amount is raised (e.g., the order is raised to the third power, fourth power, and so on), so that coefficients and the like are set to sharply raise the cutoff frequency as the vibration correction amount becomes larger.

Figure 6B:
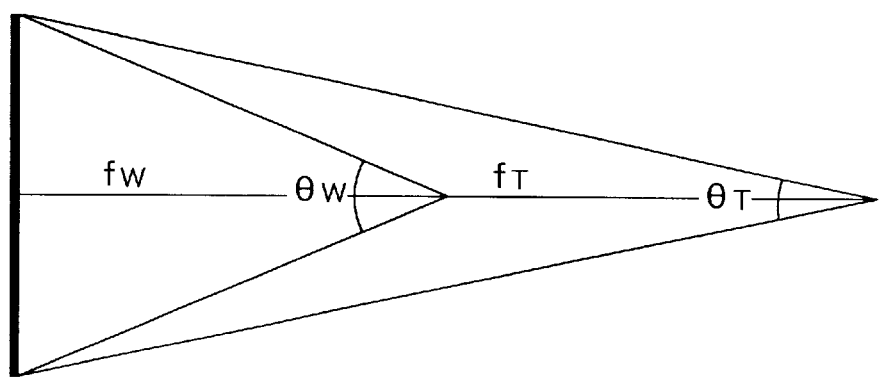
FIG. 6B is a view for explaining the relationship between the focal length and camera client.

In a telescopic region with a large focal length, the displacement velocity of an object tends to be higher than that in a wide-scopic region if the vibration correction amount remains the same. This is because, as shown in FIG. 6B, a vibration angular displacement (θ, θ') corresponding to a given vibration correction amount has a smaller vibration angular displacement $\theta_T$ in a telescopic region with a large focal length ($f_T$) than a vibration angular displacement $\theta_W$ in a wide-scopic region with a small focal length ($f_W$) and, hence, the vibration angle readily becomes large even at a low panning velocity. Hence, in order to prevent the correction amount from reaching a vibration correction limit and the sensed image from being disturbed, the cutoff frequency must be raised more quickly at the telescopic side as can be seen from a comparison between FIGS. 5 (telescopic side) and 6A (wide-scopic side).

In this manner, by changing the cutoff frequency characteristics in correspondence with the focal length, both anti-vibration control for panning and "collision prevention" against a correction limit can be achieved using identical limiting parameters.

With the process described above with reference to FIGS. 3 to 6A, in the first embodiment, since the limiting amount for the vibration correction amount, i.e., the cutoff frequency is changed in correspondence with the vibration correction amount, the limiting amount on the vibration correction amount changes continuously, and anti-vibration control for normal image sensing can be smoothly switched to that for panning. Especially, by changing the cutoff frequency in proportion to the n-th power (n is an integer equal to or larger than 1 and assumes several different values) of the vibration correction amount, when the vibration correction amount has a predetermined value, the vibration correction amount can be sharply limited, or limited as much as possible, or the correction amount range without any limitation can be broadened, thus allowing flexible setups. As can be seen from a comparison between FIGS. 5 and 6A, by setting appropriate limiting characteristics in correspondence with the focal length, prevention of disturbance of the sensed image upon collision against a vibration correction limit, and anti-vibration control for panning can be implemented using identical parameters for band limitations.

Modifications of First Embodiment

M-1: In the first embodiment, the PAL CCD image sensing element and line memory are used. Alternately, the same effect can be obtained by controlling the image extraction position on a field memory. Also, a large-scale or ultra-high-resolution CCD image sensing element that does not require any enlargement control may be used.

M-2: In the first embodiment, angular velocity sensors are used as the vibration detection means. Alternatively, acceleration sensors may be used. In such case, another integration process need only be added inside or outside the anti-vibration control circuit 22. The vibration angular displacement may be calculated by either software or hardware.

M-3: In the first embodiment, a band limiting means that limits the band of a vibration signal is used as the vibration correction limiting means. However, the present invention is not limited to such specific means. For example, the correction amount may be limited by changing the vibration correction gain. In this case, a motion vector detection means can be used as the vibration detection means.

Second Embodiment

The second embodiment in which an anti-vibration mechanism of the present invention is applied to an image sensing apparatus that uses a zoom lens or an exchangeable lens type image sensing apparatus, will be described below.

FIG. 7 is a block diagram of the second embodiment. The second embodiment uses an optical vibration correction device that corrects vibration by moving a vibration correction shift lens in a direction perpendicular to the optical axis. The second embodiment comprises an optical anti-vibration device in which a vibration correction means that is vulnerable to the first problem mentioned above is placed behind a zoom lens, but can clear this problem.

Reference numeral 110 denotes an inner-focus photographing lens, which is composed of a stationary lens 112, zoom lens 114, stop 116, anti-vibration shift lens 118, and focus lens 120.

Reference numeral 122 denotes an image sensing element for converting an optical image formed by the photographing lens 110 into an electrical signal; 124, an amplifier for amplifying an output from the image sensing element 122; and 126, a camera signal processing circuit for performing a known camera signal process for the signal output from the amplifier 124.

A motor drive circuit 128 moves the zoom lens 114 in the optical axis direction using a stepping motor 130. A motor drive circuit 132 moves the anti-vibration shift lens 118 in a direction perpendicular to the optical axis using a stepping motor 134. An encoder 136 detects the position of the anti-vibration shift lens 118. An amplifier 138 amplifies the output from the encoder 136, and a subtractor 140 subtracts the output from the amplifier 138 from a control signal supplied from a system control circuit 146 and supplies the difference to the motor drive circuit 132. A motor drive circuit 142 moves the focus lens 120 in the optical axis direction using a stepping motor 144.

The system control circuit 146 is a microcomputer that controls the overall apparatus, controls the motor drive circuits 128 and 142, and outputs a target value for anti-vibration control to the subtractor 140.

Reference numeral 148 denotes a zoom key which is operated by the user to change focal length. The system control circuit 146 moves the zoom lens 114 in a designated direction via the motor drive circuit 128 and 130 in accordance with operation of the zoom key 148.

Reference numeral 150a denotes a pitch angular velocity sensor; and 150b, a yaw angular velocity sensor. The detection outputs from the angular velocity sensors 150a and 150b are amplified by amplifiers 152a and 152b and the amplified signals are supplied to the system control circuit 146. Reference numeral 154 denotes an anti-vibration control ON/OFF switch.

The system control circuit 146 converts analog outputs from the amplifiers 152a and 152b into digital signals, and integrates the digital signals to convert them into angular displacements. The system control circuit 146 corrects vibration by moving the shift lens 118 in a direction perpendicular to the optical axis, so as to move the sensed image on the image sensing element 122 that has moved by vibration (by an amount nearly corresponding to f×tanθ) in a direction opposite to the moving direction due to vibration, on the basis of the obtained angular displacements, i.e., vibration angles θ and the focal length f of the photographing lens 110. More specifically, the system control circuit 146 outputs a vibration correction target value to the subtractor 140. The subtractor 140 compares the output from the amplifier 138 (i.e., a signal indicating the position of the shift lens 118) with the target value, and supplies their difference signal to the motor drive circuit 132. In this manner, the shift lens 118 moves to a position corresponding to the target value.

Also, the system control circuit 146 controls the zoom lens 114 and focus lens 120. That is, the system control circuit 146 controls the motor drive circuit 128 in accordance with a signal coming from the rotary zoom switch 148, the resistance of which changes in correspondence with the pressure exerted, so as to move the zoom lens 114 in the designated direction. The system control circuit 146 controls the motor drive circuit 142 to maximize a focus signal obtained from the camera signal processing circuit 126 so as to move the focus lens 120 along the optical axis, thus forming an optical image on the image sensing surface of the image sensing element 122.

Figure 8:
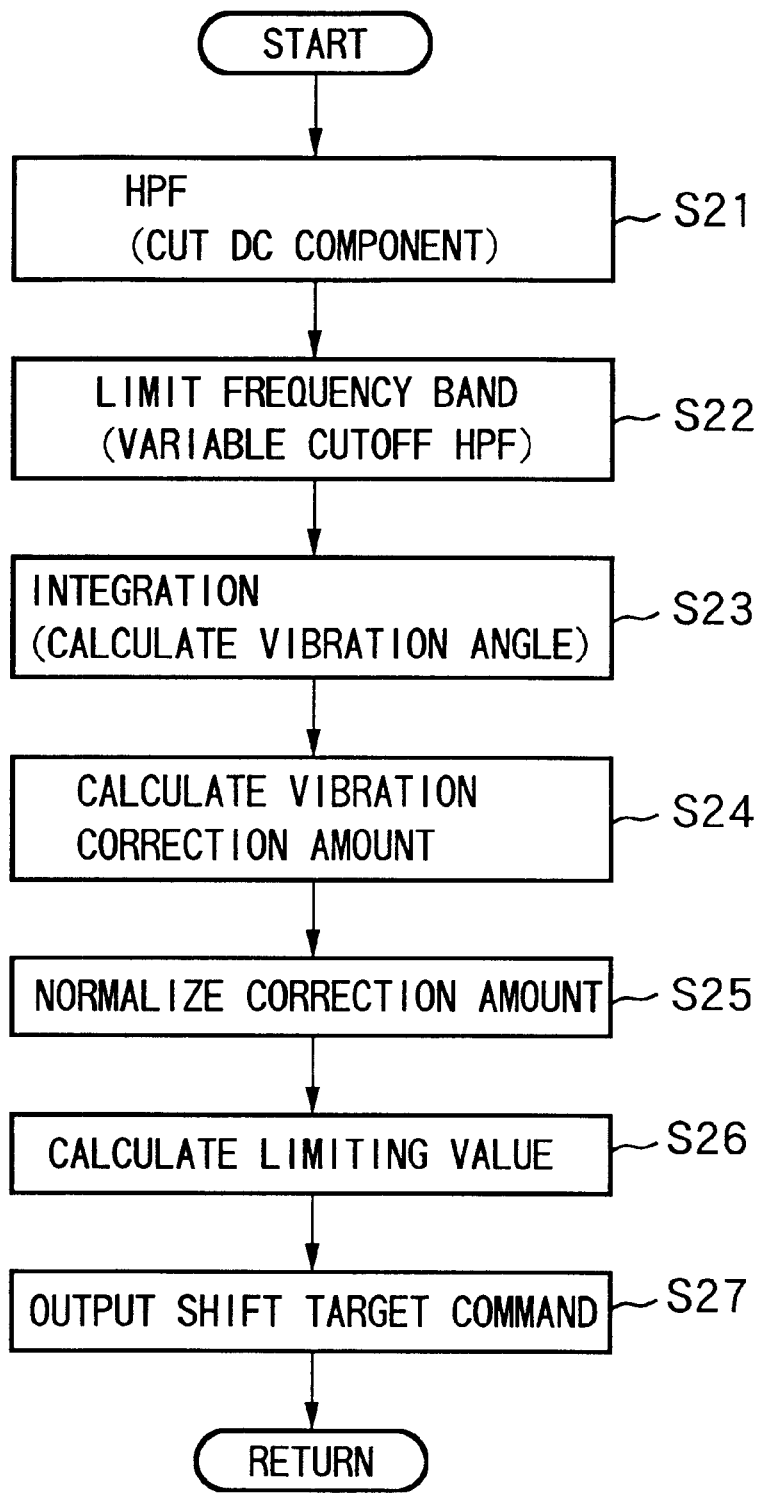
FIG. 8 is a flow chart showing anti-vibration control of the second embodiment show in FIG. 7.

The anti-vibration control in the system control circuit 146 will be explained below with reference to FIG. 8. In the second embodiment, a vibration correction amount is normalized by the focal length and maximum correction limit, and the limiting threshold is calculated to follow predetermined limiting characteristics in accordance with the normalized vibration correction amount. Hence, the second embodiment can cope with all focal lengths by only a single type of limiting characteristics.

In the second embodiment as well, angular displacements are calculated by integrating the angular velocity signals detected by the angular velocity sensors 150*a* and 150*b* so as to calculate the vibration correction amount and its limiting threshold. In the first embodiment, the control period for vibration correction matches the field period. However, since the second embodiment uses an optical anti-vibration system, the vibration sampling period can be matched with the vibration correction period, and vibration can be corrected even during the charge accumulation time of the image sensing element. The process shown in FIG. 8 is an interrupt process executed at given periods by the system control circuit 146: e.g., at a frequency of 1 kHz in the second embodiment. For example, signals obtained by frequency-dividing oscillation clocks at a predetermined frequency division ratio are counted up (or down), and upon counting a time corresponding to 1 msec, an interrupt signal is generated. The system control circuit 146 incorporates an A/D converter for converting the analog outputs from the amplifiers 152*a* and 152*b* into digital signals. Assume that the A/D converter always operates in a scan mode.

The system control circuit 146 removes the DC component from an angular velocity signal sampled by the A/D converter (step S21), and limits the band of the AC component of the angular velocity signal (step S22). The band limitation is the same high-pass filter process as that for removing the DC component, except that its cutoff frequency is fixed in step S21 but is variable in step S22. By changing the cutoff frequency from the low- to high-frequency side, a desired band component is extracted. In the second embodiment, as in the first embodiment, the cutoff frequency is increased to lower the suppression capability of anti-vibration during camera work such as panning or the like, and is decreased to obtain a sufficient vibration correction effect in normal image sensing. In order to also prevent an unnatural image from being formed when a correction limit is reached in correcting vibration larger than the upper limit of the vibration correction range, the cutoff frequency in step S22 is adjusted.

Angular displacement is calculated by integrating the band-limited angular velocity signal (step S23). The calculated angular displacement corresponds to the vibration angle acting on the camera main body. Then, the vibration correction amount (shift target value) is calculated (step S24). The vibration correction amount is given by f×tanθ using the vibration angle θ and focal length f of the optical system, as mentioned above. The calculated vibration correction amount is normalized by a known maximum correction limit (a movement limit of the shift lens 118) (step S25):

normalized pitch vibration correction amount=pitch vibration correction amount/pitch maximum shift limit×100(%) (4)

normalized yaw vibration correction amount=yaw vibration correction amount/yaw maximum shift limit×100(%) (5)

The limiting threshold that limits vibration correction capability is calculated from the normalized vibration correction amount calculated in this way (step S26). The limiting threshold to be calculated is the cutoff frequency used in step S22. The calculated cutoff frequency is used in the next band limitation. For example, when the cutoff frequency assumes a large value, vibration components having frequencies equal to or lower than that cutoff frequency are cut off, thus weakening the vibration correction effect.

The correction amount (the target value of the shift lens 118) calculated in step S24 is output to the subtractor 140 (step S27).

Figure 9:
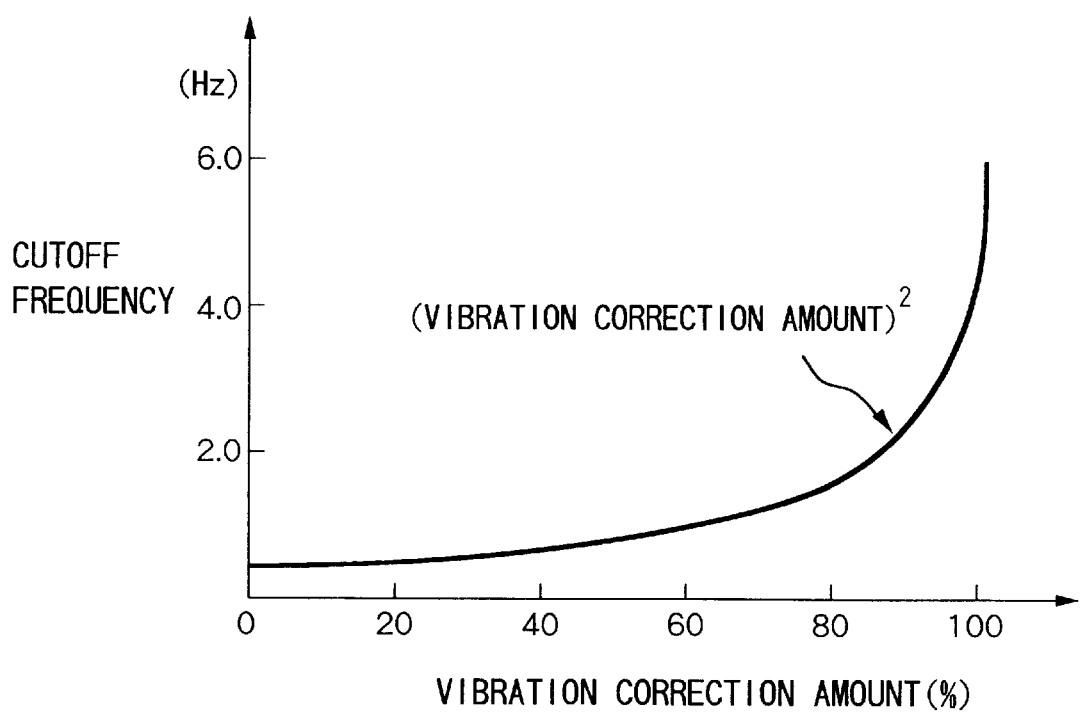
FIG. 9 is a graph showing the characteristics of the limiting threshold (cutoff frequency) as a function of the normalized vibration correction amount.

FIG. 9 shows the characteristics of the limiting threshold (cutoff frequency) as a function of the normalized value of the vibration correction amount. The abscissa plots the normalized vibration correction amount, which assumes 100% when correction is done by shifting the lens to its maximum shift limit. The normalized vibration correction amount indicates the ratio of a correction amount required for correcting current vibration to the maximum correction amount. The ordinate plots the cutoff frequency serving as a limiting threshold. As in the first embodiment, the cutoff frequency is a function of the square of the normalized vibration correction amount.

Figure 10A:
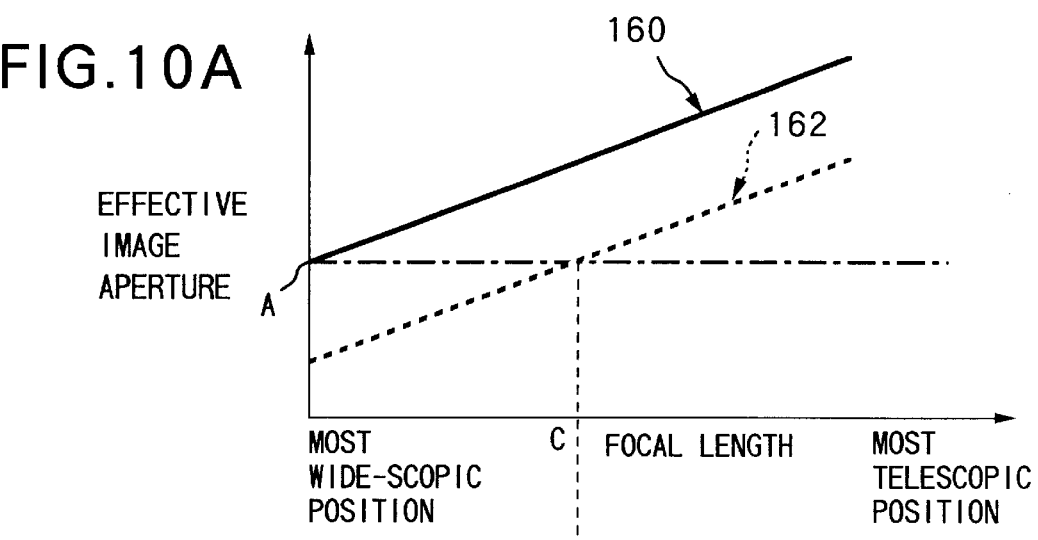
FIGS. 10A and 10B show examples of changes in effective image aperture and maximum correction range (maximum shift limit) as a function of the focal length.
Figure 10B:
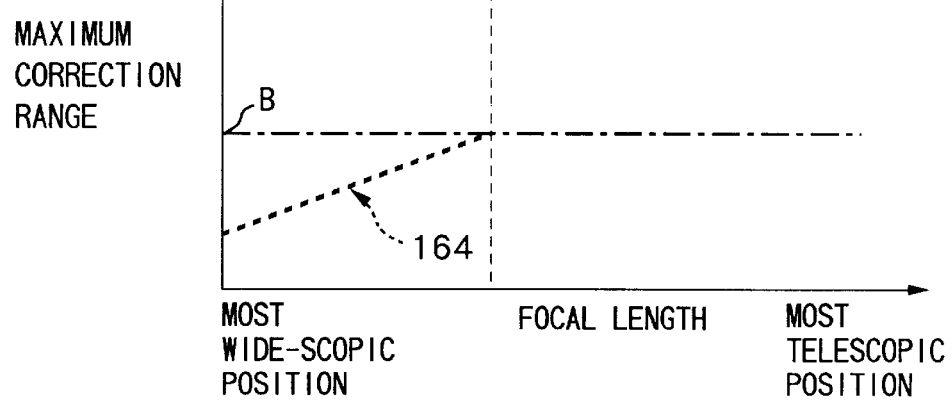

The maximum shift limit is determined as follows with reference to FIGS. 10A and 10B. FIG. 10A shows a change in diameter of an effective image circle (to be referred to as an effective image aperture hereinafter) as a function of the focal length, and FIG. 10B shows a change in maximum correction range (maximum shift limit) as a function of the focal length. In FIG. 10A, the abscissa plots the focal length, and the ordinate plots the effective image aperture. In FIG. 10B, the abscissa plots the focal length, and the ordinate plots the maximum correction range.

Referring to FIG. 10A, if A represents the minimum effective image aperture when the shift lens 118 moves within the maximum mechanical movement range, characteristics 160 represent those of the photographing lens that can prevent any eclipse of the photographing screen at all focal lengths from the wide-scopic side to the telescopic side even when the shift lens 118 mechanically moves to its maximum movement limit. Hence, the maximum value of the correction range obtained when a lens that exhibits the characteristics 160 is used assumes a constant value B shown in FIG. 10B. On the other hand, with a photographing lens that has characteristics 162 shown in FIG. 10A, an effective image aperture larger than (or equal to) A is obtained only when the focal length is set on the telescopic side of C. When the lens with such characteristics 162 is used at a focal length on the wide-scopic side of C, if the shift lens 118 is shifted to its mechanically movable limit, the photographing screen is partially eclipsed. Hence, the maximum correction range for the lens with the characteristics 162 must be set at a value smaller than B in a region on the wide-scopic side of the focal length C. For example, as indicated by characteristics 164 shown in FIG. 10B, as the focal length moves to the wide-scopic side, the correction range is limited to a smaller value. In general, a lens optical system is designed to have the characteristics 162 to attain a size reduction of the lens.

In this fashion, even when the maximum correction range (the maximum value of the correction range) changes in correspondence with the focal length (e.g., like the characteristics 164), since the second embodiment normalizes the vibration correction amount by the maximum correction range value, prevention of collision against the limit, and smooth shift and release of panning can be realized without changing the limiting characteristics in a plurality of ways in units of focal lengths (i.e., without providing a large number of characteristic change parameters).

Modification of Second Embodiment . . . First Modification

Figure 11:
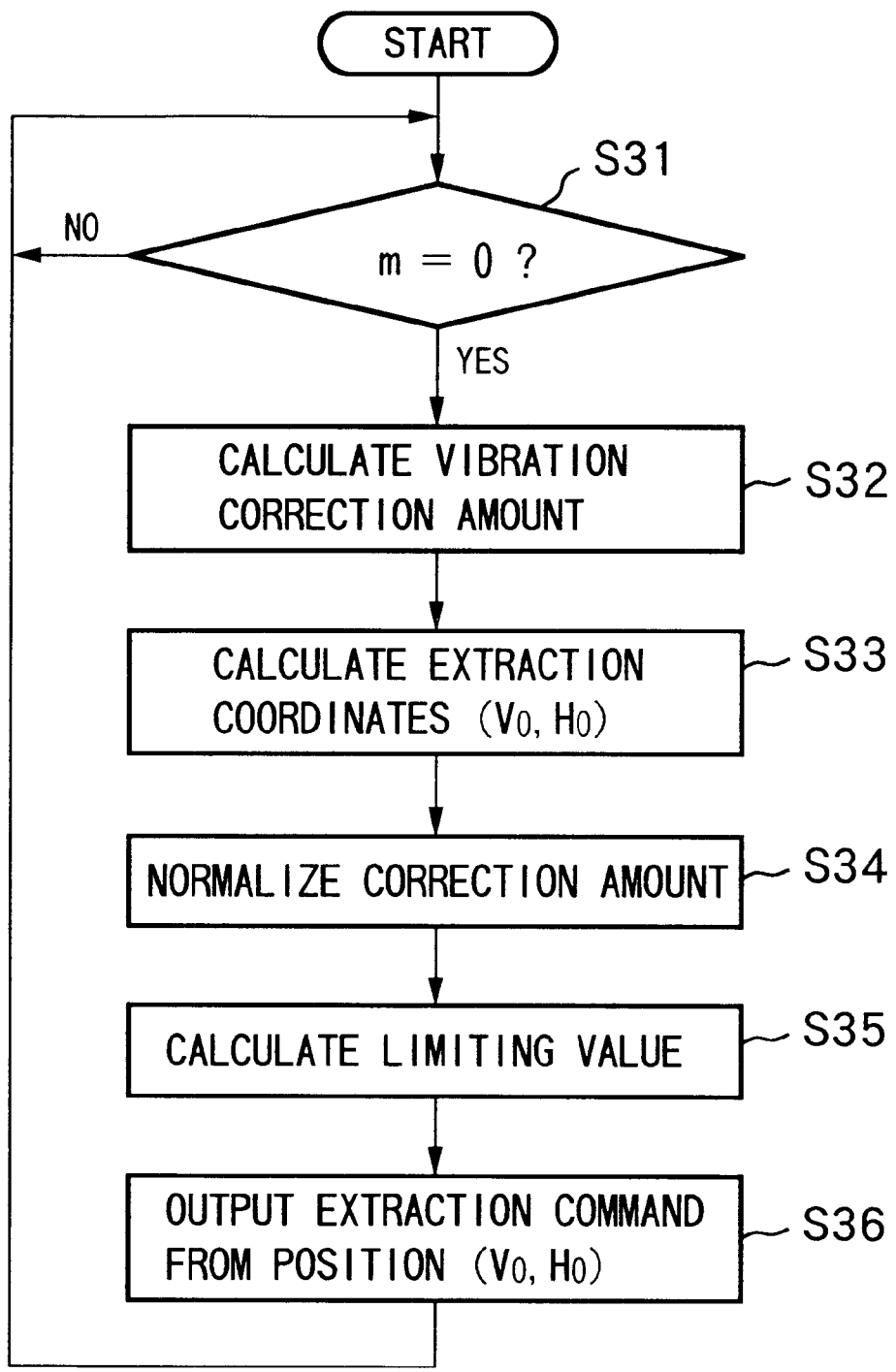
FIG. 11 is a flow chart that uses determination of the limiting threshold based on the normalized vibration correction amount in the first embodiment shown in FIG. 1.

Determination of the limiting threshold based on the normalized vibration correction amount can also be applied to the electronic vibration correction system in the first embodiment shown in FIG. 1. FIG. 11 shows the control sequence of a modification when determination of the limiting threshold based on the normalized vibration correction amount according to the second embodiment is used in the correction system of the first embodiment shown in FIG. 1.

The control waits until m equals 0 (step S31). When the initialization process shown in FIG. 3 has been executed 10 times in the current field, m is reset (step S6). If m=0 (step S31), the vibration correction amount is calculated (step S32). The vibration correction amount is given by f×tanθ (=vibration correction amount) using the vibration angle θ and focal length f of the optical system, as described above. As in step S14, the target position coordinates ($V_0$, $H_0$) of the extraction range are calculated based on the obtained vibration correction amount (step S33). In this way, the number of pixels to be moved required for vibration correction is obtained.

The vibration correction amount calculated in step S32 is normalized (step S34) by:

normalized pitch vibration correction amount=pitch vibration correction amount/vertical pixel size/number of extra vertical pixels/2×100(%)    (6)

normalized yaw vibration correction amount=yaw vibration correction amount/horizontal pixel size/number of extra horizontal pixels/2×100(%)    (7)

The first embodiment shown in FIG. 1 uses the PAL CCD image sensing element 12 (582 vertical pixels×752 horizontal pixels: aspect ratio 582/752≈0.78) in the NTSC camera. Upon extracting 485 vertical lines complying with NTSC from the PAL image sensing element 12, if the above-mentioned aspect ratio is to be maintained, the number of horizontal pixels to be extracted is 627. Hence, the number of extra pixels (of an ineffective image) is 97 vertical pixels×125 horizontal pixels. Since the sign of the correction direction changes in correspondence with the direction of vibration, half extra pixels, i.e., 48.5 vertical pixels and 62.5 horizontal pixels, are used in normalization.

The limiting threshold (cutoff frequency) is calculated from the obtained normalized vibration correction amount (step S35). An extraction command, which includes the target position coordinates ($V_0$, $H_0$) calculated in step S33 as reference position coordinates of the extraction range, is output to the CCD drive circuit 26 and memory control circuit 30 (step S36). The flow returns to step S31 to prepare for the next field, and the control waits until integration repeats itself 10 times.

Figure 12:
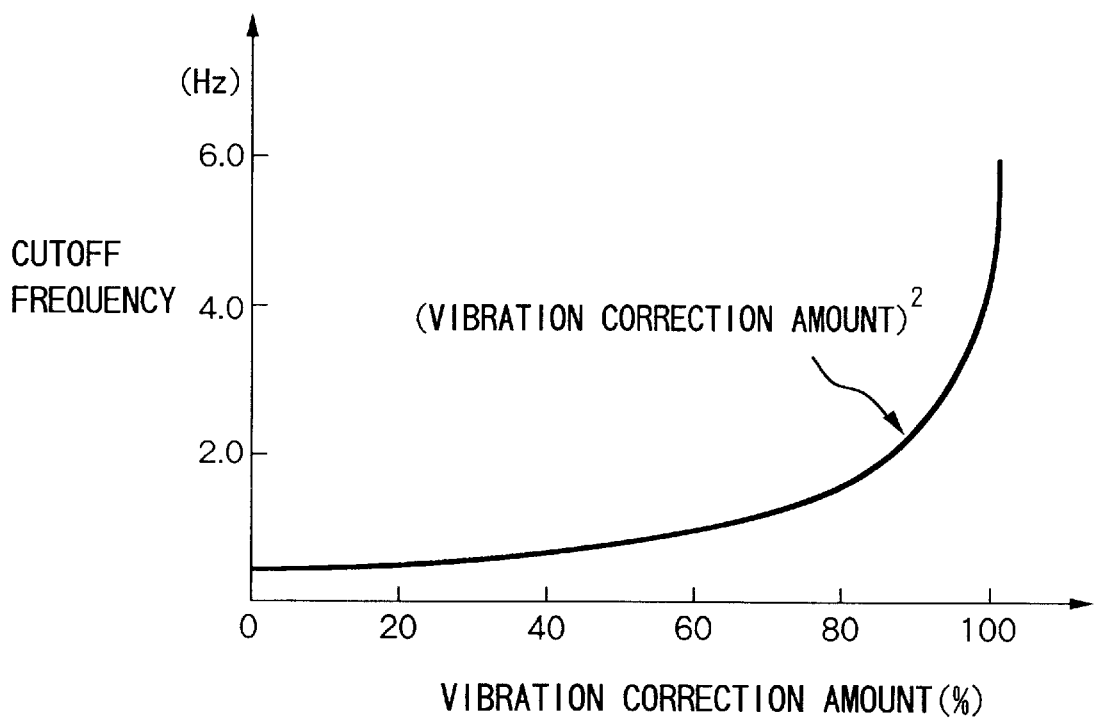
FIG. 12 is a graph showing the characteristics of the limiting threshold (cutoff frequency) as a function of the normalized vibration correction amount used in step S35 in FIG. 11.

FIG. 12 shows the characteristics of the limiting threshold value (cutoff frequency) as a function of the normalized vibration correction amount, which is used in step S35 in FIG. 11. The abscissa plots the normalized vibration correction amount, and the ordinate plots the cutoff frequency. Note that the abscissa defines 100% vibration correction amount when correction is done using all pixels half the extra pixels as a maximum correction limit. In the first modification, the cutoff frequency is a function of the square of the normalized vibration correction amount as in the second embodiment. To prevent the correction amount from reaching a vibration correction limit and the sensed image from being disturbed, in FIG. 12, as the vibration correction amount comes closer to the maximum correction limit, the cutoff frequency is set to sharply shift to a larger value (higher frequency).

In the first modification, since the vibration correction amount calculated according to vibration is normalized by the maximum vibration correction range, and the limiting threshold of a vibration signal is determined in correspondence with the normalized vibration correction amount, even in a camera with a variable focal length or a camera with a variable effective image aperture corresponding to the focal length, smooth panning mode shift can be realized. Also, similar panning characteristics can be obtained by simple parameter setups irrespective of the anti-vibration scheme used.

Third Embodiment

The above embodiment is characterized by realizing a smooth panning process by simple parameter setups independently of the anti-vibration scheme used. In the third embodiment to be described below, even when not only the anti-vibration scheme but also the lens, image sensing element, and video signal format vary, a panning process that can achieve the effect of the present invention can be done, and uniform suppression capability of anti-vibration can be obtained.

Figure 13:
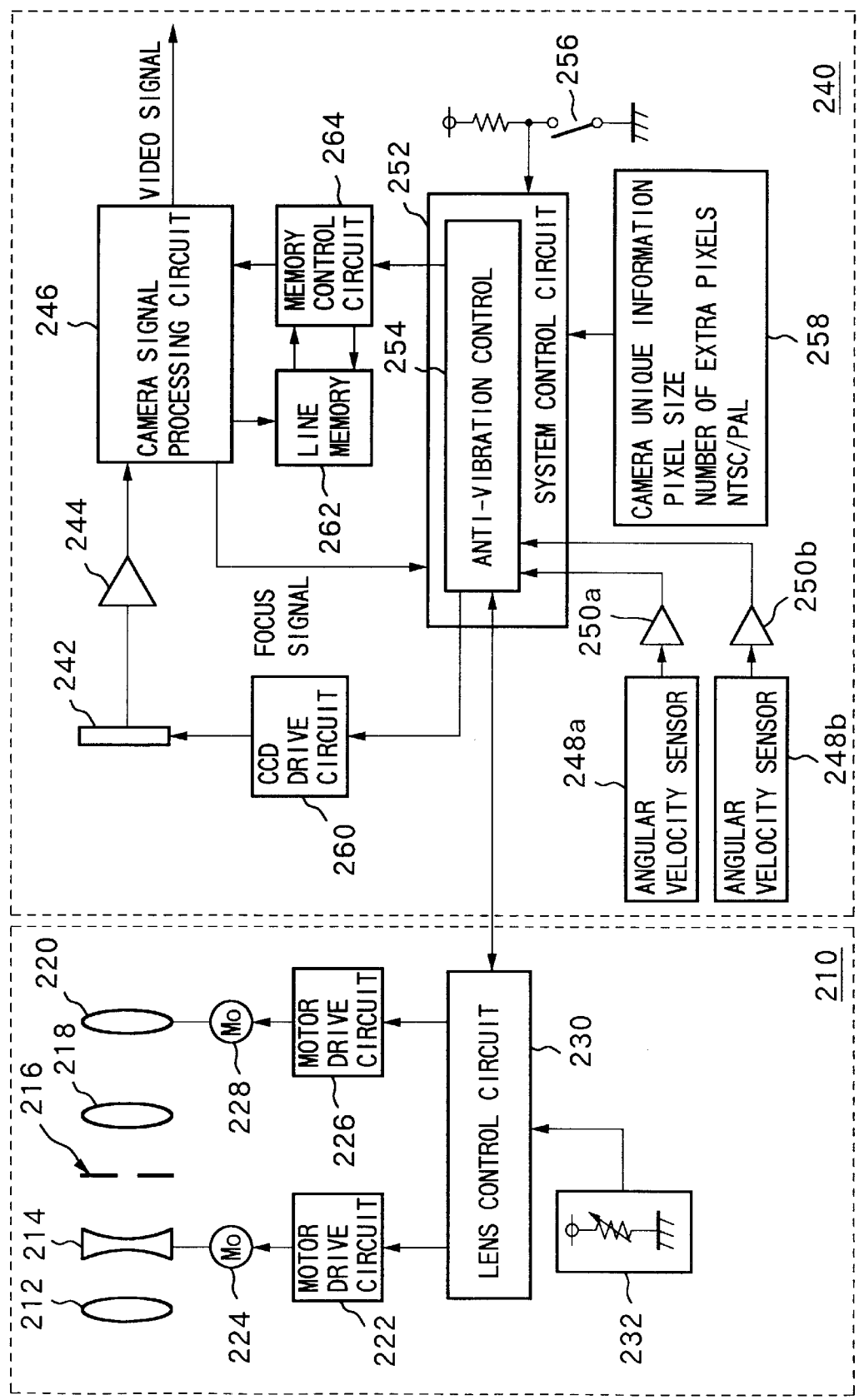
FIG. 13 is a schematic block diagram showing an arrangement according to the third embodiment of the present invention.

FIG. 13 is a schematic block diagram of the third embodiment. In the third embodiment, the present invention is applied to an exchangeable lens type video camera.

The third embodiment is composed of a lens unit 210 and camera main body 240, and the lens unit 210 is detachable from the camera main body 240.

The lens unit 210 is of inner focus type, and comprises a stationary lens 212, zoom lens 214, stop 216, stationary lens 218, and focus lens 220. A motor drive circuit 222 moves the zoom lens 214 in the optical axis direction using a stepping motor 224. A motor drive circuit 226 moves the focus lens 220 in the optical axis direction using a stepping motor 228. Reference numeral 230 denotes a camera control circuit comprising a microcomputer, which controls the lens unit 210 via communications with the camera main body 240, and outputs information of the lens unit 210 to the camera main body 240. Reference numeral 232 denotes a rotary zoom switch, the resistance of which changes in correspondence with the pressure exerted.

The lens control circuit 230 controls the motor drive circuit 222 to move the zoom lens 214 in the designated direction in accordance with operation of the zoom switch 232. Also, the lens control circuit 230 moves the focus lens 220 in the optical axis direction via the motor drive circuit 226 and motor 228 to maximize focus signal information from the camera main body 240 on the basis of that information.

In the camera main body 240, reference numeral 242 denotes a CCD image sensing element that converts an optical image formed by the lens unit 210 into an electrical signal. The output signal from the image sensing element 242 is amplified by an amplifier 244, and the amplified signal is input to a camera signal processing circuit 246. The camera signal processing circuit 246 performs known camera signal processes such as gain adjustment, color balance adjustment, γ correction, and the like for the image signal received from the amplifier 244, and forms and outputs a standard video signal.

Reference numeral 248a denotes a pitch angular velocity sensor; 248b, a yaw angular velocity sensor; and 250a and 250b, amplifiers for respectively amplifying the outputs from the angular velocity sensors 248a and 248b. Reference numeral 252 denotes a system control circuit comprising a microcomputer, which communicates with the lens control circuit 230 of the lens unit 210, and controls the overall apparatus. The system control circuit 252 comprises an anti-vibration control module 254, which detects vibration and its angle of the camera main body on the basis of the outputs (i.e., pitch and yaw angular velocities) from the amplifiers 250a and 250b, and cancels vibration. The system control circuit 252 incorporates an A/D converter for converting the outputs from the amplifiers 250a and 250b into digital signals. Reference numeral 256 denotes an anti-vibration ON/OFF switch, with which the user instructs the system control circuit 252 to turn on/off an anti-vibration mode. Reference numeral 258 denotes a memory such as an EEPROM or the like, which stores information unique to the camera, for example, the pixel sizes, the numbers of extra pixels, the output video format, and the like of the image sensing element 242.

Reference numeral 260 denotes a CCD drive circuit which drives the image sensing element 242 in accordance with a command from the anti-vibration control module 254 in the system control circuit 252 to read out a desired line portion; 262, a line memory for selecting an output image portion in the line direction; and 264, a memory control circuit for controlling the line memory 262 in accordance with a command from the anti-vibration control module 254.

The image sensing element 242 converts an optical image formed by the lens unit 210 into an electrical signal, which is amplified by the amplifier 244. The amplified signal is supplied to the camera signal processing circuit 246. The camera signal processing circuit 246 performs a known camera signal process for the output from the amplifier 244, and outputs an NTSC video signal. The camera signal processing circuit 246 generates a focus signal from the output from the amplifier 244, and supplies it to the system control circuit 252. The system control circuit 252 transmits the focus signal supplied from the camera signal processing circuit 246 to the lens control circuit 230 in the lens unit 210.

The anti-vibration control module 254 in the system control circuit 252 calculates angular displacements by integrating the angular velocities (the outputs from the amplifiers 250a and 250b) detected by the angular velocity sensors 248a and 248b, calculates the pixel movement amount (nearly corresponding to f×tanθ) on the image sensing element 242 resulting from vibration on the basis of the obtained angular displacements, i.e., vibration angles θ of the camera and the focal length f of the lens unit 210, and controls the CCD drive circuit 226 and memory control circuit 264 to cancel that pixel movement as in the first embodiment.

Figure 14:
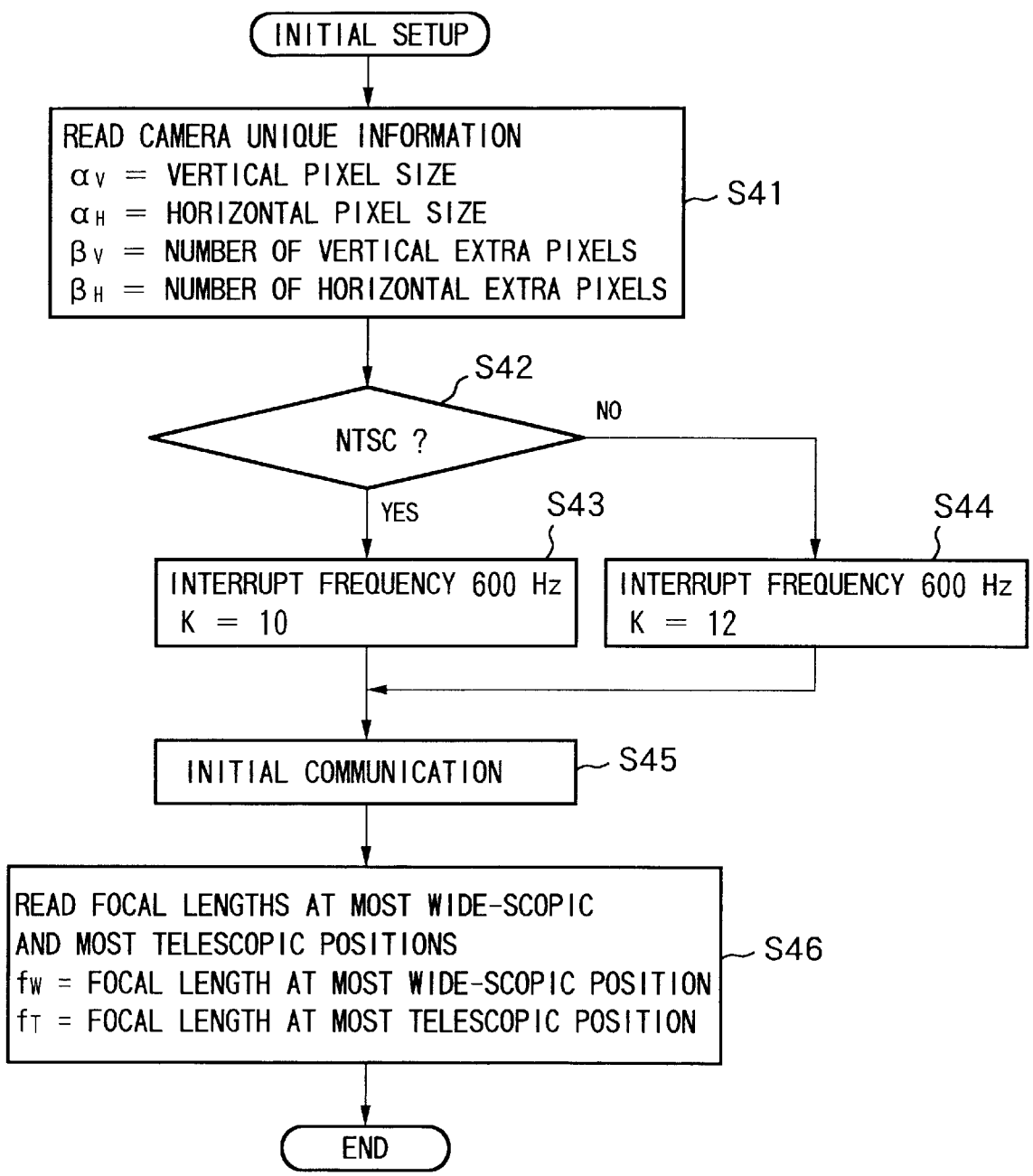
FIG. 14 is a flow chart of the initial setup routine of an anti-vibration control module 254.
Figure 15:
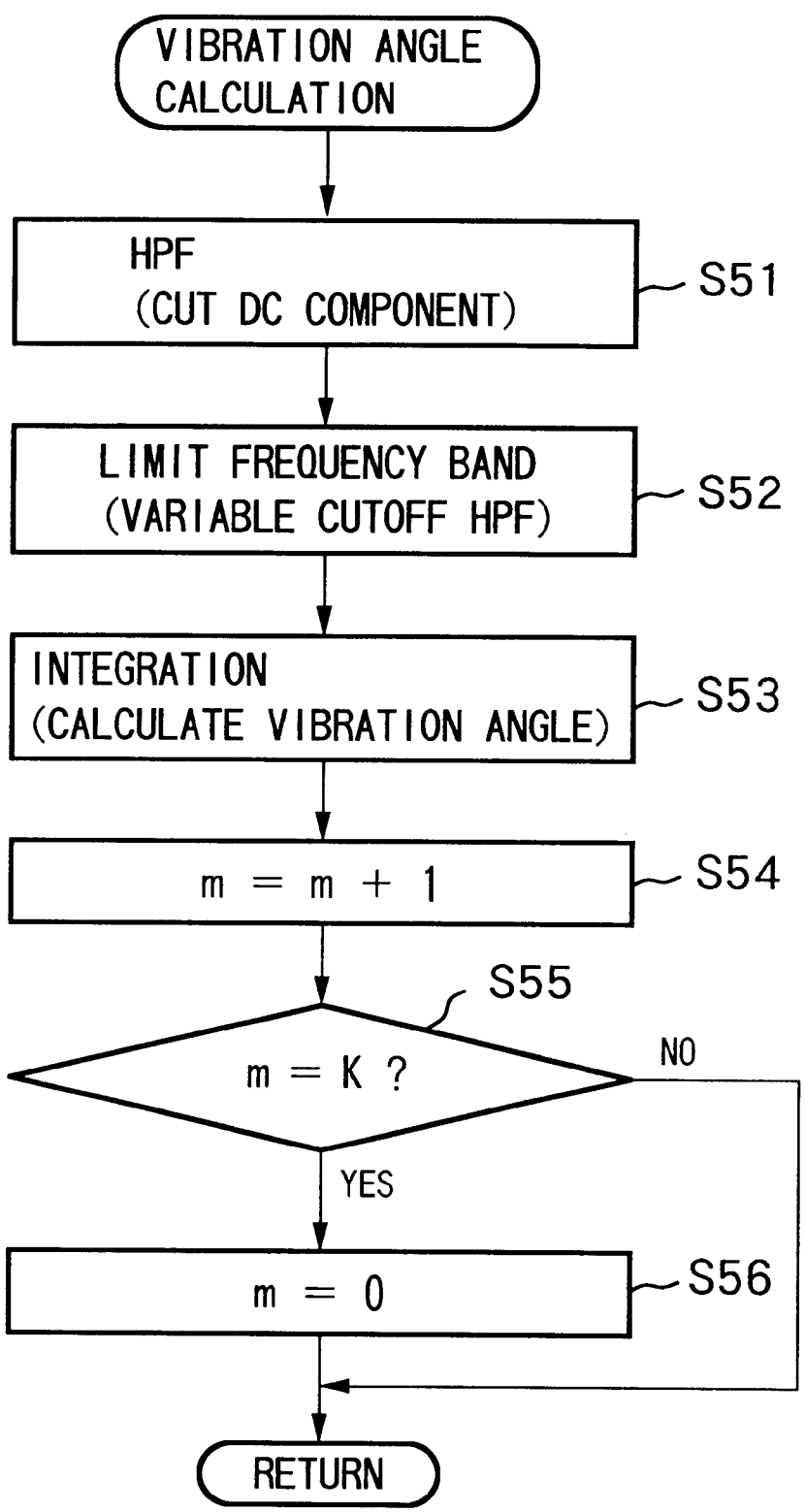
FIG. 15 is a flow chart of a routine for calculating the vibration angle.

The operation of the anti-vibration control module 254 will be explained below with reference to FIGS. 14, 15, and 16. FIG. 14 is a flow chart of the initial setup routine of the anti-vibration control module 254. This routine is executed once after power ON. FIG. 15 is a flow chart of a routine for calculating vibration angle, and this routine is an interrupt routine as in FIG. 3.

Figure 16:
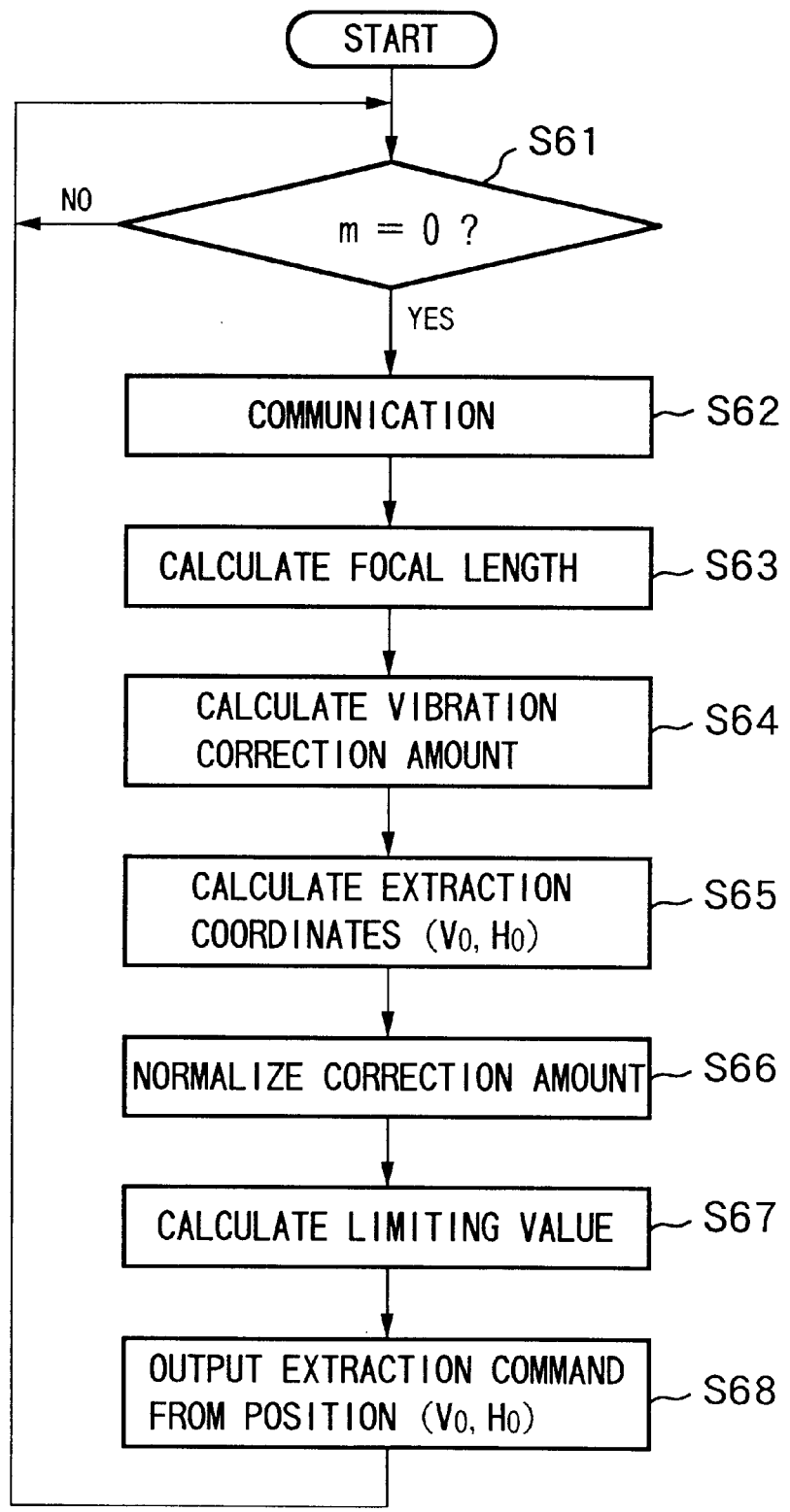
FIG. 16 is a flow chart of a process for determining the extraction range from the angular displacement.

FIG. 16 is a flow chart showing the same process as in FIG. 4, which is executed once per field.

The control sequence shown in FIG. 14 will be explained first.

The above-mentioned information (e.g., the pixel sizes, the numbers of extra pixels, the output video format, and the like) unique to the camera is read from the memory 258 (step S41). The vertical and horizontal pixel sizes of the image sensing element 242 in the unique information are respectively stored in memory areas $\alpha_V$ and $\alpha_H$, and the numbers of vertical and horizontal extra pixels in the unique information are respectively stored in memory areas $\beta_V$ and $\beta_H$. When a PAL image sensing element is used in an NTSC camera, $\beta_V$=97 and $\beta_H$=125. Furthermore, it is checked based on the output video formation in the unique information if the camera complies with NTSC or PAL (step S42).

The interrupt frequency, i.e., the number of interrupts per field, in the control sequence of the interrupt process (see FIG. 15) is determined in correspondence with the output video format (steps S43 and S44). The interrupt frequency is the sampling frequency of an angular velocity signal, and is also the calculation frequency of angular displacement by various filter processes. The sampling frequency is preferably constant independently of the output video format. That is, if the sampling frequency varies, the frequency characteristics in various filter processes change. Sampling is preferably synchronous with the field period to allow easy processes. In the third embodiment, information indicating the number of interrupts per field is set as the sampling frequency in a memory area K. When the sampling frequency is set at an integer multiple of the least common multiple (300 Hz) of the field frequencies of NTSC and PAL (600 Hz in the third embodiment), identical frequency characteristics can be set for both NTSC and PAL in the angular velocity signal process by a program.

In case of NTSC (step S42), the interrupt frequency is set at 600 Hz, and the number K of interrupts per field is set at 10 (step S43). In case of PAL (step S42), the interrupt frequency is set at 600 Hz, and the number K of interrupts per field is set at 12 (step S44).

An initial inter-communication with the lens control circuit 230 is made to acquire focal length information (zoom lens position information) from the lens control circuit 230. Especially, focal lengths $f_T$ and $f_W$ at the most telescopic and wide-scopic positions and position information are stored (step S46), thus ending this initial setup process.

FIG. 15 is a flow chart of the process for calculating angular displacements by integrating the angular velocity signals detected by the angular velocity sensors 150a and 150b. This process is an interrupt process executed at given periods by the system control circuit 252, i.e., at the frequency (600 Hz in the third embodiment (10 times the field frequency in case of NTSC; 12 times the field frequency in case of PAL)) determined in step S43 or S44. This frequency corresponds to the sampling frequency of an angular velocity signal, and also to the calculation frequency of angular displacement. An interrupt signal for this process can be generated by a known method. For example, clock signals are counted up or down, and upon counting clock signals corresponding to 1/600 sec, an interrupt signal is generated. As in the second embodiment mentioned above, the system control circuit 252 samples the angular velocity signals by converting them into digital signals using its internal A/D converter. In the third embodiment as well, assume that the A/D converter operates in a scan mode, and always converts an input signal into a digital signal.

The DC component is removed from an angular velocity signal sampled by the A/D converter (step S51), and the band of the AC component of the angular velocity signal is limited (step S52). The band limitation is the same high-pass filter process as that for removing the DC component, except that its cutoff frequency is fixed in step S51 but is variable in step S52. By changing the cutoff frequency from the low- to high-frequency side, a desired band component is extracted. In the third embodiment, the cutoff frequency is increased to lower the suppression capability of anti-vibration during camera work such as panning or the like, and is decreased to obtain a sufficient vibration correction effect in normal image sensing. In order to also prevent an unnatural image from being formed when a correction limit is reached in correcting vibration larger than the upper limit of the vibration correction range, the cutoff frequency in step S52 is adjusted. How to control the cutoff frequency will be explained later with reference to FIG. 16.

Angular displacement is calculated by integrating the band-limited angular velocity signal (step S53). The calculated angular displacement corresponds to a vibration angle acting on the camera main body. A variable m indicating the number of times of vibration angle calculations is incremented (step S54). If counter m equals the value of memory K (step S55), 0 is substituted in counter m (step S55), thus ending the interrupt process; if counter m is not equal to the value of memory K (step S55), the process ends directly. In other words, after K interrupts have occurred per field period, counter m is reset to 0.

Steps S51 to S53 are executed for both the pitch and yaw directions.

The process shown in FIG. 16 is executed once per field. That is, the process shown in FIG. 16 is executed after the process shown in FIG. 15 has been executed K times and before the next process starts, i.e., at the end of the current field.

The control waits until m equals 0 (step S61). When the interrupt process shown in FIG. 15 has been executed K times for the current field, m is reset to 0 (step S56). If m=0 (step S61), the current zoom lens position information is acquired via an inquiry to the lens control circuit 230 (step S62). The current focal length f is calculated based on the previously acquired focal lengths $f_T$ and $f_W$ at the most telescopic and wide-scopic positions, and the current zoom lens position (step S63):

$$f = (f_T - f_W)/\text{zoom stroke} \times (\text{most telescopic position} - \text{current position}) \quad (8)$$

for zoom stroke=most telescopic position−most wide-scopic position. The vibration correction amount is calculated based on the obtained current focal length f (step S64). As described above, the vibration correction amount is given by f×tanθ using the vibration angle θ and the focal length f of the optical system. The target position coordinates ($V_0$, $H_0$) of the extraction range are calculated based on the calculated vibration correction amount (step S65) by:

$V_0$ = vertical origin position ± number of pixels to be moved to correct pitch vibration angle $= \beta_V/2 \pm (-1) \times \text{pitch vibration correction amount}/\alpha_V$ -continued $H_0$ = vertical origin position ± number of pixels to be moved to correct yaw vibration angle $= \beta_H/2 \pm (-1) \times \text{yaw vibration correction amount}/\alpha_H$ As a result, the numbers of pixels to be moved required for vibration correction can be obtained.

The calculated vibration correction amount is normalized (step S66) by:

normalized pitch vibration correction amount/$\alpha_V/\theta_V/2 \times 100(\%)$ (8)

normalized yaw vibration correction amount/$\alpha_H/\beta_H/2 \times 100(\%)$ (9)

When the PAL CCD image sensing element 242 (582 vertical pixels×752 horizontal pixels) is used in an NTSC camera, if 485 vertical lines complying with NTSC are extracted from the PAL image sensing element, the number of horizontal pixels is 627 on the basis of the aspect ratio. Hence, the number of extra pixels β is 97×125 pixels.

The limiting threshold (cutoff frequency) is calculated from the obtained normalized vibration correction amount (step S67). The cutoff frequency has characteristics, as shown in, e.g., FIG. 12, and is raised more sharply as the vibration correction amount comes closer to the maximum correction limit.

An extraction command including the target position coordinates ($V_0$, $H_0$) calculated in step S65 as reference position coordinates of the extraction range is output to the CCD drive circuit 260 and memory control circuit 264 (step S68). The flow then returns to step S61 to prepare for the next field, and the control waits until integration repeats itself E times.

In the third embodiment shown in FIG. 13, anti-vibration operation can be realized using a common anti-vibration control program by only initially setting a state unique to the camera and lens. Since the limiting threshold of suppression capability of anti-vibration upon panning can have normalized characteristics, a single anti-vibration control module can be used in different combinations of lens units and camera main bodies. For example, even when lens units having different lens characteristics are attached to a single camera body, or when a lens unit of given characteristics is attached to camera main bodies having different capabilities, e.g., a camera that uses a high-density type, large-scale CCD image sensing element, or cameras using different video formats such as NTSC, PAL, and the like, identical suppression capability of anti-vibration can be obtained. Especially, since a single anti-vibration control module can be applied to every combinations of lenses and camera main bodies, a great cost reduction can be attained.

Advantages of First to Third Embodiments

As can be easily understood from the above description, according to the first to third embodiments, since the limiting threshold (e.g., cutoff frequency) of a vibration signal is determined in accordance with the vibration correction amount, the vibration signal can be continuously limited, and smooth mode transitions can be attained between anti-vibration control upon normal image sensing and that upon panning. In particular, since the limiting threshold changes in proportion to the n-th power (n is an integer equal to or larger than 1) of the vibration correction amount, flexible anti-vibration control (e.g., the vibration correction amount is limited sharply, the limitation is minimized, or the like)

corresponding to situations can be set when the vibration correction amount assumes a predetermined value. Also, by setting appropriate limiting characteristics in correspondence with the focal length, prevention of disturbance of the sensed image upon collision against a vibration correction limit, and anti-vibration control for panning can be implemented using identical parameters for band limitations.

Furthermore, by normalizing the vibration correction amount by the focal length and maximum correction limit, even in an image sensing apparatus with a variable focal length and/or effective image aperture, a shift and return to the panning mode can be smooth and natural by preparing limiting characteristics for the normalized vibration correction amount. Uniform panning characteristics can be obtained by simple parameter setups irrespective of the anti-vibration scheme used.

Using an anti-vibration control program module, anti-vibration operation corresponding to a variety of devices can be implemented by a common anti-vibration control program by only initially setting a state unique to the camera and/or lens. Since the limiting threshold of suppression capability of anti-vibration upon panning can have normalized characteristics, a value-added image sensing apparatus that can implement a vibration correction function with identical characteristics independently of the types of lenses to be attached like in an exchangeable lens camera or the types of camera main bodies that mount a given lens, such as a camera using a high-density type, large-scale CCD image sensing element, or cameras of different video formats such as NTSC, PAL, and the like, can be provided. Especially, since a single module can be applied to every combinations of camera systems, an inexpensive image sensing apparatus that can attain a great cost reduction can be provided.

Fourth Embodiment

Figure 17:
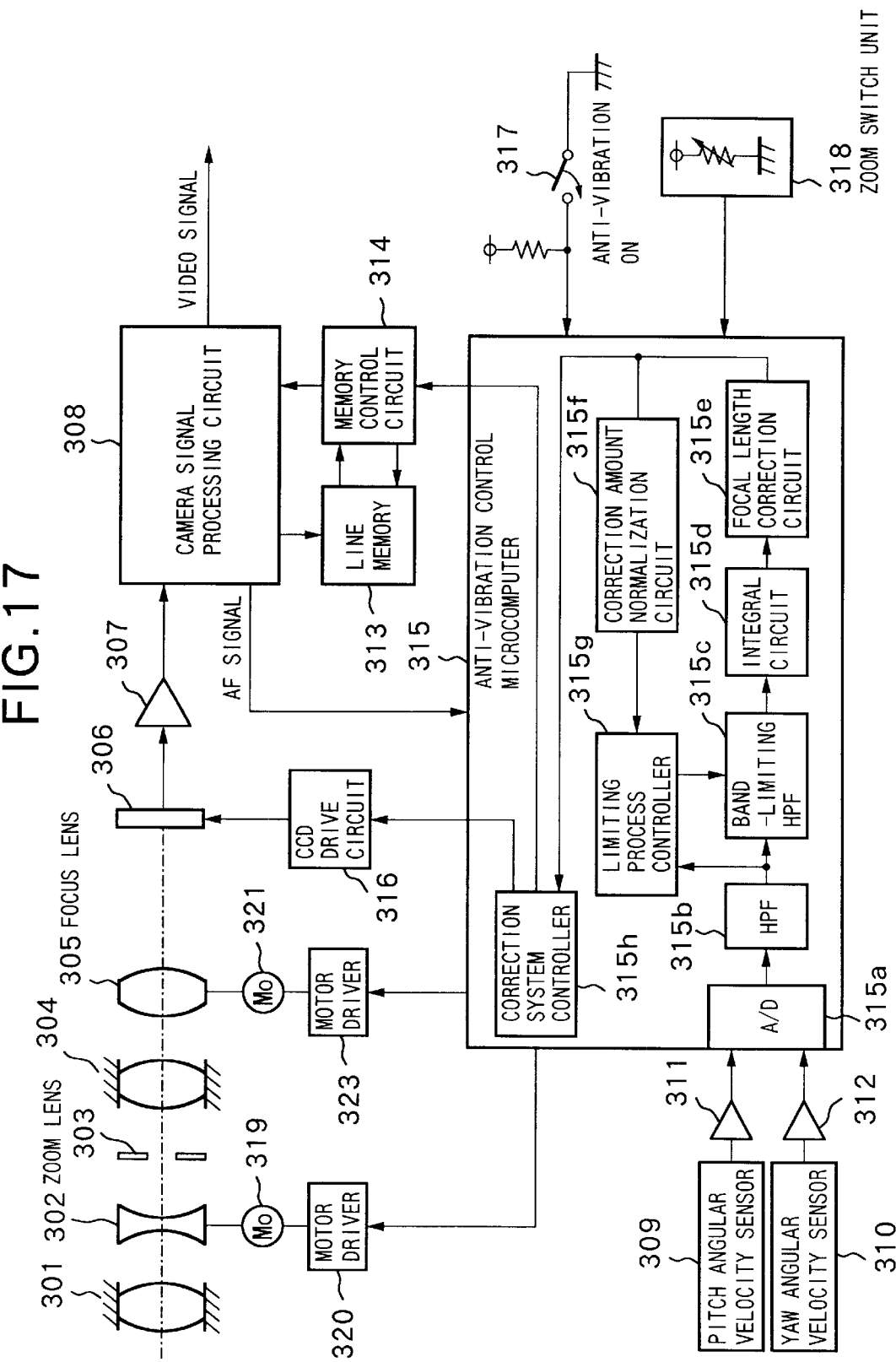
FIG. 17 is a block diagram showing the arrangement of an image sensing apparatus according to the fourth embodiment of the present invention.

This embodiment will be explained below with reference to the accompanying drawings. FIG. 17 is a block diagram showing the arrangement of an image sensing apparatus according to the fourth embodiment of the present invention. In this embodiment, a video camera serving as an image sensing apparatus has an electronic anti-vibration function.

As shown in FIG. 17, a lens unit has an inner focus type arrangement, and is composed of a first stationary lens 301, zoom lens 302, stop 303, second stationary lens 304, and focus lens 305. Light coming from the lens is imaged on an image sensing element 306 such as a CCD or the like, and the output from the image sensing element 306 is amplified to optimal level by an amplifier 307. The amplified signal is input to a camera signal processing circuit 308, and is converted into a standard television signal. The camera shown in FIG. 17 has an electronic shake correction function, which is turned on/off by detecting the status of a switch 317.

Angular velocity sensors 309 (pitch direction; detection means) and 310 (yaw direction; detection means) detect the vibration angular velocities of the camera main body (image sensing element 306). The detected vibration angular velocities are respectively amplified by amplifiers 311 and 312, and are sampled by an A/D converter 315a in an anti-vibration control microcomputer 315. The DC component is cut from the sampled angular velocity signal by a high-pass filter 315b, and that signal is integrated by an integral processor 315d to be converted into an angular displacement. A vibration angle θ calculated by the integral processor 315d is corrected by a focal length correction unit 315e in correspondence with a focal length f of the optical system to calculate a correction signal given by f·tanθ. A correction system controller 315h corrects vibration by moving an image in a direction opposite to the moving direction due to the vibration in correspondence with the correction signal (corresponding to a pixel moving amount on the image sensing element 306 due to the vibration) as an output signal of the focal length correction unit 315e. Note that reference numeral 315c denotes a high-pass filter for band limitation. A limitation process controller 315g controls the high-pass filter 315c in accordance with a normalized correction amount, which is normalized by a correction amount normalization unit 315f, and the output from the high-pass filter 315b, thereby limiting the suppression capability of anti-vibration upon panning. This limitation operation will be described in detail later.

Figure 18A:
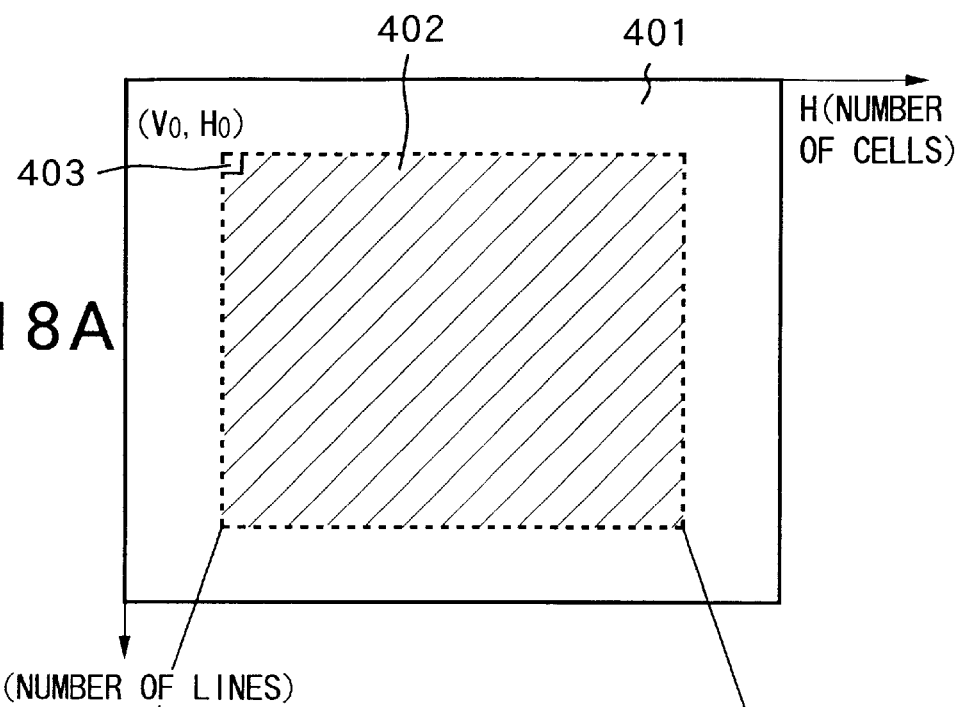
FIGS. 18A and 18B are explanatory views showing an extraction frame of the fourth embodiment.
Figure 18B:
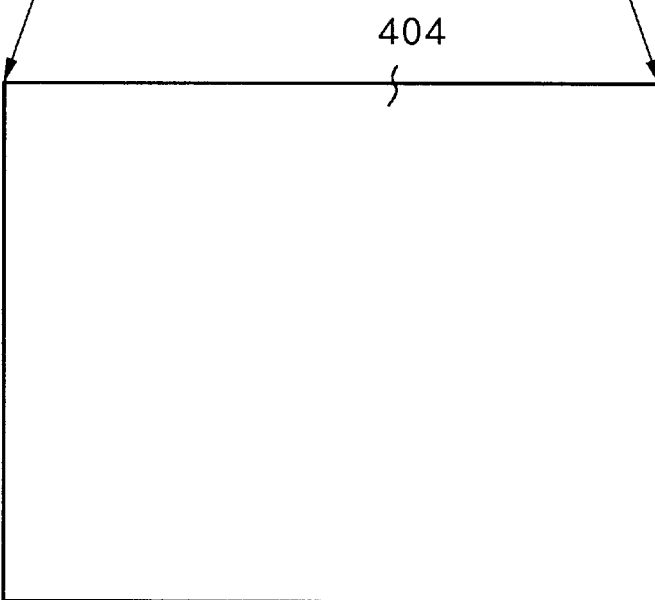

An image frame to be extracted for electronic anti-vibration control is an extraction frame 402 shown in, e.g., FIG. 18A. An image to be extracted will be explained below using FIG. 18A. FIG. 18A shows the image sensing frame of the image sensing element 306, and a region 401 corresponds to the entire image sensing frame. Of this region, a partial region, e.g., the extraction frame 402 is extracted and undergoes display or recording as the entire frame, as indicated by 404 in FIG. 18B. The position of the extraction frame 402 is changed to correct shake by changing vertical and horizontal position coordinates ($V_0$, $H_0$) 403. The position change range of the coordinates 403 is determined by the differences of the numbers of horizontal and vertical pixels (to be referred to as extra pixels hereinafter) between the entire image sensing frame 401 and extraction frame 402. The coordinates 403 are determined to attain correction in such a manner that an origin coordinate position free from any shake is defined in advance, and the position coordinates are changed in correspondence with the shake amount and direction.

In one method of extracting the extraction frame 402, an image of the entire image sensing frame 401 is temporarily stored in a field memory, only an image of the extraction frame 402 is enlarged to the size of the entire image sensing frame 401 while it is read out, and the enlarged frame 404 is displayed. In another method, a high-density, high-resolution type large-scale CCD is used as an image sensing so that the extraction region of the extraction frame 402 satisfies the number of scanning lines required for a standard TV signal in advance. Since both the former and latter methods require an expensive field memory and large-scale CCD, the fourth embodiment uses a versatile PAL CCD in an NTSC camera as in the above embodiments.

The PAL CCD has a high vertical pixel density. In the vertical scanning direction for image extraction, a CCD drive circuit such as a timing generator or the like changes the number of lines that undergo fast discharging within the range of extra lines exceeding the number of lines of NTSC in correspondence with any angular displacement caused by vibration, thereby changing the vertical image extraction position. In the horizontal scanning direction, when the relationship between the write start pixel position and read start pixel position with respect to a line memory is changed while enlarging image data in the horizontal direction at a ratio corresponding to the aspect ratio, the horizontal frame position can be changed, thus realizing low-cost vibration correction.

FIG. 17 has the aforementioned arrangement of the correction system. As for pixel movement in the vertical scanning direction, the anti-vibration control microcomputer 315 controls the CCD drive circuit 316 to execute fast discharging control so as to extract a desired scanning region. As for pixel movement in the horizontal scanning direction, the line memory 313 and memory control circuit 314, which sample a video signal processed by the camera signal processing circuit 308, enlarge an image (attained by changing the memory read rate and reading out decimated pixel data) in correspondence with the aspect ratio while varying the read position of the stored horizontal scanning image in accordance with the correction pixel movement amount. The obtained signal is fed back to the camera signal processing circuit 308, and is converted into a standard TV signal via, e.g., a color process and the like.

The anti-vibration control microcomputer 315 also controls the zoom lens 302 and focus lens 305. A zoom switch unit 318 is a rotary switch, the resistance of which varies in correspondence with the pressure exerted. The anti-vibration control microcomputer 315 sends a drive command to a motor 319 via a motor driver 320 in response to a signal from the zoom switch unit 318, thus moving the zoom lens 302 to zoom. Also, the anti-vibration control microcomputer 315 sends a drive command to a motor 321 via a motor driver 322 to maximize the level of a focus signal processed by the camera signal processing circuit 308, thus moving the focus lens 305 to adjust the focus.

The anti-vibration control processed by the anti-vibration control microcomputer 315 according to the fourth embodiment will be explained below with reference to FIGS. 19 and 20.

An objective of the image sensing apparatus of the fourth embodiment is to attain natural shake correction that can smoothly switch control for limiting the suppression capability of anti-vibration at the beginning or end of panning, and does not disturb camera works or sensed image. Hence, the features of the image sensing apparatus of the fourth embodiment are as follows.

1: The limiting amount is changed based o n predetermined characteristics in accordance with the correction amount to change the correction effect level. In this case, different signals are used in enable determination upon enabling and disabling limiting operation. Especially, a correction signal is used in determination as to whether or not the limiting operation is enabled, and a signal before band limitation or focal length correction is used in determination as to whether or not the limiting operation is disabled. In this way, hunching of limiting operation is prevented , and uniform response characteristics can be obtained independently of a change in field angle.

2: Upon strengthening and weakening the limiting operation, different limiting strength change rates are used to attain both quick response and formation of a natural sensed image.

Figure 19:
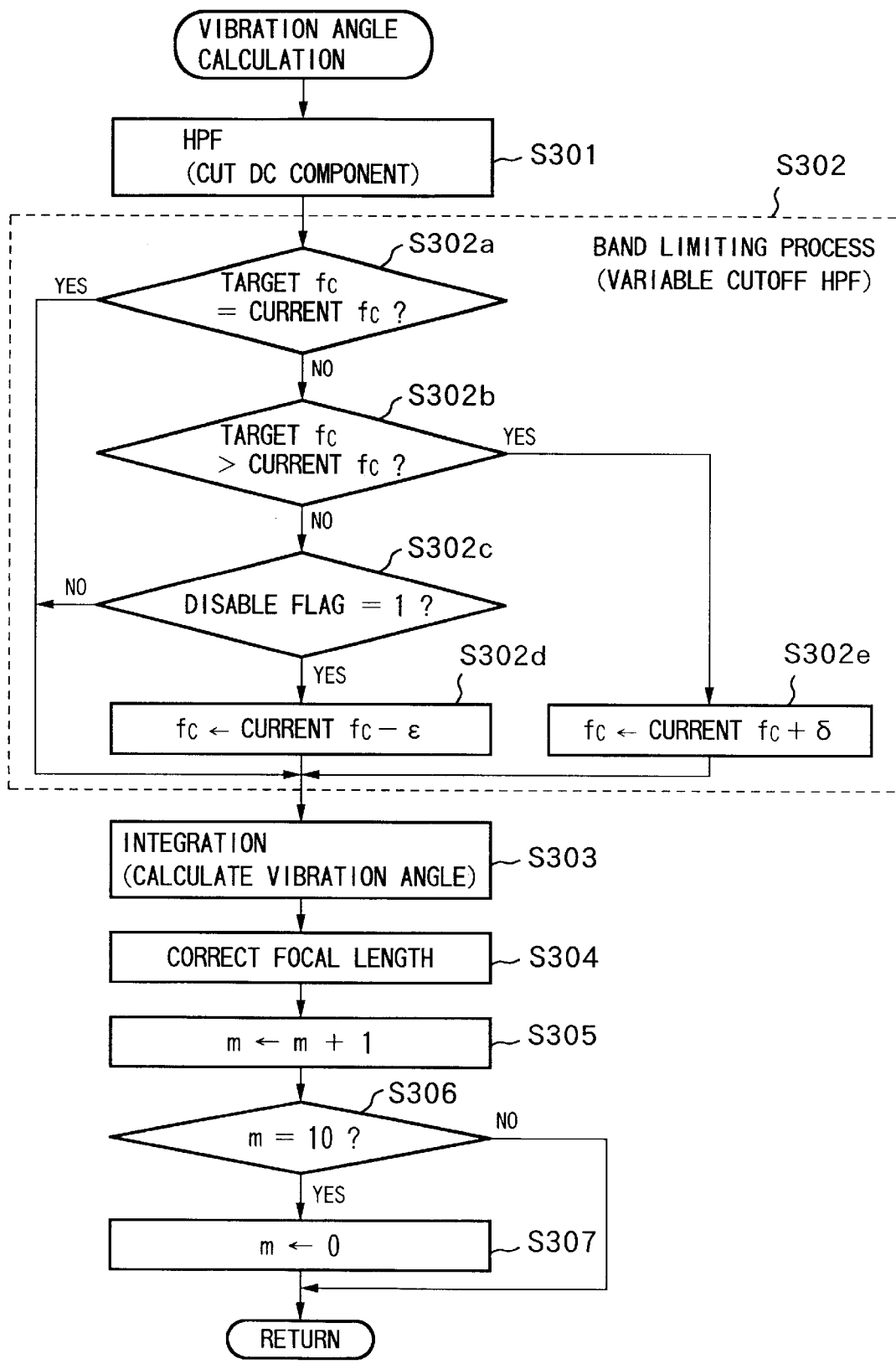
FIG. 19 is a flow chart showing anti-vibration control of the fourth embodiment.
Figure 20:
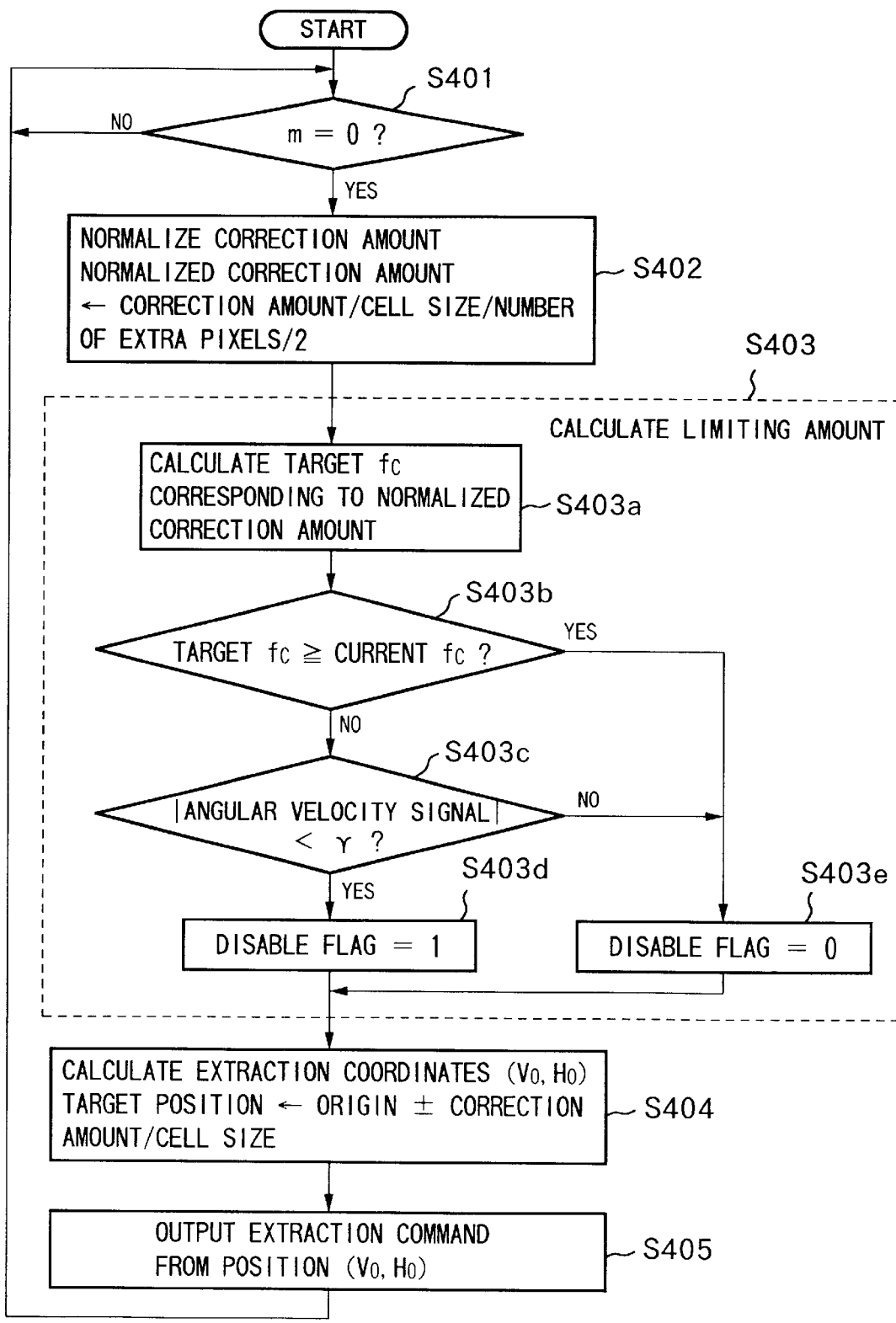
FIG. 20 is a flow chart showing anti-vibration control of the fourth embodiment.

The description of the processing flows shown in FIGS. 19 and 20 overlaps that of the processing of the anti-vibration control microcomputer 315 shown in FIG. 17. Although the anti-vibration control microcomputer 315 is illustrated as one building block in FIG. 17, it is implemented by a program pre-stored in a ROM (not shown) in practice. Hence, the processing of the microcomputer 315 will be explained below as that of a program.

The flow chart of FIG. 19 shows a process for calculating angular displacements by integrating angular velocity signals detected by the angular velocity sensors 309 and 310. This process is an interrupt process executed at predetermined periods in response to an instruction from the anti-vibration control microcomputer 315. In this embodiment, the interrupt process is executed at a frequency 10 times the field frequency, i.e., at 600 Hz in case of NTSC. This frequency corresponds to the sampling frequency of angular velocity signals, and the calculation frequency of angular displacements. An interrupt start event in the anti-vibration control microcomputer 315 occurs, for example, every time a counter that counts up (or down) oscillation clocks at a predetermined frequency division ratio reaches a count value that matches data corresponding to 1/600 sec. As has been described in FIG. 17, the A/D converter 315a in the anti-vibration control microcomputer 315 samples the angular velocity signals. In this embodiment, assume that the operation mode of the A/D converter 315a is a scan mode, i.e., the A/D converter always repeats A/D conversion, for the sake of simplicity.

When the interrupt process is started, the influence of the DC component is removed by processing an A/D-sampled angular velocity signal via the high-pass filter in step S301. Step S302 is a process for limiting the frequency band of an angular velocity signal of AC components, and includes steps S302a to S302e (step S302 will be explained in detail later in the description of FIG. 20). The process in step S302 is attained by substantially the same high-pass filter process as that in step S301 in practice, except that the cutoff frequency is fixed in step S301 but is variable in step S302. By changing the cutoff frequency from the low- to high-frequency side, band limitation can be achieved.

How to control the cutoff frequency in step S302 will be explained later in combination with the flow chart in FIG. 20. For example, the cutoff frequency is increased to lower the suppression capability of anti-vibration during camera work such as panning or the like, and is decreased to obtain a sufficient vibration correction effect in normal image sensing. In order to prevent an unnatural image from being formed when a correction limit is reached in correcting vibration larger than the upper limit of the vibration correction range, the band limitation control is also executed.

In step S303, angular displacement is calculated by integrating the band-limited angular velocity signal. The calculated angular displacement corresponds to a vibration angle $\theta$ acting on the camera main body. In step S304, focal length correction is executed to calculate the correction amount for vibration correction. As mentioned above, the correction amount is given by f·tan$\upsilon$ in accordance with the angular displacement obtained in step S303, i.e., a vibration angle $\theta$ and a focal length f of the optical system as in the first to third embodiments.

The processes in steps S303 to S307 form a processing routine for checking if a vibration angle has been calculated 10 times per field: "m" as a register for storing a calculation count parameter is incremented (step S305), it is checked if "m=10" (step S306), and if the interrupt has been generated 10 times, "m" is reset to "0" for the next field in step S307, thus ending this interrupt process. In steps S301, S302, S303, and S304 in FIG. 19, a vertical vibration signal is processed using a pitch angular velocity signal as the output from the angular velocity sensor 309, and a horizontal vibration signal is processed using a yaw angular velocity signal as the output from the angular velocity sensor 310.

The process shown in FIG. 20 is executed once per field, and is executed at a timing after the process shown in FIG. 19 has been executed 10 times and before the next process starts, i.e., at the end of the current field.

When the process is started, the control waits until "m=0" in step S401. If 10 interrupt processes have been executed in the current field and m is reset, the correction amount calculated in step S304 is normalized in step S402. The normalized correction amount is obtained by calculating equations (4) and (5) in the second embodiment.

The arrangement of the fourth embodiment uses a PAL CCD (582 vertical pixels×752 horizontal pixels) in an NTSC camera. Upon extracting 485 vertical lines complying with NTSC from this CCD, the number of horizontal pixels to be extracted is 627 in relation to the aspect ratio. Hence, the number of extra pixels is 97 vertical pixels×125 horizontal pixels. Since the sign of the correction direction changes in correspondence with the direction of vibration, half the extra pixels are used in normalization.

In step S403, the limiting amount for limiting correction capability is calculated on the basis of the normalized correction amount calculated in step S402. In the fourth embodiment, the limiting amount that limits correction capability corresponds to the cutoff frequency of the high-pass filter 315c for band limitation. In step S403a, a limiting target cutoff frequency $f_c$ corresponding to the normalized correction amount is calculated. This target cutoff frequency $f_c$ is determined by characteristics shown in FIG. 21.

FIG. 21 shows the characteristics of the limiting amount that limits correction capability, i.e., the cutoff frequency $f_c$. The abscissa plots the normalized correction amount (%), and defines 100% correction amount when correction is done using pixels half the extra pixels as a maximum correction limit. The ordinate plots the cutoff frequency $f_c$ for band limitation as a parameter of the limiting amount. The cutoff frequency $f_c$ has characteristics that change the cutoff frequency as a function of the square of the correction amount. In order to prevent the target correction value from reaching the correction limit and the sensed image from being disturbed as the vibration angle increases, the characteristics shown in FIG. 21 set to sharply raise the cutoff frequency as the correction ratio comes close to the maximum correction limit.

It is then checked in step S403b if the target cutoff frequency $f_c$ calculated in step S403a is equal to or larger than the current cutoff frequency $f_c$. If the target cutoff frequency $f_c \geq$ the current cutoff frequency $f_c$, a "disable flag" is cleared. Note that the disable flag indicates whether to disable (stop) suppression of anti-vibration control (weakening of the anti-vibration effect), and is normally set when suppression becomes unnecessary, i.e., at the end of panning (when YES is determined in step S403c). The control is made in step S302 in FIG. 19 so as not to decrease the cutoff frequency $f_c$ before this flag is set. That is, the anti-vibration effect is inhibited from being enhanced by weakening the limiting strength. This is to mainly prevent hunching that may occur in anti-vibration limiting operation.

If it is determined in step S403b that the target cutoff frequency $f_c<$the current cutoff frequency $f_c$, to determine whether or not panning has ended it is checked in step S403c if the angular velocity signal output from the high-pass filter 315b has become smaller than a predetermined value γ. Since the output signal from the high-pass filter 315b is a signal before band limitation or focal length correction, vibration of the camera can be directly detected independently of the image sensing field angle, thus preventing hunching in limiting operation and relaxing different response characteristics in units of field angles.

Note that the predetermined value γ is determined by measuring the output level of the high-pass filter 315b at the end of panning in advance.

If it is determined in step S403c that the absolute value of the output from the high-pass filter 315b is equal to or larger than γ, the flow advances to step S403e; otherwise, the end of panning is determined, and the "disable flag" is set in step S403d. Since correction is not limited upon normal hand-held image sensing, the target and current cutoff frequencies $f_c$ become equal to each other in step S403b, and the "disable flag" remains cleared.

In such determination of image sensing situation upon panning, the limiting operation is controlled in step S302 in FIG. 19. It is checked in step S302a in FIG. 19 if the target cutoff frequency $f_c$=the current cutoff frequency $f_c$. If YES in step S302a, the flow advances to step S303 without changing the cutoff frequency. If NO in step S302a, it is checked in step S302b if the current cutoff frequency $f_c$ is smaller than the target value. If YES in step S302b, the current value has not reached the target value yet, and it is determined in step S403 in FIG. 20 that limitation is to be strengthened. In this case, the cutoff frequency $f_c$ is set to be larger by a predetermined value δ than the current value in step S302e. If it is determined in step S302b that the target value $f_c$ is smaller than the current value, it is checked in step S302c if the "disable flag" is set. If the disable flag is cleared, the current cutoff frequency $f_c$ is not decreased but is held, and the flow advances to step S303. If the disable flag=1, since panning has ended and the cutoff frequency can be decreased, the cutoff frequency is set to be smaller by a predetermined value ε than the current value in step S302d.

The process shown in FIG. 20 is executed at the field period, and the process shown in FIG. 19 is executed 10 times per field. In each control cycle, an increase/decrease in cutoff frequency $f_c$ is controlled in accordance with the rates of change of the predetermined values δ and ε used in steps S302d and S302e. The predetermined values δ and ε as the change rates are determined to obtain, e.g., limiting strength change characteristics shown in FIGS. 22A to 22C.

FIG. 22A shows preferable change characteristics of the cutoff frequency $f_c$ at the beginning of panning, and exemplifies a case wherein panning is started from a coordinate position 601 on the time axis. At the beginning of panning, the correction may reach the correction limit unless the cutoff frequency reaches the target value in a short response time. Since the image sensing frame is moving during panning, no image disturbance occurs even if the cutoff frequency is changed abruptly. Hence, the predetermined value δ for the beginning of panning is to be set at a relatively large value that can obtain a target limiting value in a short period of time, as indicated by a curve 602.

FIG. 22B shows a preferable change in limiting amount when panning ends at a coordinate position 603.

Referring to FIG. 22B, since the image sensing frame is nearly in a still state after the coordinate position 603, an abrupt change in cutoff frequency appears as a motion on the frame. On the other hand, when correction capability is increased immediately after the end of panning, the anti-vibration control begins to correct an angular displacement signal 1202 shown in FIG. 28C, and rebound occurs. In the fourth embodiment, in order to avoid such problems, the predetermined value ε is determined to set slow response characteristics, i.e., to slowly change the cutoff frequency, as indicated by a curve 604 in FIG. 22B.

In the fourth embodiment, the predetermined values δ and ε as the change rate data of the cutoff frequency have been explained as constants. However, the change rate data may be a time function or a function of the cutoff frequency. For example, by utilizing the fact that a change is hardly observed when the cutoff frequency is high, suppression capability of anti-vibration is quickly raised to some extent to obtain high response characteristics, and is then raised gradually, as indicated by a characteristic curve 605 in FIG. 22C, thus preferably realizing natural anti-vibration control with respect to camera work.

Referring back to FIG. 20, in step S404 the target position coordinates ($V_0$, $H_0$) of the extraction position are calculated based on the correction signal (f*tanθ) calculated in step S303 in FIG. 19. Note that the target position is given by equations (1) and (2) of the third embodiment, thus obtaining the numbers of pixels to be moved in vibration correction.

In step S405, a command that includes the target position coordinates ($V_0$, $H_0$) calculated in step S404 as the extraction position is output to the CCD drive circuit 316 and memory control circuit 314, and the flow returns to step S401 to prepare for the next field. Then, the control waits until integration repeats itself 10 times.

To restate, according to the fourth embodiment, since a limiting operation determination means is provided, and different signals are referred upon enabling and disabling limiting operation, hunching in limiting operation, i.e., an unstable change in limiting effect, can be prevented. Also, since a signal before focal length correction is referred to upon disabling the limiting operation, identical response characteristics of limiting amount suppression can be set at the most wide-scopic and telescopic positions. Furthermore, since different limiting strength change rates are used at the beginning and end of limiting operation, the influence of a change in limiting strength on the image and rebound can be suppressed while assuring high response characteristics upon panning, thus realizing natural camera work at every image sensing field angles.

Modification of Fourth Embodiment

The fourth embodiment has been explained with reference to the arrangement using a PAL CCD and line memory. Alternatively, correction may be done by controlling the position of an extracted image using a field memory, a large-scale or ultra high-resolution type CCD that requires no enlargement control may be used, or an optical correction means may be used. In this embodiment, angular velocity sensors are used as vibration detection means. Alternatively, acceleration sensors may be used. In such case, another integration process need only be added inside or outside the anti-vibration control microcomputer.

The vibration angular displacement is calculated by software in the description of FIG. 17, but may be calculated by hardware. The characteristics to be limited are determined as a function of the correction amount. However, the characteristics may be determined by calculations using equations or may be pre-stored as a data table.

Fifth Embodiment

The fourth embodiment has exemplified the band limiting means of a vibration signal by changing the cutoff frequency of a high-pass filter as a limiting means. The fifth embodiment uses a change in feedback ratio in integration as a limiting means. Note that the limiting means is not limited to such specific means. For example, correction capability may be limited by changing the correction gain. In this case, even when the detection means is a motion vector detection means, the present invention can be applied.

Figure 23:
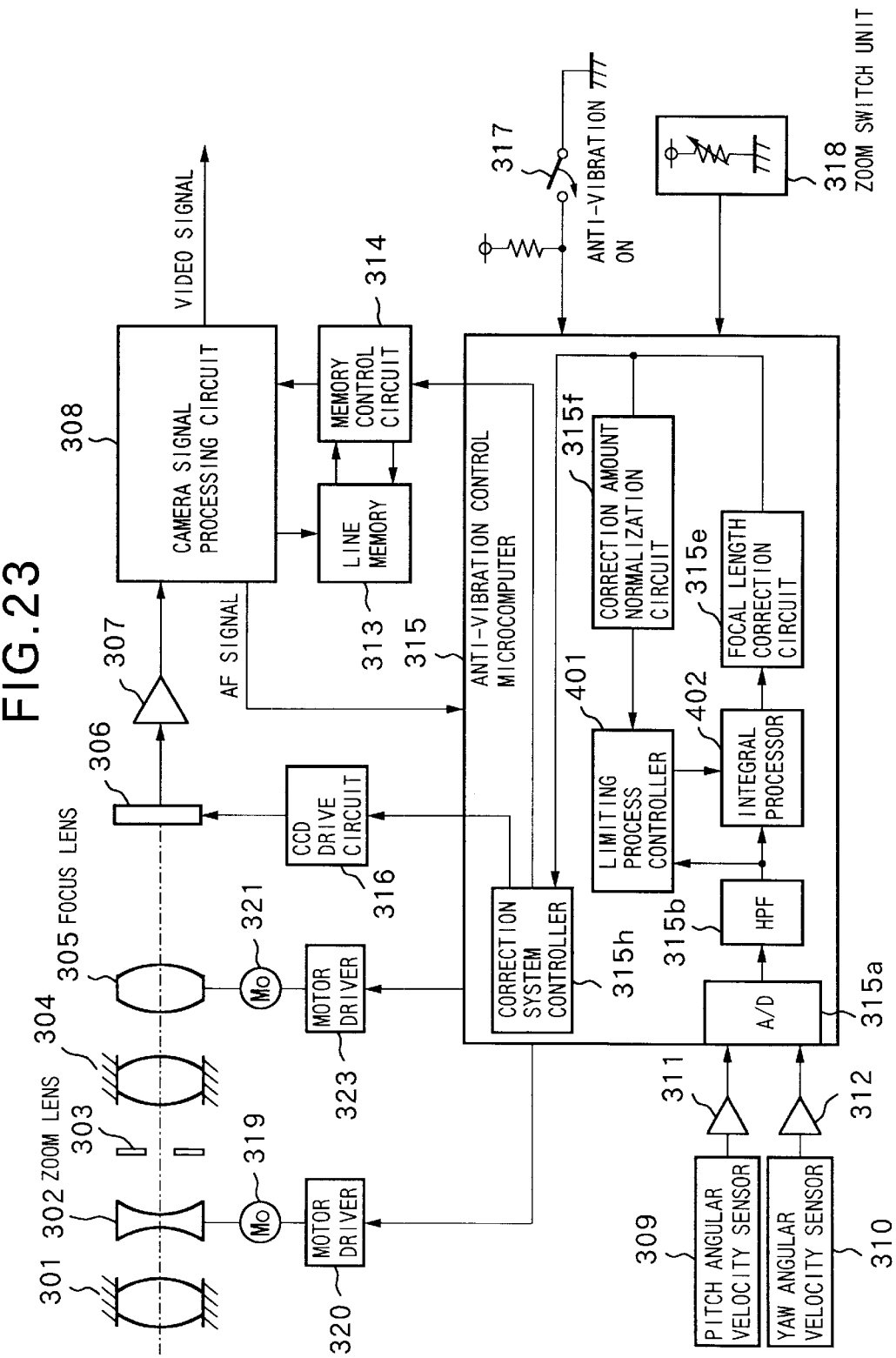
FIG. 23 is a block diagram showing the arrangement of an image sensing apparatus according to the fifth embodiment of the present invention.

FIG. 23 is a block diagram showing the arrangement of an image sensing apparatus according to the fifth embodiment. Note that the same reference numerals in FIG. 23 denote the same parts as those in the fourth embodiment, and a detailed description thereof will be omitted.

As shown in FIG. 23, the angular velocity sensors 309 (pitch direction) and 310 (yaw direction) detect the vibration angular velocities of the camera main body. The detected vibration angular velocities are respectively amplified by the amplifiers 311 and 312, and are sampled by the A/D converter 315a in the anti-vibration control microcomputer 315. The DC component is cut from the sampled angular velocity signals by the high-pass filter 315b, and those signals are integrated by an integral processor 402 to be converted into angular displacements. Each vibration angle θ calculated by the integral processor 402 is corrected by the focal length correction unit 315e in correspondence with a focal length f of the optical system to calculate a correction signal given by f*tanθ. The correction system controller 315h corrects vibration by moving an image in a direction opposite to its moving direction due to vibration in correspondence with the correction signal (corresponding to a pixel moving amount on the image sensing element 306 due to the vibration) as an output signal of the focal length correction unit 315e. Note that the integral processor 402 receives an integral feedback amount determined by a limiting process controller 401. The limiting process controller 401 varies the feedback ratio to change the gain characteristics of the integral processor 402, thereby achieving band limitation. The correction signal calculated by the focal length correction unit 315e is normalized by the correction amount normalization unit 315f, and the limiting process controller 401 controls the integral processor 402 in accordance with the normalized correction amount and the output from the high-pass filter 315b, thus limiting anti-vibration capability upon panning.

Figure 24:
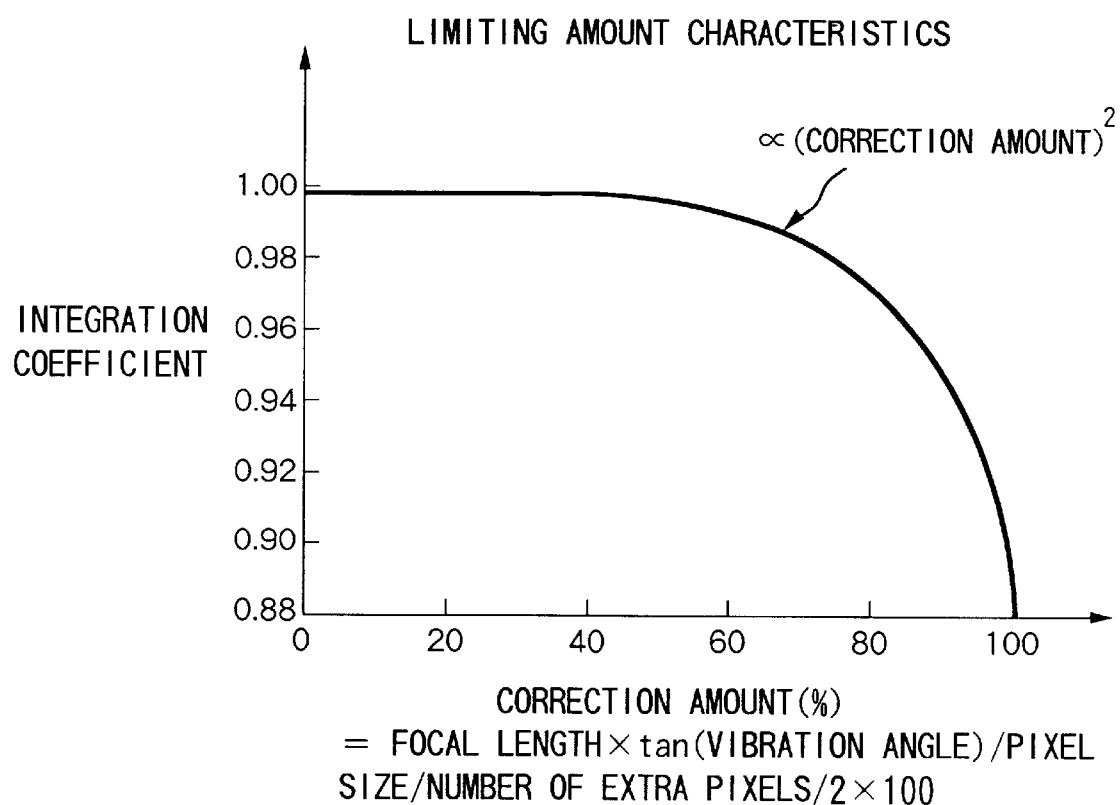
FIG. 24 is a graph showing the limiting amount characteristics of the fifth embodiment.

In the limiting control of the fifth embodiment, the integral feedback ratio is set as a change parameter in place of the cutoff frequency $f_c$ for band limitation in the flow charts shown in FIGS. 19 and 20 in the fourth embodiment. Of the comparison and addition/subtraction steps in the processes pertaining to the cutoff frequency $f_c$ in step S302 in FIG. 19 and step S403 in FIG. 20, the sense of the inequality is reversed, an addition and subtraction are replaced each other, and the limiting parameter change characteristics (FIG. 21) in step S403a in FIG. 20 are replaced by those shown in FIG. 24, thus obtaining the same effects as in the fourth embodiment. In addition, since the number of times of computations of the high-pass filter process in an interrupt process can be smaller than that in the fourth embodiment, the load on the anti-vibration control microcomputer can be reduced.

Sixth Embodiment

Figure 28:
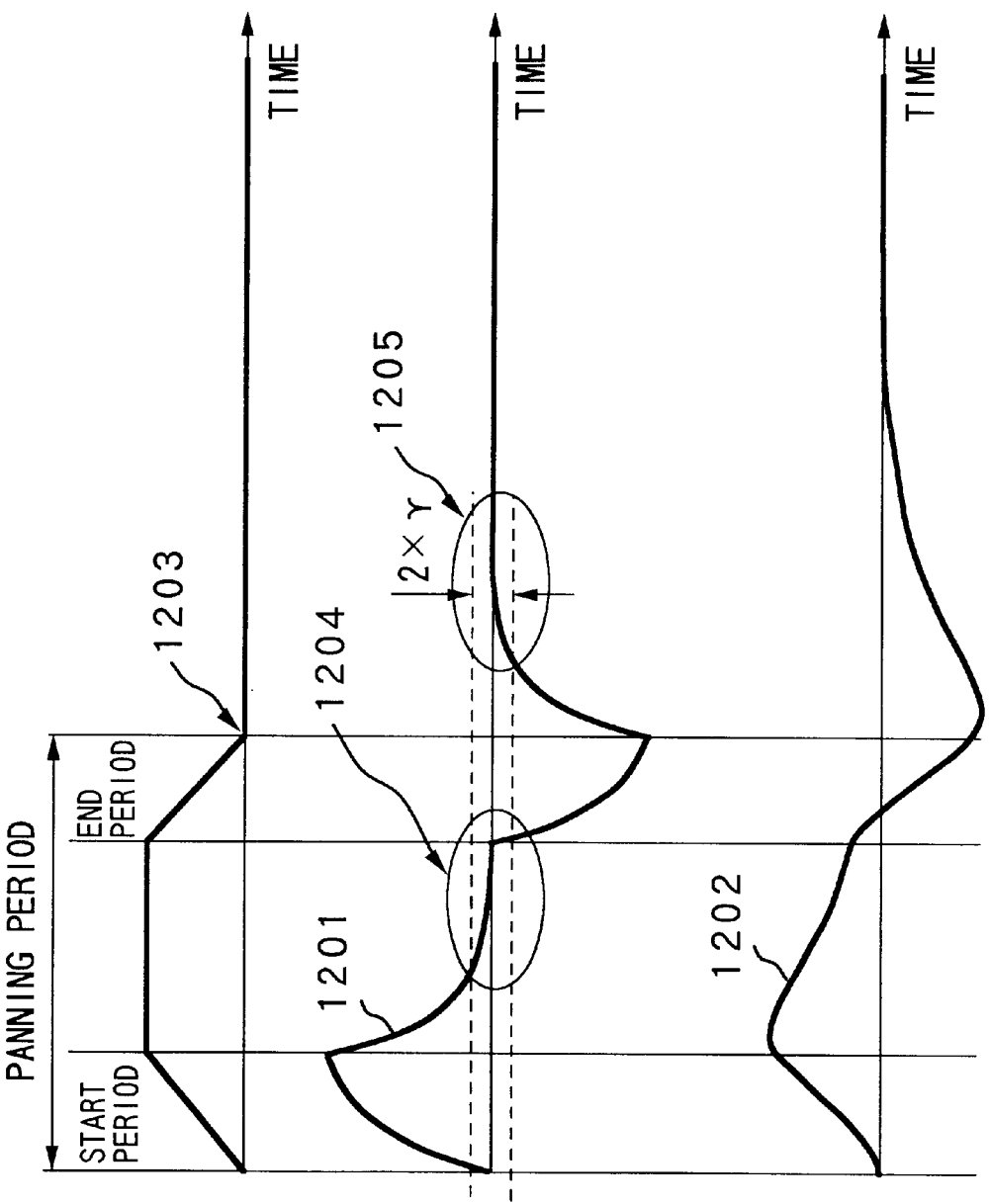
FIGS. 28A to 28C are explanatory views showing the limiting disable timing of the sixth embodiment.

In the fourth and fifth embodiments, the output (1201 in FIG. 28B) from the high-pass filter 315b is referred to upon determining whether or not limitation is disabled. For this reason, if it is determined in step S403c in FIG. 20 that the absolute value level of the output from the high-pass filter 315b is equal to or smaller than the predetermined value γ, one of states 1204 or 1205 shown in FIG. 28B is detected (the state 1204 is detected before the end of panning, and the state 1205 is detected a predetermined period of time after the end of panning). One of these limiting disable timings is determined depending on the image sensing situation such as panning speed, panning time, and the like. For this reason, when the limitation on the anti-vibration control is disabled at the timing 1204, rebound readily occurs; when the limitation is disabled at the timing 1205, the response characteristics are impaired.

In order to solve this problem, the sixth embodiment will explain a method of determining using a signal before the high-pass filter process if limitation is disabled will be explained. Note that the DC component of the signal before the high-pass filter process may change in correspondence with the signal output level. Hence, the sixth embodiment will also explain a method of reliably detecting the end of panning without being influenced by a change in DC component.

Figure 25:
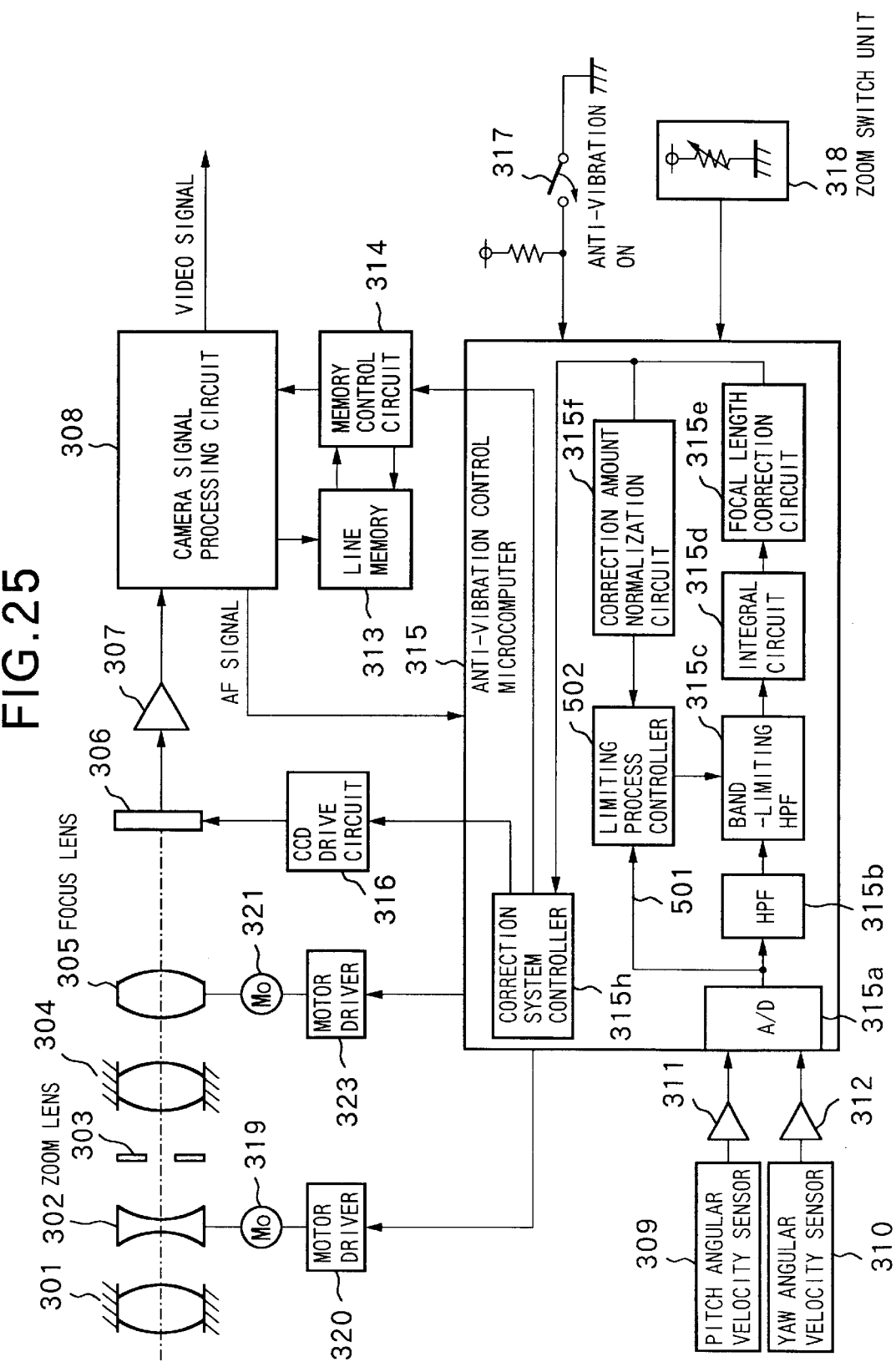
FIG. 25 is a block diagram showing the arrangement of an image sensing apparatus according to the sixth embodiment of the present invention.

FIG. 25 is a block diagram showing the arrangement of an image sensing apparatus according to the sixth embodiment. Note that the same reference numerals in FIG. 25 denote the same parts as those in the fourth embodiment, and a detailed description thereof will be omitted. As shown in FIG. 25, the angular velocity sensors 309 (pitch direction) and 310 (yaw direction) detect the vibration angular velocities of the camera main body. The detected vibration angular velocities are respectively amplified by the amplifiers 311 and 312, and are sampled by the A/D converter 315a in the anti-vibration control microcomputer 315. The DC component is cut from the angular velocity signals by the high-pass filter 315b, and the bands of those signals are limited by the high-pass filter 315c. The band-limited signals are converted into angular displacements by integration in the integral processor 315d. Each vibration angle θ calculated by the integral processor 402 is corrected by the focal length correction unit 315e in correspondence with a focal length f of the optical system to calculate a correction signal given by f*tanθ. The correction system controller 315h corrects vibration by moving an image in a direction opposite to its moving direction due to vibration in correspondence with the correction signal (corresponding to a pixel moving amount on the image sensing element 306 due to the vibration) as an output signal of the focal length correction unit 315e. Note that reference numeral 315c denotes a high-pass filter for band limitation. A limiting process controller 502 controls the high-pass filter 315c in accordance with a normalized correction amount normalized by the correction amount normalization unit 315f and an output signal 501 from the A/D converter 315a to limit anti-vibration capability upon panning. Using this signal 501, the end of panning is detected. The output signal 501 upon panning changes like an angular velocity signal shown in FIG. 29A. Using that output signal 501, the end of panning can be determined more reliably, and the timing of an end time 1203 (FIG. 28C) can be detected more accurately.

The anti-vibration control flow of the sixth embodiment processed by the anti-vibration control microcomputer 315 will be explained below using the flow charts shown in FIGS. 26 and 27.

Figure 26:
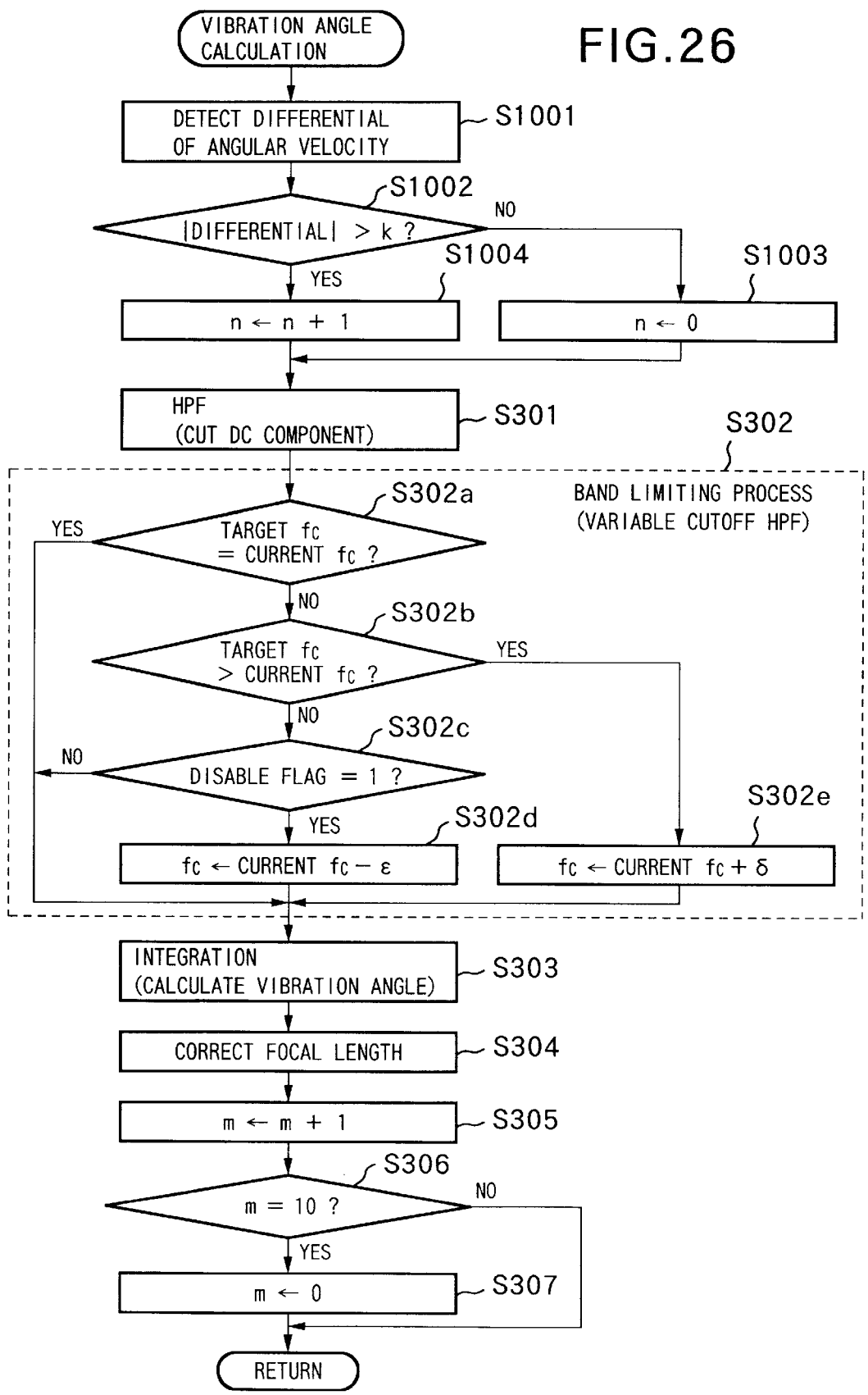
FIG. 26 is a flow chart showing anti-vibration control of the sixth embodiment.
Figure 27:
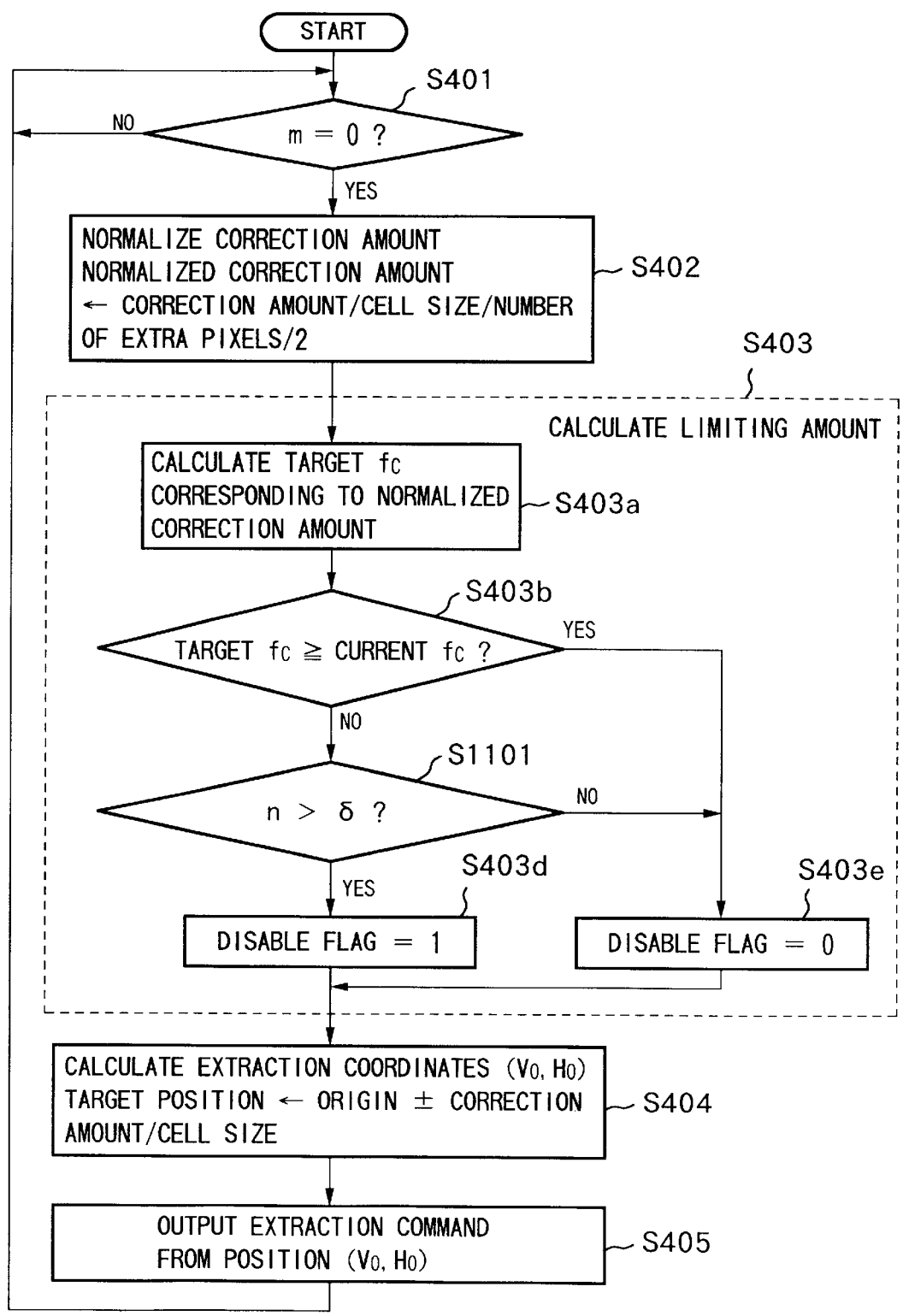
FIG. 27 is a flow chart showing anti-vibration control of the sixth embodiment.

Note that the processing flows shown in FIGS. 26 and 27 have substantially the same processing contents as those in FIGS. 19 and 20. Hence, the same step numbers denote the same processes as those in the fourth embodiment, and a detailed description thereof will be omitted.

Figure 29:
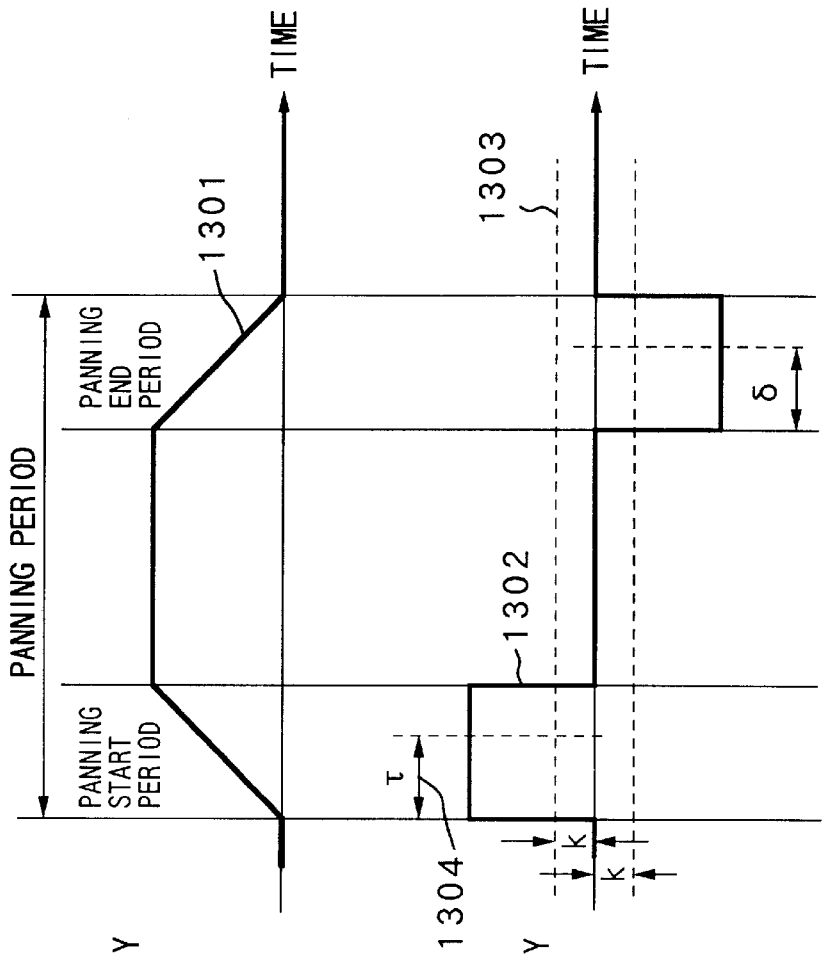
FIGS. 29A and 29B are explanatory views showing determination of the panning period in the sixth embodiment.

As a feature of the sixth embodiment, the end of panning is determined with reference to the angular velocity signal before DC component removal. Also, in order to detect only slope portions (panning start and end periods) of an angular velocity signal 1301 shown in FIG. 29A without being influenced by DC component variations of the reference signal, it is checked with reference to a time change signal 1302 of angular velocity if the signal level remains equal to or larger than a predetermined value k for a predetermined time τ or more, as shown in FIG. 29B, thereby determining the start or end of panning. With this determination method, even when the DC component amount varies in correspondence with the output level of the angular velocity sensor, such variation can be distinguished from the start or end of panning using features, i.e., a small variation amount and long variation time constant.

In the fourth and fifth embodiments, the end of panning is determined using the output signal from the high-pass filter 315b, and the same kind of signal as the time change signal 1302 of the angular velocity shown in FIG. 29B is obtained. However, the high-pass filter 315b has a cutoff frequency lower than 1 Hz and a long time constant so as not to cut off the shake signal but to cut off only the DC component. By contrast, the signal 1302 in FIG. 29B is defined as an angular acceleration signal generated by, e.g., differentiation with a short time constant (in the sixth embodiment, the signal is calculated as an angular velocity signal difference for a predetermined period of time).

The flow chart of FIG. 26 shows a process for calculating angular displacements by integrating angular velocity signals detected by the angular velocity sensors 309 and 310, which is similar to the process shown in FIG. 19. Note that this process is executed by a program pre-stored in a ROM (not shown.) in accordance with an instruction from the anti-vibration control microcomputer 315. The difference from the process shown in FIG. 19 is as follows. That is, before the high-pass filter process for removing the DC component in step S301, the output signal from the A/D converter 315a is differentiated in step S1001 (in this embodiment, a difference from the previous sampling value is calculated), and it is checked in step S1002 if the absolute value of the calculated differential is larger than a predetermined value k (a threshold 1303 in FIG. 29B). If the absolute value is equal to or smaller than k, counter n for measuring the panning shift time is cleared in step S1003. If the absolute value is larger than k, counter n is incremented in step S1004.

This counter n for measuring the panning shift time indicates the duration in which the angular acceleration signal level is equal to or higher than k. For example, when the duration is equal to or longer than τ indicated by 1304 in FIG. 29B, the start or end of panning is determined. As a feature of the sixth embodiment, limiting control is done using the output from the unit 315f at the beginning of panning in consideration of the response characteristics, and whether or not limiting control is disabled is determined at the end of panning with reference to the angular acceleration signal. Hence, if it is determined in step S1101 in FIG. 27 that the count value of time measurement counter n is larger than a predetermined value θ, the flow advances to step S403d to set the "disable flag" that permits to disable limiting control. After that, correction capability is controlled to strengthen in step S302 in FIG. 26.

Advantages of Fourth to Sixth Embodiments

As described above, according to the fourth to sixth embodiments, an image sensing apparatus comprises detection means for detecting vibration, correction signal generation means for generating a correction signal used for correcting a motion of an image due to the vibration detected by the detection means, correction means for correcting in accordance with the correction signal, and limiting means for limiting correction in correspondence with the correction signal. The limiting means includes limiting characteristics determination means for determining a limiting amount to obtain predetermined characteristics in correspondence with a change in correction signal, band limiting means for limiting a band of the correction signal in accordance with the determined limiting amount, and limiting operation determination means for determining using an input signal to the band limiting means and the correction signal whether or not the band limitation is to be made. Hence, hunching, i.e., an unstable change in limiting amount, can be prevented, and natural camera work can be realized at every image sensing field angles not only at the beginning or in the middle of panning, but also at the end of panning.

Also, an image sensing apparatus comprises an image sensing element for converting an optical image coming from a lens system into an electrical signal, detection means for detecting vibration, correction signal generation means for generating a correction signal used for correcting a motion of an image due to the vibration detected by the detection means in correspondence with a focal length of the lens system, correction means for correcting in accordance with the correction signal, limiting means for limiting correction to obtain predetermined characteristics in correspondence with a change in correction signal, and limiting operation determination means for determining using a signal before amplification by a gain corresponding to the focal length by the correction signal generation means, and the correction signal whether or not limiting operation is to be made. Thus, the same effects as described above can be obtained.

Furthermore, an image sensing apparatus comprises an image sensing element for converting an optical image coming from a lens system into an electrical signal, detection means for detecting vibration, correction signal generation means for generating a correction signal used for correcting a motion of an image due to the vibration detected by the detection means, correction means for correcting in accordance with the correction signal, limiting means for limiting correction to obtain predetermined characteristics in correspondence with a change in correction signal, and limiting operation determination means for determining using an output signal from the detection means, and the correction signal whether or not limiting operation is to be made. Thus, the same effects as described above can be obtained.

Seventh Embodiment

The seventh embodiment of the present invention will be explained below with the aid of FIGS. 30 to 39.

Figure 30:
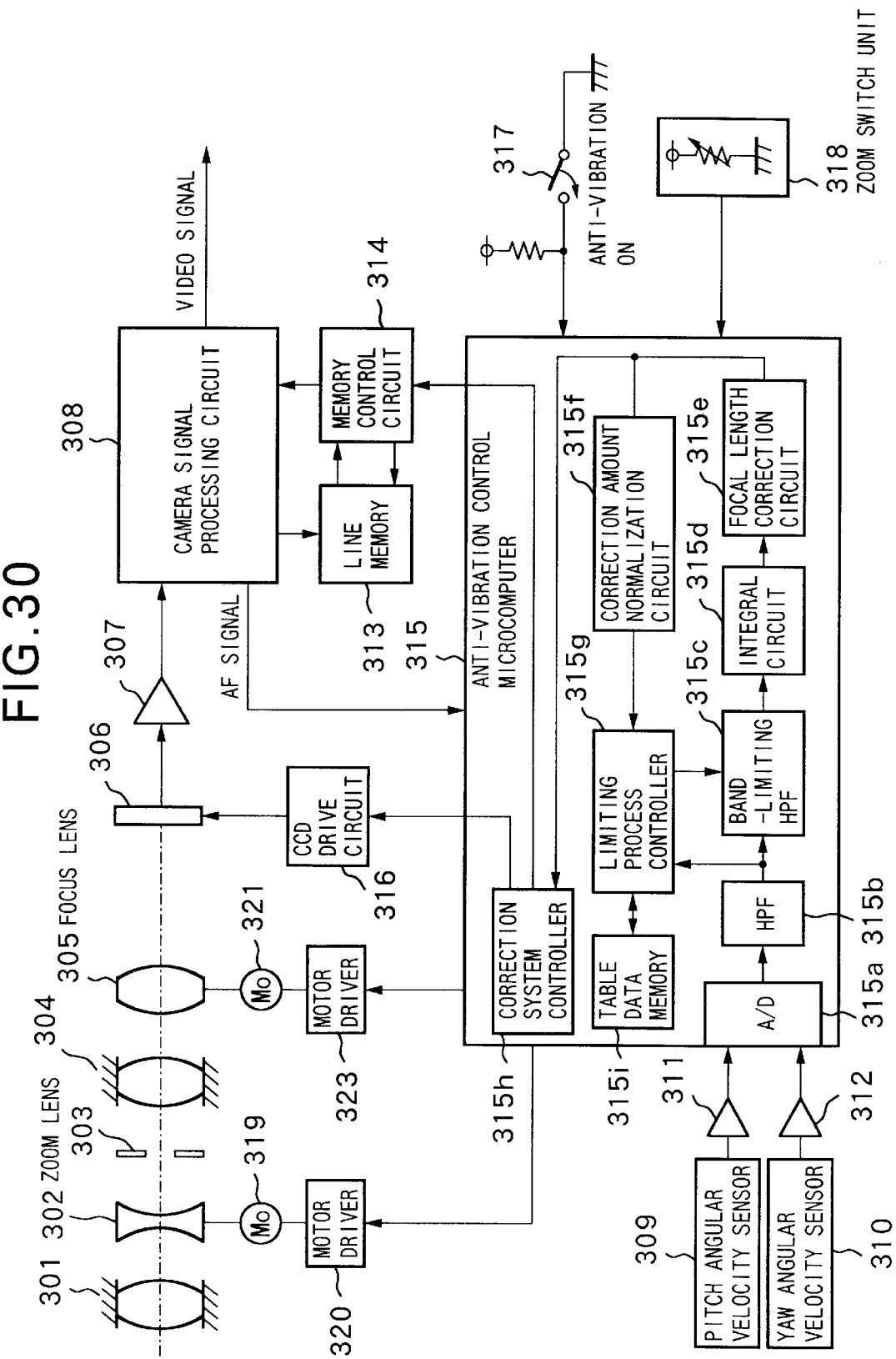
FIG. 30 is a block diagram showing the arrangement of an image sensing apparatus according to the seventh embodiment of the present invention.

FIG. 30 is a block diagram showing the arrangement of an image sensing apparatus according to the seventh embodiment. The arrangement shown in FIG. 30 is substantially the same as that of the fourth embodiment, except for the details of the control microcomputer 315.

In the control microcomputer 315, a vibration angle θ calculated by an integral circuit 315d is corrected by an amount corresponding to the focal length f of the optical system in a focal length correction circuit 315e to calculate a correction signal given by f×tanθ. A correction system controller 315h corrects vibration by moving an image in a direction opposite to its moving direction due to vibration in correspondence with the correction signal (corresponding to a pixel moving amount on an image sensing element 106 due to vibration) as an output signal from the focal length correction circuit 315e. Note that reference numeral 315c denotes a high-pass filter for band limitation (band-limiting HPF). The limiting process controller 315g controls the band-limiting HPF 315c in accordance with a normalized correction amount obtained by normalizing the correction signal by a correction amount normalization circuit 315f, and the output from an HPF 315b, thus limiting the suppression capability of anti-vibration upon panning.

The limiting operation will be described in detail later. As a feature of the seventh embodiment, filter coefficients (a, b) of the band-limiting HPF 315c are stored in a table data memory 315i as table data in units of cutoff frequencies, and each table data is formed to exhibit predetermined characteristics in correspondence with a change in table search look-up address. When anti-vibration control need be limited, the limiting strength is changed by selecting a filter coefficient corresponding to a desired cutoff frequency from this table.

The anti-vibration control of the seventh embodiment is electronically done by shifting the read region. Hence, a description about this read region will be omitted by quoting FIGS. 18A and 18B.

Also, a PAL CCD is used as the CCD for the same reason as in the fourth embodiment.

The anti-vibration control of the seventh embodiment processed by the anti-vibration control microcomputer 315 will be explained below with reference to FIGS. 31, 32, and 33.

The first object of the seventh embodiment is to realize natural vibration correction that does not disturb camera work and the sensed image by a simple limiting control method. As a feature of the seventh embodiment, band-limiting filter coefficients (a, b) are stored in the table data memory 315i as table data in units of cutoff frequencies, which data satisfy predetermined characteristics in correspondence with a change in table data search look-up address. Upon limiting control, a filter coefficient corresponding to a desired cutoff frequency is selected from this table to change the limiting strength.

The description of the control sequence of the seventh embodiment overlaps that of the processing of the anti-vibration control microcomputer 315 shown in FIG. 30. Although the anti-vibration control microcomputer 315 is illustrated as one building block in FIG. 30, it is implemented by a program in practice. Hence, the processing of the microcomputer 315 will be explained below as that of a program using FIGS. 31 and 32.

Figure 31:
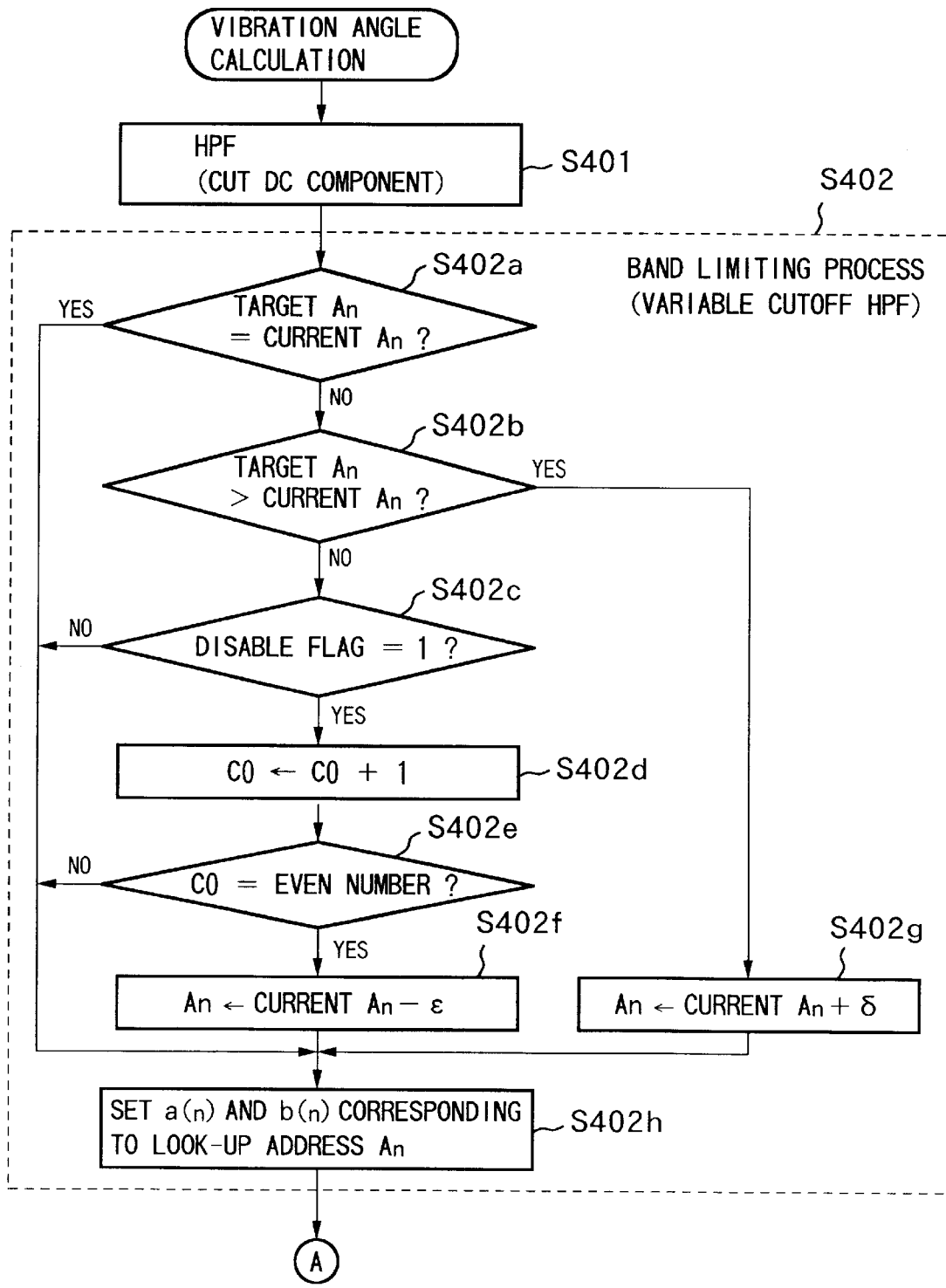
FIG. 31 is a flow chart showing the anti-vibration control sequence of the image sensing apparatus of the seventh embodiment.
Figure 32:
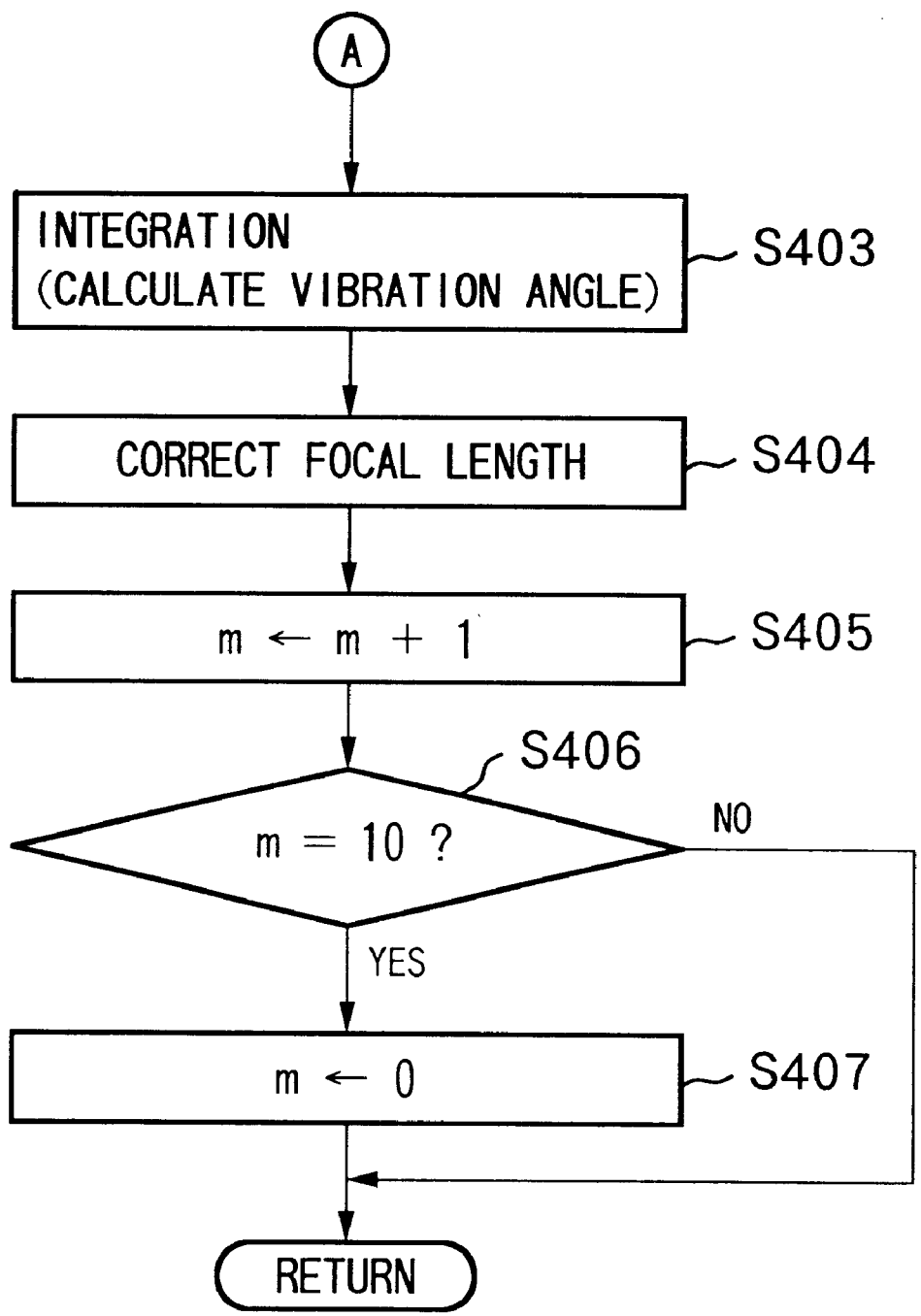
FIG. 32 is a flow chart showing the anti-vibration control sequence of the image sensing apparatus of the seventh embodiment.

FIGS. 31 and 32 are flow charts showing the anti-vibration control sequence, i.e., a process for calculating angular displacements by integrating angular velocity signals detected by the angular velocity sensors 309 and 310. This process is an interrupt process executed at predetermined periods in response to an instruction from the anti-vibration control microcomputer 315. In the seventh embodiment, the interrupt process is executed at a frequency 10 times the field frequency, i.e., at 600 Hz in case of NTSC. This frequency corresponds to the sampling frequency of angular velocity signals, and the calculation frequency of angular displacements. An interrupt start event in the anti-vibration control microcomputer 315 is produced, for example, every time a counter that counts up (or down) oscillation clocks at a predetermined frequency division ratio reaches a count value that matches data corresponding to 1/600 sec. As has been described in FIG. 30, an A/D converter (not shown) in the anti-vibration control microcomputer 315 samples the angular velocity signals. In this embodiment, assume that the operation mode of the A/D converter 315a is a scan mode, i.e., the A/D converter always repeats A/D conversion, for the sake of simplicity.

Referring to FIGS. 31 and 32, when an interrupt process is started, the influence of the DC component is removed by processing an A/D-sampled angular velocity signal via the high-pass filter in step S401. Step S402 is a process for limiting the frequency band of an angular velocity signal of AC components, and includes steps S402a to S402e (step S402 will be explained in detail later in the description of FIG. 33). The process in step S402 is attained by substantially the same high-pass filter process as that in step S401 in practice, except that the cutoff frequency is fixed in step S401 but is variable in step S402. By changing the cutoff frequency from the low- to high-frequency side, band limitation can be achieved. How to control the cutoff frequency in step S402 will be explained later in combination with the flow chart in FIG. 33. For example, the cutoff frequency is increased to lower the suppression capability of anti-vibration during camera work such as panning or the like, and is decreased to obtain a sufficient vibration correction effect in normal image sensing. In order to prevent an unnatural image from being formed when a correction limit is reached to correct vibration larger than the upper limit of the vibration correction range, the band limitation control is also executed.

In step S403, angular displacements are calculated by integrating the angular velocity signals band-limited in step S402. Each calculated angular displacement corresponds to a vibration angle θ acting on the camera main body (image sensing apparatus main body). In step S404, focal length correction is executed to calculate the correction amount for vibration correction. As mentioned above, the correction amount calculated is given by f×tanθ in accordance with each angular displacement obtained in step S403, i.e., a vibration angle θ and a focal length f of the optical system.

The processes in steps S403 to S407 form a processing routine for checking if the vibration angle has been calculated 10 times per field. More specifically, "m" as a register of a calculation count parameter is incremented in step S405, and it is checked in step S406 if "m=10" i.e., if an interrupt has been generated 10 times. If an interrupt has been generated 10 times, "m" is reset to "0" in step S407 to prepare for the next field, thus ending this process.

On the other hand, if it is determined in step S406 that the interrupt has not been generated 10 times yet, the control skips step S407, and ends this process.

Note that in steps S401 to S404 a vertical vibration signal is processed using a pitch angular velocity signal as the output from the angular velocity sensor 309, and a horizontal vibration signal is processed using a yaw angular velocity signal as the output from the angular velocity sensor 310.

Figure 33:
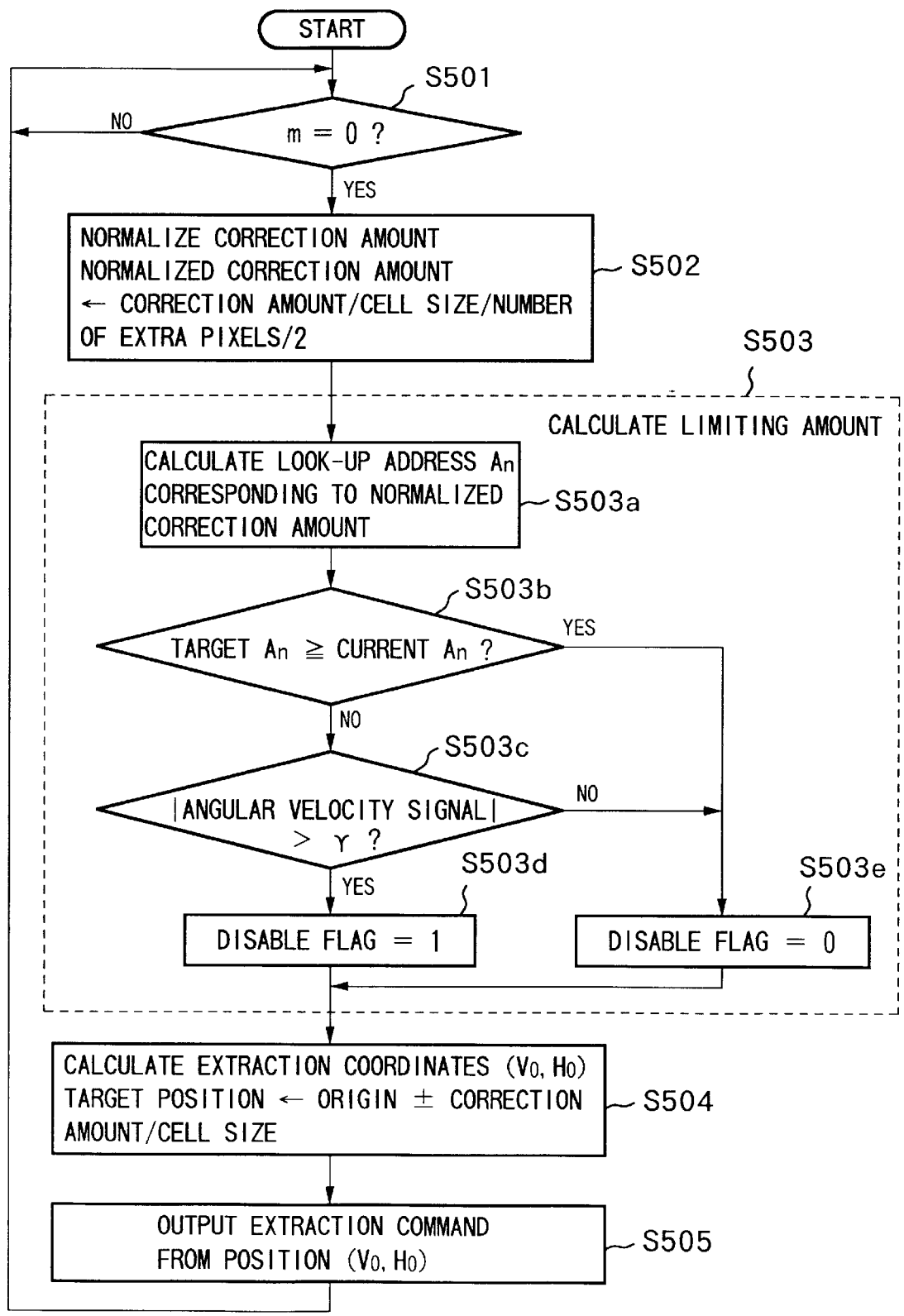
FIG. 33 is a flow chart showing the anti-vibration control sequence of the image sensing apparatus of the seventh embodiment.

The process shown in the flow of FIG. 33 is executed once per field, and is executed at a timing after the process shown in FIGS. 31 and 32 has been executed 10 times and before the next process starts, i.e., at the end of the current field.

Referring to FIG. 33, when the process is started, the control waits until "m=0" in step S501. If 10 interrupt processes have been executed in the current field and m is reset, the correction amount calculated in step S404 in FIGS. 31 and 32 is normalized in step S502.

The normalized pitch and yaw correction amounts are calculated by equations (6) and (7) in the first modification mentioned above.

The image sensing apparatus of the seventh embodiment uses a PAL CCD (582V×752H) in combination with an NTSC camera. Upon extracting 485 vertical lines complying with NTSC from this CCD, the number of vertical pixels to be extracted is 627 in relation to the aspect ratio. Hence, the extra pixel block is defined by 97V×125H. Since the sign of the correction direction changes in correspondence with the direction of vibration, half the extra pixels are used in normalization.

The next step S503 is a process for calculating a look-up address used for reading out a limiting amount that limits correction capability from the memory 315i, on the basis of the normalized correction amount calculated in step S502, and includes steps S503a to S503e. Note that the limiting amount includes filter coefficients (a, b) corresponding to the cutoff frequency of the band-limiting high-pass filter 315c.

In step S503a, a look-up address $A_n$ corresponding to the normalized correction amount is calculated. The look-up address $A_n$ is used for looking up a data table in the data table memory 315i, and a limiting target cutoff frequency is stored at that address. This target look-up address $A_n$ is determined by characteristics shown in FIG. 34.

Figure 34:
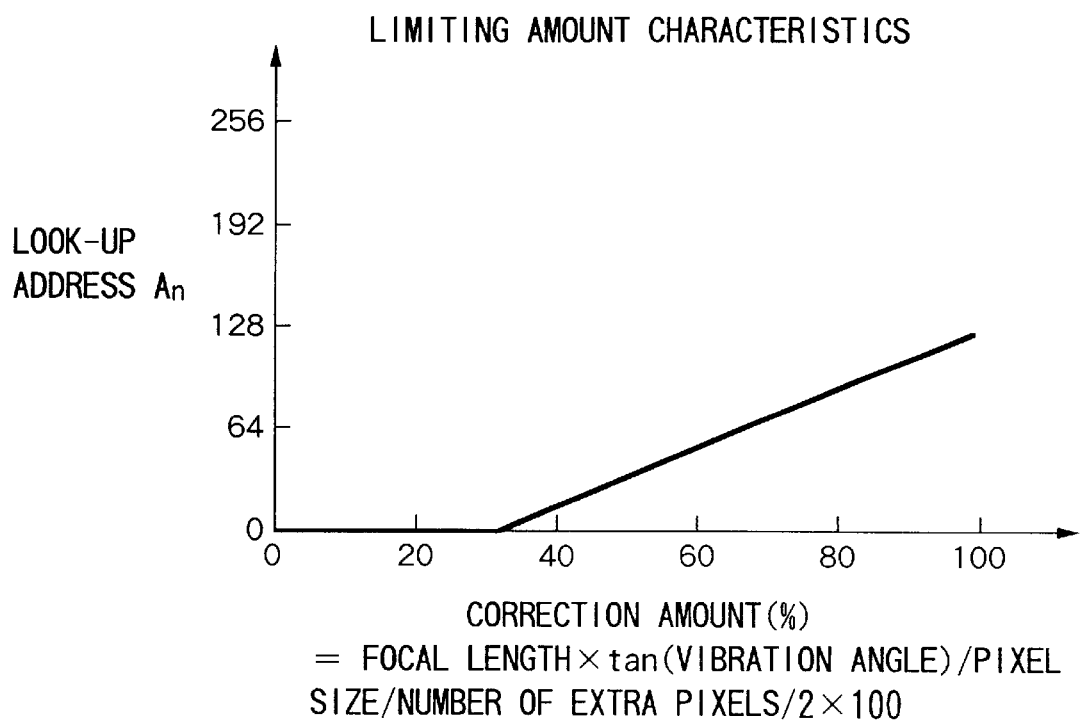
FIG. 34 is a graph showing the relationship between the correction amount and lookup address in the image sensing apparatus of the seventh embodiment.

FIG. 34 shows the characteristics of the target look-up address as a function of the normalized correction amount. In FIG. 34, the abscissa plots the normalized correction amount, which assumes 100% when correction is done using all pixels half the extra pixels that correspond to a maximum correction limit. The ordinate plots the look-up address used for searching the data table in the data table memory 315i. This embodiment uses characteristics that proportionally change the look-up address when the correction amount is 30% or more. When the correction amount is 100%, a look-up address "128" is selected, and the cutoff frequency at that time is 6 Hz. This is because the vibration frequency is 5 Hz or less in practice, as has been described previously in the prior art.

Figure 35:
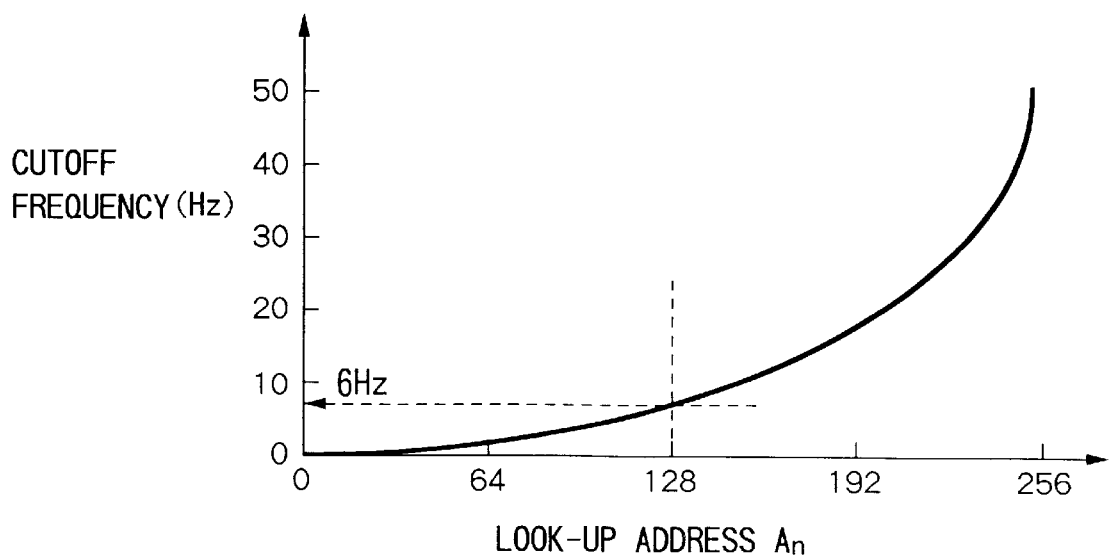
FIG. 35 is a graph showing the relationship between the lookup address and cutoff frequency in the image sensing apparatus of the seventh embodiment.

FIG. 35 shows the relationship between the look-up address $A_n$ and cutoff frequency $f_c$. In FIG. 35, the abscissa plots the normalized correction amount, and the ordinate plots the cutoff frequency. Referring to FIG. 35, a higher cutoff frequency is set as the look-up address becomes larger. Then, filter coefficients (a, b) corresponding to the cutoff frequency are read out from the data table in the data table memory 315i. The relationship between the look-up address and cutoff frequency is defined by characteristics that change the cutoff frequency as a function of the square of the address $A_n$. In order to also prevent the sensed image from being disturbed upon reaching a correction limit as the vibration angle becomes larger, the characteristics shown in FIG. 34 are set to sharply increase the cutoff frequency as the correction ratio comes closer to the maximum correction limit.

Figures 36, 37:
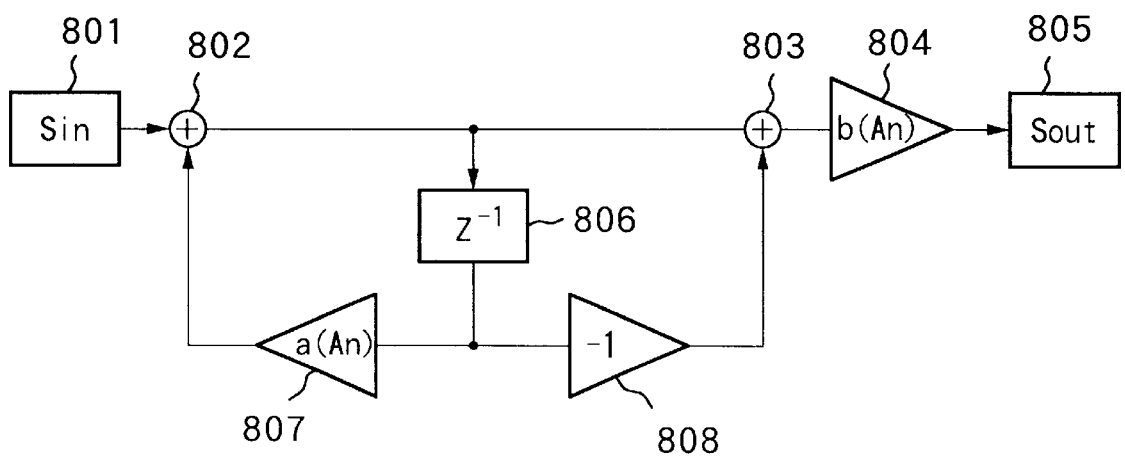
FIG. 36 shows an example of a data table in a data table memory in the image sensing apparatus of the seventh embodiment.
FIG. 37 is a block diagram showing the arrangement of a band-pass processor in the image sensing apparatus of the seventh embodiment.

FIG. 36 shows an example of the data table in the data table memory 315i. The data table memory 315i stores two kinds of variables, i.e., filter coefficients $a(A_n)$ and $b(A_n)$, as data sequences in correspondence with the look-up addresses, and filter coefficients $a(A_n)$ and $b(A_n)$ are prepared in advance by calculations in association with required cutoff frequencies. Note that the data table shown in FIG. 36 stores multiplication coefficients that achieve the high-pass filter characteristics shown in FIG. 21, and FIG. 37 shows the arrangement of a filter that gives such characteristics.

Referring to FIG. 37, reference numeral 801 denotes input data ($S_{in}$); 806, a storage unit for data ($Z^{-1}$) in the previous sampling period; and 807, a first multiplier circuit which multiplies the data ($Z^{-1}$) in the previous sampling period by a filter coefficient $a(A_n)$. Reference numeral 802 denotes a first adder circuit which adds the input data Sin 801 to the product of the filter coefficient $a(A_n)$ and the data ($Z^{-1}$) in the previous sampling period in the storage unit 806. Let c be this output data. Reference numeral 808 denotes an inverter circuit which inverts the sign of the data ($Z^{-1}$) in the previous sampling period in the storage unit 806. Reference numeral 803 denotes a second adder circuit which adds the output data c to the sign-inverted data ($-Z^{-1}$) in the previous sampling period. Reference numeral 804 denotes a second multiplier circuit for multiplying ($c-Z^{-1}$) by a filter coefficient $b(A_n)$. Reference numeral 805 denotes final output data ($S_{out}$) of the high-pass filter, i.e., the output from the second multiplier circuit 804. On the other hand, the intermediate data (output data) c is stored as the data ($Z^{-1}$) in the previous sampling period in the storage unit 806 for the next computation. By executing a series of computations at a predetermined cycle, a high-pass filter is implemented.

As shown in FIG. 37, the look-up address is determined in correspondence with a change in correction amount upon panning, and the filter coefficients $a(A_n)$ and $b(A_n)$ are selected from the data table in the data table memory 315$i$ in accordance with the determined address, thus changing the cutoff frequency.

Referring back to FIG. 33, it is checked in step S503$b$ if the target look-up address $A_n$ calculated in step S503$a$ is equal to or larger than the current look-up address $A_n$. If the target look-up address $A_n$ is equal to or larger than the current look-up address $A_n$, the "disable flag" is cleared in step S503$e$, and the flow then advances to step S504. Note that the disable flag is the same as that used in other embodiments, and is set upon completion of panning. Before this flag is set, control is made in step S502 in FIGS. 31 and 32 so as not to lower the cutoff frequency, i.e., not to decrease the look-up address $A_n$. This process inhibits the anti-vibration effect from being enhanced by weakening the limiting strength, so as to prevent hunching of limiting operation.

On the other hand, if it is determined in step S503$b$ that the target look-up address $A_n$ is smaller than the current look-up address $A_n$, to determine whether or not panning has ended it is checked in step S503$c$ if the angular velocity signal output from the high-pass filter 315$b$ is smaller than a predetermined value $\gamma$. Since the output signal from the high-pass filter 315$b$ is a signal before band limitation or focal length correction, vibration of the camera can be directly detected independently of the image sensing field angle, thus preventing hunching in limiting operation and relaxing different response characteristics in units of field angles.

Note that the predetermined value $\gamma$ is determined by measuring the output level of the high-pass filter 315$b$ at the end of panning in advance, as in the above embodiment.

If it is determined in step S503$c$ that the absolute value of the output from the high-pass filter 315$b$ is equal to or larger than $\gamma$, it is determined that panning is continuing and the flow advances to step S503$e$; otherwise, the "disable flag" is set in step S503$d$. Since correction is not limited upon normal hand-held image sensing, the target and current look-up addresses $A_n$ are equal to each other in step S503$b$, the "disable flag" remains cleared.

In such determination of the image sensing situation upon panning, the limiting operation is controlled in step S402 in FIGS. 31 and 32. It is checked in step S402$a$ in FIG. 31 if the target look-up address $A_n$ is equal to the current look-up address $A_n$. If YES in step S402$a$, the flow advances to step S402$h$ to read out the filter coefficients $a(A_n)$ and $b(A_n)$ corresponding to the same cutoff frequency as the current one from the table and to set these coefficients in the band-limiting HPF315$c$. Then, the flow advances to step S403.

On the other hand, if it is determined in step S402$a$ that the target and current look-up addresses $A_n$ are not equal to each other, it is checked in step S402$b$ if the current look-up address $A_n$ is smaller than the target look-up address $A_n$. If the current look-up address $A_n$ is smaller than the target look-up address $A_n$, the current look-up address $A_n$ has not reached the target look-up address $A_n$ yet, and it is determined in step S503 in FIG. 33 that the limiting strength is to be increased. In such case, the look-up address $A_n$ is set to be larger by a predetermined value $\delta$ than the current value in step S402$g$ in FIG. 32, and the flow then advances to step S402$h$.

On the other hand, if it is determined in step S402$b$ that the target look-up address $A_n$ is smaller than the current look-up address $A_n$, it is checked in step S402$c$ if the "disable flag" is set. If the disable flag is cleared, the current look-up address value is held not to lower the cutoff frequency, and the flow advances to step S402$h$.

If it is determined in step S402$c$ that the disable flag=1, since panning has ended and the cutoff frequency can be decreased, counter C0 is incremented in step S402$d$ and it is then checked in step S402$e$ if counter C0 assumes an even value. If counter C0 assumes not an even value but an odd value, the flow advances to step S402$h$; otherwise, the look-up address is set to be smaller by a predetermined value $\epsilon$ than the current value in step S402$f$. Counter C0 delays the change cycle of the look-up address $A_n$ compared to that at the beginning of panning so as to reduce any change in cutoff frequency at the end of panning. In step S402$h$, the filter coefficients corresponding to the re-set look-up address $A_n$ are read out to update the setups of the band-limiting HPF 315$c$.

Figure 38:
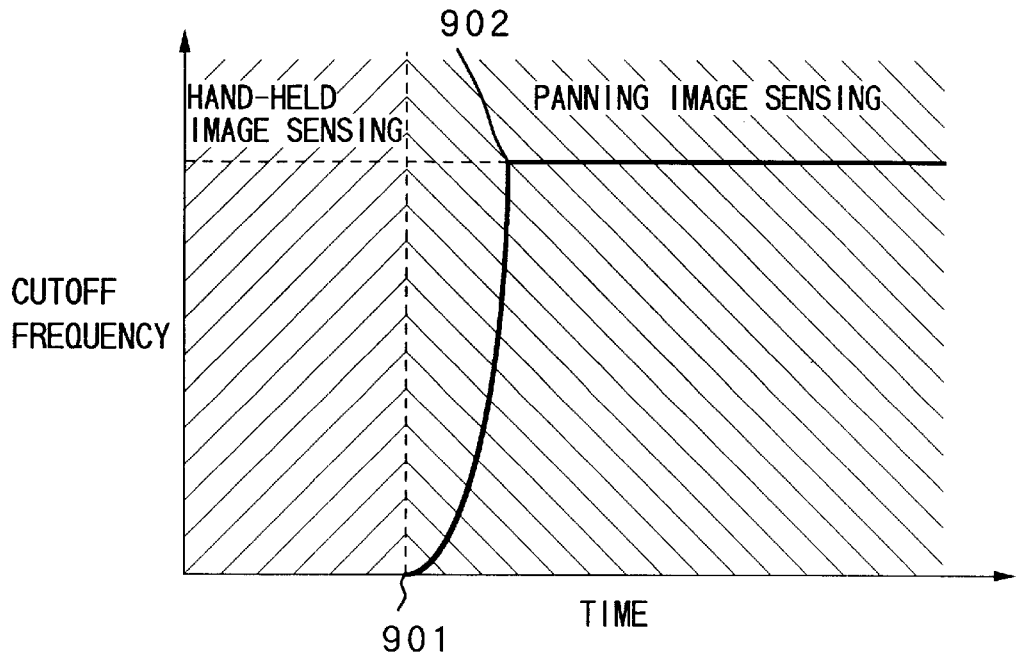
FIG. 38 is a graph showing the change characteristics of the cutoff frequency at the beginning of panning (image sensing) in the image sensing apparatus of the seventh embodiment.
Figure 39:
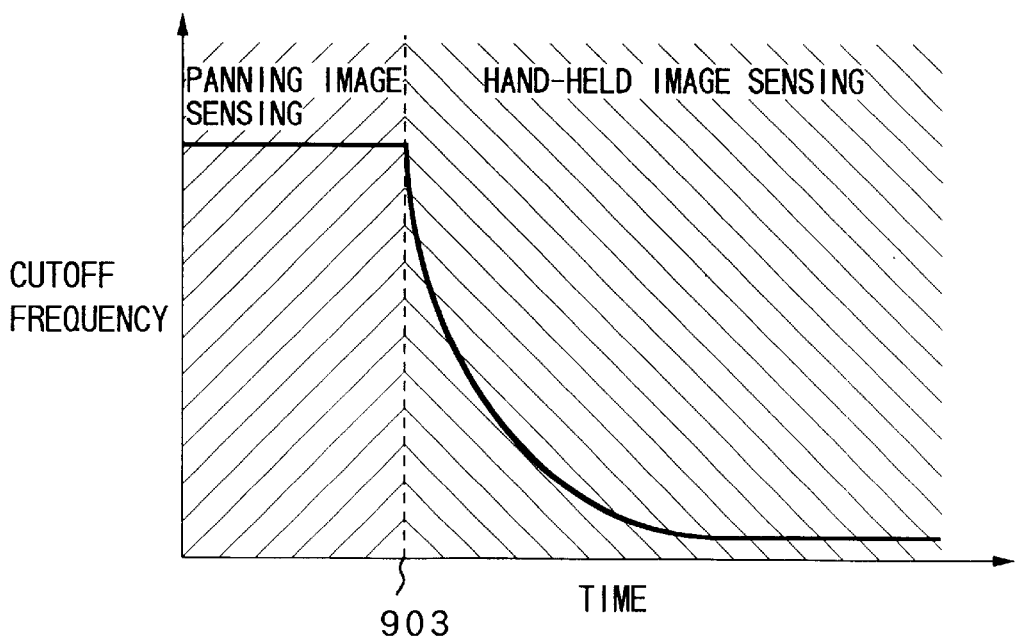
FIG. 39 is a graph showing the change characteristics of the cutoff frequency at the end of panning (image sensing) in the image sensing apparatus of the seventh embodiment.

The process shown in FIG. 33 is executed at a field period, and the process shown in FIGS. 31 and 32 is executed 10 times per field. In each control cycle, an increase/decrease in look-up address $A_n$ is controlled in accordance with the rates of change of the predetermined values $\delta$ and $\epsilon$ used in steps S402$f$ and S402$g$. The predetermined values $\delta$ and $\epsilon$ as the change rates are determined to obtain, e.g., limiting strength change characteristics shown in FIGS. 38 and 39. In FIGS. 38 and 39, the abscissa plots time, and the ordinate plots the cutoff frequency.

FIG. 38 shows the change characteristics of the cutoff frequency at the beginning of panning (image sensing), and exemplifies a case wherein panning is started from time 901. At the onset of panning, the correction may reach a correction limit unless the cutoff frequency reaches the target value in a short response time. Since the image sensing frame is moving during panning, no image disturbance occurs even if the cutoff frequency is changed abruptly. Hence, the predetermined value $\delta$ assumes a relatively large value to obtain a target limiting amount within a short period of time like at time 902.

FIG. 39 shows a case wherein panning ends at time 903. Since the image sensing frame is nearly in a still state after time 903, an abrupt change in cutoff frequency appears as a motion on the frame. On the other hand, when correction capability is increased immediately after the end of panning, rebound occurs. To solve these problems, the predetermined value $\epsilon$ is determined to lower the response characteristics at the end of panning and to slowly change the cutoff frequency, as indicated by a curve 904. As a result, the change cycle is twice that at the beginning of panning.

In the seventh embodiment, the change cycle of the look-up address at the end of panning is twice that at the beginning of panning. However, the present invention is not limited to such specific change cycle. For example, the change cycle need only be set to prevent rebound and to prevent a change in band limitation from forming an unnatural image.

In the method of the seventh embodiment, the predetermined values $\delta$ and $\epsilon$ are constants, and the look-up address changes linearly. With this method, the cutoff frequency as a band-limiting parameter consequently changes in accordance with the characteristics shown in FIG. 35, and the limiting target cutoff frequency corresponding to the correction amount and the change locus to the target cutoff frequency can be changed according to identical characteristics. Hence, a change locus 162 shown in FIG. 10A does not form, and an image can be prevented from being disturbed by a change in cutoff frequency.

In addition, the control process can be implemented by simple computations, i.e., addition/subtraction of the look-up addresses, and a system can be configured using a lower-cost microcomputer.

Referring back to FIG. 33, in step S504 target position coordinates ($V_0$, $H_0$) of the extraction position are calculated based on the correction signal (f×tanθ) calculated in step S503 in FIGS. 31 and 32. Note that the target position is given by equations (1) and (2) of the third embodiment, thus obtaining the numbers of pixels to be moved in vibration correction.

In step S505, a command that includes the target position coordinates ($V_0$, $H_0$) calculated in step S504 as the extraction position is output to the CCD drive circuit 316 and memory control circuit 314, and the flow returns to step S501 to prepare for the next field. Then, the control waits until integration repeats itself 10 times.

As described above, according to the seventh embodiment, a plurality of band-limiting data that define predetermined characteristics in correspondence with the cutoff frequency used in limiting operation are prepared as a ROM table, the table data look-up address is controlled in correspondence with the vibration correction amount, and the amount and cycle of a change in table data look-up address are controlled in accordance with the current camera operation state. Hence, an inexpensive microcomputer can be selected, and parallel processes with other processes can be made. In addition, the response characteristics of the limiting operation at the beginning of panning can be improved, and rebound that is likely to occur at the end of panning can be prevented. Furthermore, the limiting strength and its change rate can be determined using identical characteristics, thereby preventing a motion of an image due to a change in limiting strength upon panning, and realizing natural camera work at every image sensing field angles.

Note that the seventh embodiment has been explained with reference to an arrangement using a PAL CCD and line memory. Alternatively, correction may be done by controlling the position of an extracted image using a field memory, a large-scale or ultra high-resolution type CCD that requires no enlargement control may be used, or an optical correction means may be used.

In the seventh embodiment, angular velocity sensors are used as vibration detection means. Alternatively, acceleration sensors may be used. In such case, another integration process need only be added inside or outside the anti-vibration control microcomputer.

In the seventh embodiment, the vibration angular displacement is calculated by software, but may be calculated by hardware.

Moreover, the seventh embodiment has exemplified band limitation using a high-pass filter as a limiting means. Alternatively, integral feedback coefficients and gain coefficients in the integral circuit 315d may be prepared as table data, and band limitation may be implemented by integration.

To restate, according to the image sensing method and apparatus of the seventh embodiment, since data are selected from a band-limiting data table that defines limiting operation to obtain predetermined characteristics, a plurality of data that pertain to band limitation can be simultaneously acquired, and the computation time required for calculating the data can be omitted. Hence, even in anti-vibration control processed at high speed, an inexpensive microcomputer can be selected, and parallel processes with other processes (focus adjustment, exposure adjustment, and the like) can be done, thus selecting a simple system.

According to the image sensing method and apparatus of the seventh embodiment, since the amount and cycle of a change in look-up address used for searching the data table are changed in correspondence with the pertinent image sensing situation, limiting operation can be quickly done at the beginning of panning, and rebound that readily takes place at the end of panning can be prevented.

Furthermore, according to the image sensing method and apparatus of the seventh embodiment, especially, since limiting control determines the target value by selecting data from the data table with predetermined characteristics and determines the look-up address so it reaches the target value, the limiting strength and its change rate can be determined using identical characteristics. Hence, any movement of an image due to a change in limiting strength upon panning can be prevented, and natural camera work can be realized at every image sensing field angles.

Moreover, according to a storage medium of the seventh embodiment, the aforementioned image sensing apparatus can be smoothly controlled.

Eighth Embodiment

Figure 40:
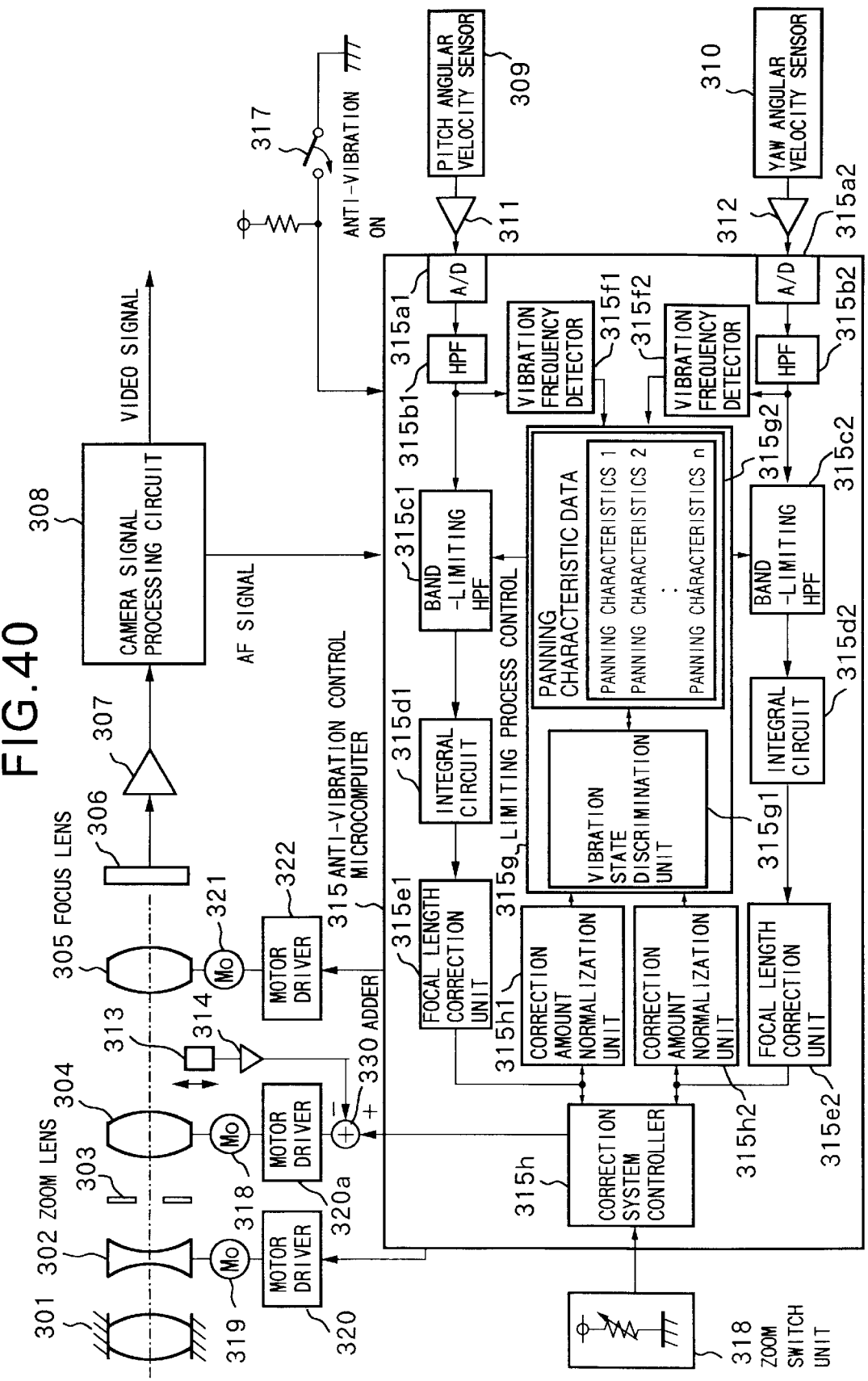
FIG. 40 is a block diagram showing an arrangement according to the eighth embodiment of the present invention.

The eighth embodiment of the present invention will be described below with reference to the drawings. FIG. 40 is a block diagram showing the arrangement according to the eighth embodiment of the present invention, in which a video camera has an optical anti-vibration function. The hardware arrangement of the image sensing apparatus of the eighth embodiment is substantially the same as that of the fourth embodiment, except for the details inside an anti-vibration control microcomputer 315.

A lens unit has an inner focus type arrangement, and is composed of a first stationary lens 301, zoom lens 302, stop 303, second stationary lens 304, and focus lens 305. Light coming from the lens is imaged on an image sensing element 306 such as a CCD or the like, and the output from the image sensing element 306 is amplified to optimal level by an amplifier 307. The amplified signal is input to a camera signal processing circuit 308, and is converted into a standard television signal. The camera shown in FIG. 40 has an optical shake correction function, which is turned on/off by detecting the status of a switch 324.

Angular velocity sensors 309 (pitch direction) and 310 (yaw direction) serving as vibration detection means detect the vibration angular velocities of the camera main body. The detected vibration angular velocities are respectively amplified by amplifiers 311 and 312, and are sampled by A/D converter $315a_1$ and $315a_2$ in an anti-vibration control microcomputer 315. Angular velocity signals from which the DC components are cut by high-pass filters $315b_1$ and $315b_2$ are band-limited by band-limiting HPFs $315c_1$ and $315c_2$. These angular velocity signals are then converted into angular displacements by integration in integrators $315d_1$ and $315d_2$. Vibration angles θ calculated by the integrators $315d_1$ and $315d_2$ are corrected by an amount corresponding to a focal length f of the optical system in focal length correction units $315e_1$ and $315e_2$ to calculate correction signals given by f*tanθ.

A correction system controller 315*h* corrects vibration by moving the shift lens 304 in the pitch and yaw directions perpendicular to the optical axis, so that the correction signals (moving amounts of a sensed image due to vibration on the image sensing element) as the output signals from the focal length correction units $315e_1$ and $315e_2$ in a direction opposite to the image moving direction due to the vibration. These correction system controller 315*h* and shift lens 304 construct a correction means that corrects motion of an image. The shift lens 304 is controlled as follows. That is, with respect to a correction target signal output from the microcomputer 315, an adder 316 compares a position signal of the shift lens 304 (i.e., a position signal obtained by amplifying a detection signal of an encoder 313 to a predetermined level by an amplifier 314) with a correction target from the controller 315*h*, and a drive signal is output to a motor 318 via a motor driver 317 to obtain zero difference, thus loop-controlling the position of the lens 304 to match a target position. The correction system controller 315*h*, shift lens 304, and its control system construct a correction means that corrects motion of an image due to vibration.

Note that a limiting process controller 315*g* controls the band-limiting high-pass filters $315c_1$ and $315c_2$ in accordance with normalized correction amounts obtained by normalizing the correction signals by correction amount normalization units $315h_1$ and $315h_2$, and vibration frequencies detected by vibration frequency detectors $315f_1$ and $315f_2$, thereby limiting the suppression capability of anti-vibration upon panning.

The limiting process controller 315*g* has a vibration state discrimination unit $315g_1$ and stores panning characteristic data (limiting characteristics) $315g_2$. In accordance with the normalized correction amount signals and vibration frequency signals input to the limiting process controller 315*g*, the vibration state discrimination unit $315g_1$ discriminates the image sensing situation, and the limiting process controller 315*g* selects panning characteristics optimal to that image sensing condition from the panning characteristic data $315g_2$ and controls the cutoff frequency as a band-limiting parameter of the band-limiting HPFs $315c_1$ and $315c_2$ in accordance with the selected characteristics, thereby determining the limiting amount and limiting suppression capability of anti-vibration upon panning. The limiting amount determination process corresponds to a limiting means in the appended claims of the present invention. The limiting operation will be explained in detail later.

The anti-vibration control microcomputer 315 also controls the zoom lens 302 and focus lens 305. In response to a signal from a rotary zoom switch 318, the resistance of which changes in correspondence with the pressure inflicted, the anti-vibration control microcomputer 315 sends a drive command to a motor 319 via a motor driver 320, thus moving the zoom lens 302 to zoom. Also, the anti-vibration control microcomputer 315 sends a drive command to a motor 321 via a motor driver 323 to maximize the level of a focus signal, which is processed by a camera signal processing circuit 308 and has as a focus evaluation value a high-frequency component or the like in a video signal, thus moving the focus lens 305 to an in-focus point to adjust the focus.

The flow of anti-vibration control of the eighth embodiment processed by the anti-vibration control microcomputer 315 will be explained below using FIGS. 41 and 42. The objective of the present invention is to implement smooth panning and high suppression capability of anti-vibration by selecting optimal anti-vibration characteristics in correspondence with each image sensing situation. For this purpose, the eighth embodiment comprises means, having a plurality of pre-stored panning characteristics (limiting characteristics that limit the suppression capability of anti-vibration), for determining the image sensing situation, automatically selecting optimal panning characteristics in correspondence with that image sensing situation, and executing anti-vibration control.

The plurality of pre-stored panning characteristics contain characteristics which set different panning characteristics in the pitch and yaw directions, so as to cope with an image sensing situation different from normal hand-held image sensing.

The following description of the processing flow overlaps that of the processing of the anti-vibration control microcomputer 315 shown in FIG. 40. Although the anti-vibration control microcomputer 315 is illustrated as one building block in FIG. 40, it is implemented by a program in practice. Hence, the processing of the microcomputer 315 will be explained below as that of a program.

The flow chart shown in FIG. 41 is a process for calculating angular displacements by integrating angular velocity signals detected by the angular velocity sensors 309 and 310 to calculate the correction amounts and limiting amounts. However, for the sake of simplicity, the flow chart in FIG. 41 shows a process routine executed for one angular velocity sensor, and the same process as that in FIG. 41 applies to the other angular velocity sensor output. The process shown in FIG. 41 is an interrupt process executed by the anti-vibration control microcomputer 315 at a predetermined period, e.g., at a frequency of 1 kHz. An interrupt start event in the anti-vibration control microcomputer 315 is produced, for example, every time a counter that counts up (or down) oscillation clocks at a predetermined frequency division ratio reaches a count value that matches data corresponding to 1 msec. As has been described in FIG. 40, the A/D converter in the anti-vibration control microcomputer 315 samples the angular velocity signals. In the eighth embodiment, assume that the operation mode of the A/D converter is a scan mode, i.e., the A/D converter always repeats A/D conversion, for the sake of simplicity.

The interrupt process is started in step S601, and the influence of the DC component is removed by processing the A/D-converted angular velocity signal via the high-pass filter in step S602 to extract only the vibration component. In step S603, the vibration frequency is detected from the DC-cut angular velocity signal. Frequency detection in the vibration frequency detectors $315f_1$ and $315f_2$ is done by converting the angular velocity signal into an angular displacement by integration, and detecting the number of times the displacement direction of the angular displacement signal changes within a predetermined period of time, i.e., i.e., the vibration frequency.

The vibration frequency detected in step S603 is used in vibration state discrimination in step S608 (to be described later), thus discriminating the image sensing condition.

The process in step S604 limits the frequency band of the angular velocity signal as the vibration component, i.e., the AC component. In practice, this process is substantially the same high-pass filter process in step S602, except that the cutoff frequency is fixed in step S602 but is variable in step S604, and the cutoff frequency is changed in accordance with instruction information from the limiting process controller 315*g*. By changing the cutoff frequency from the low- to high-frequency side, band limitation can be achieved. The cutoff frequency is controlled as follows. That is, when the cutoff frequency is increased to lower the suppression capability of anti-vibration during camera work such as panning or the like, the centering strength of the position of the shift lens 304 is increased to realize smooth camera work. On the other hand, the cutoff frequency is decreased to the neighborhood of shake frequency to obtain a sufficient shake removal effect in normal image sensing.

In order to also prevent an unnatural image from being formed when the correction limit is reached upon correcting vibration beyond the upper limit of the correction range, the band limitation control is executed.

In step S605, angular displacement is calculated by integrating the band-limited angular velocity signal by the integrator $315d_1$ or $315d_2$. The calculated angular displacement corresponds to a vibration angle acting on the camera main body.

In step S606, the correction amount is calculated. The correction amount is given by $f*\tan\theta$ in accordance with the angular displacement obtained by the process in step S605, i.e., the vibration angle $\theta$ and the focal length f of the optical system. In step S607, the correction amount calculated in step S606 is normalized by a maximum correction limit (the movement limit of the shift lens 304). The normalized correction amount is calculated by equations (1) and (2) above.

Step S608 is a vibration state discrimination routine for discriminating the image sensing situation on the basis of the normalized correction amount calculated in step S607 and the vibration frequency detected in step S603, and the vibration state discrimination unit $315g_1$ executes a discrimination process shown in the flow chart of FIG. 42.

In step S608, the vibration state is discriminated by the process in steps S701 to S716 shown in FIG. 42. It is checked in step S701 if the vibration frequency in the pitch direction detected in step S603 is equal to or higher than 20 Hz, i.e., if on-vehicle image sensing for sensing an image on, e.g., a vehicle on the move is done.

In case of on-vehicle image sensing, at least vibration in the pitch direction is caused by those resulting from vibrations of an engine or traveling, and frequency components of 20 Hz or higher dominate. On the other hand, in case of normal hand-held image sensing, the vibration frequency ranges from about 1 Hz to 5 Hz.

If YES in step S701, it is checked in step S702 if the value of counter M is equal to or larger than a predetermined value $\rho$. If $M \leq \rho$, counter M is incremented in step S703.

Hence, when vibration of 20 Hz or more continues, the value of counter M becomes larger than $\rho$, and in that case, the flow advances to step S714 to determine on-vehicle image sensing.

Note that counter M measures the duration of vibration of 20 Hz or higher, or the duration of vibration less than 20 Hz. If this counter is monitored and predetermined duration $\rho$ has elapsed, it is determined that "on-vehicle image sensing is done" or "on-vehicle image sensing is not done".

In case of hand-held image sensing, NO is determined in step S701, and the flow advances to step S704. It is checked in step S704 if the value of counter M is zero. If NO In step S704, counter M is decremented in step S705, and the control enters the process starting from step S706; otherwise, i.e., if M=0, the flow advances to step S706.

In steps S706 to S711, a tripod image sensing discrimination process is executed. In steps S706 and S707, it is checked if the vibration frequency in the pitch/yaw direction is 1 Hz or less and the vibration amplitude (corresponding to the correction amount normalized in step S607) is smaller than a predetermined value $\omega$. If vibration has a low frequency and very small amplitude, it is checked in step S708 if the value of counter N is larger than a predetermined value $\gamma$. If YES in step S708, tripod image sensing is determined in step S715.

If NO in step S708, counter N is incremented in step S709, and the flow advances to step S712. Note that counter N measures the duration of vibration "which has a frequency of 1 Hz or less and very small amplitude" or vibration "which has neither a frequency of 1 Hz or less nor very small amplitude". If this counter is monitored and predetermined duration $\gamma$ has elapsed, it is determined that "tripod image sensing is done" or "tripod image sensing is not done".

Note that tripod image sensing has a feature that a still state is detected in both the pitch and yaw directions, and both the vibration frequency and amplitude assume values in the neighborhood of zero, and discrimination is done based on such feature. In this embodiment, the discrimination frequency is set at 1 Hz and the discrimination amplitude is set at $\omega$. However, the present invention is not limited to such specific values, and these values can be determined in correspondence with the sensitivity (gain) of the angular velocity sensor used.

On the other hand, normal hand-held image sensing has a feature different from that of tripod image sensing, since the vibration frequency ranges from around 1 Hz to 5 Hz and the vibration has an amplitude equal to or larger than the predetermined value.

If the vibration frequency is larger than 1 Hz (step S706), or if the vibration amplitude is equal to or larger than the predetermined value $\omega$ (step S707), it is checked in step S710 if the value of counter N is zero. If NO in step S710, counter N is decremented in step S711, and the flow advances to step S712; otherwise, i.e., if N=0, the flow directly advances to step S712.

It is checked in steps S712 and S713 if counters M and N are zero. If one of the values of these counter is not zero, the control exits this process, and advances to step S609 in FIG. 41.

On the other hand, if the values of both the counters are zero, normal hand-held image sensing is determined in step S716.

Steps S712 and S713 are set to keep the previous mode setups even when the on-vehicle, tripod, or hand-held mode instantaneously shifts to a vibration state that indicates another mode, unless the new vibration state continues for an extended period of time.

This is to smoothly attain mode shift by providing hysteresis to mode switching.

Note that the flow advances from step S703 or S705 to the process starting from step S706 to achieve quick shift response between the on-vehicle mode and tripod mode. For example, with this process, upon on-vehicle image sensing using a camera set on a tripod, mode shift "on-vehicle→tripod" that may take place when the vehicle is stopped or the engine is turned off, or mode shift "tripod→on-vehicle" that may take place when the vehicle begins to run or the engine is started can be achieved within a shortest period of time.

When hand-held image sensing is started from the power-ON timing of the camera, since both counters M and N assured on a RAM are reset, i.e., M=N=0, the hand-held image sensing mode is set in step S716.

Referring back to FIG. 41, in step S609 limiting characteristics that limit correction capability are selected from the panning characteristic data $315g_2$ on the basis of the vibration state determined in step S608, and the limiting amount is calculated in accordance with the selected limiting characteristics. If the on-vehicle mode is determined in step S609a, the limiting amount is calculated by selecting panning characteristics I in step S609c. If the tripod mode is determined in step S609b, a limiting amount is calculated by selecting panning characteristics III in step S609e. On the other hand, if the tripod mode is not determined in step S609b, a normal hand-held mode is determined, and the limiting amount is calculated by selecting panning characteristics II in step S609d. The process in step S609 is executed by the limiting process controller 315g, and the determined limiting amount is reflected in step S604 in the next interrupt process. Note that the limiting amount corresponds to the cutoff frequency that has been explained in the band limiting process in step S604, and the limiting characteristics based on the respective panning characteristics are as shown in FIGS. 44A to 44C.

Figure 44A:
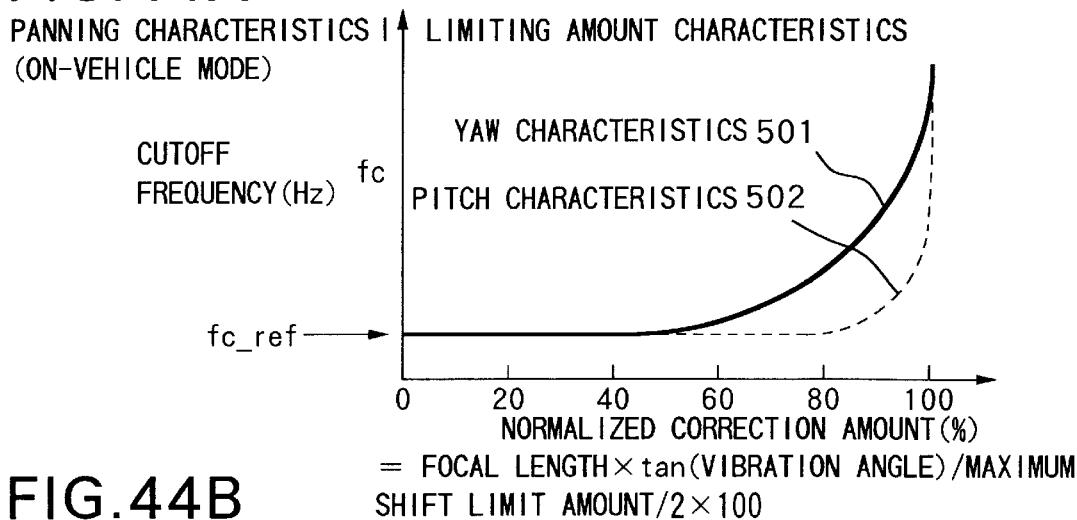
FIGS. 44A to 44C are graphs showing a plurality of panning characteristics in correspondence with image sensing situations.
Figure 44B:
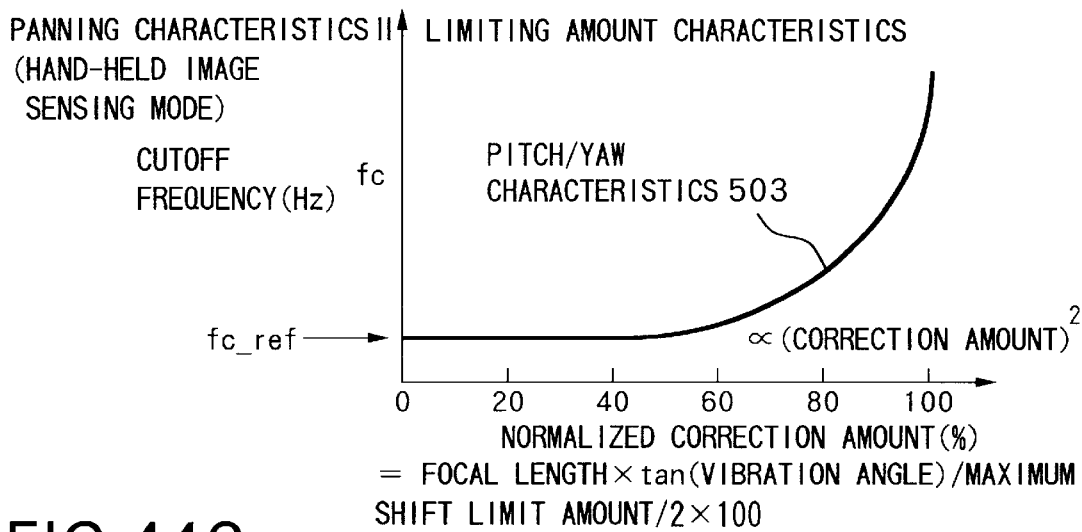
Figure 44C:
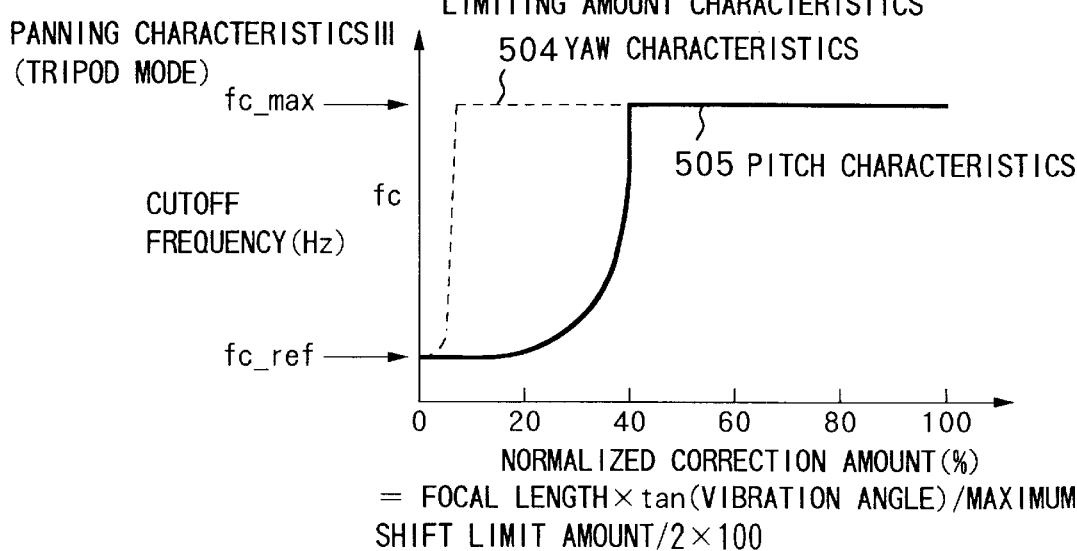

FIGS. 44A to 44C show characteristics of the limiting amount, i.e., cutoff frequency, as a function of the correction amount. FIG. 44A shows the limiting characteristics in the on-vehicle mode as panning characteristics I, FIG. 44B shows the limiting characteristics in the normal hand-held mode as panning characteristics II, and FIG. 44C shows the limiting characteristics in the tripod mode as panning characteristics III.

In FIGS. 44A to 44C, the abscissa plots the normalized correction amount, and indicates the ratio of the correction amount required for correcting current vibration with respect to 100% when correction is done by shifting to ½ the maximum shift limit (i.e., definition of±maximum shift limits).

Note that the maximum shift limit is determined in advance as in the above embodiment. The ordinate plots the band-limiting cutoff frequency as a limiting amount parameter, and the cutoff frequency increases along the ordinate.

In this embodiment, the degree of limiting the correction amount is set not based on a threshold value but by a function. For this reason, even when panning is done by controlling the cutoff frequency, smooth switching can be attained.

Also, in this embodiment, $f_C^{ref}$ represents the cutoff frequency when the normalized correction amount=0%. The cutoff frequency that most suppresses vibration with respect to the detected vibration frequency is set at $f_C^{ref}$. This will be explained in detail below using FIG. 43.

Figures 43A, 43B:
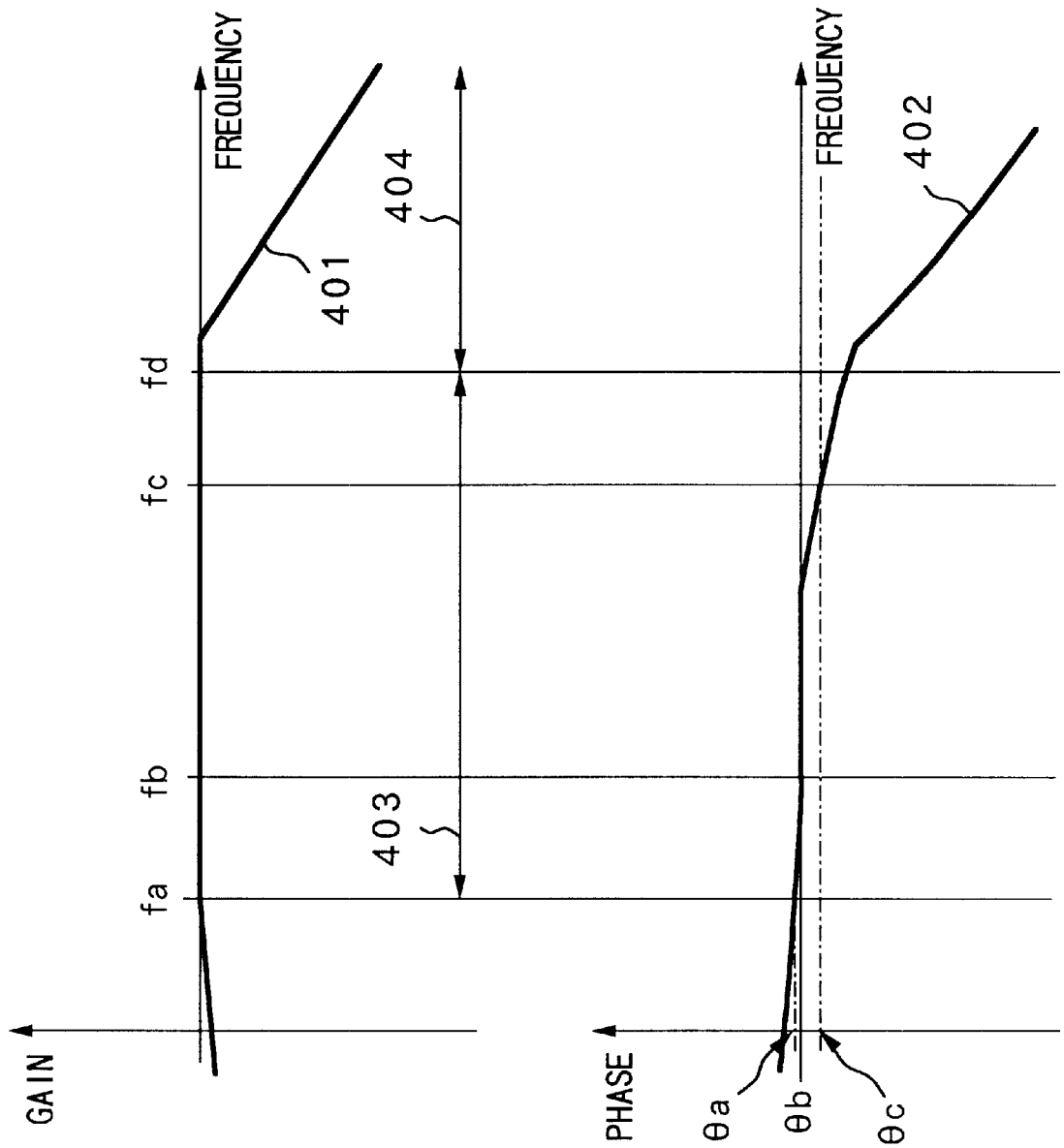
FIGS. 43A and 43B are graphs showing the vibration correction characteristics.

FIGS. 43A and 43B show the frequency response characteristics from the angular velocity sensors 309 and 310 as vibration detection sensors to the output of the vibration correction system. A curve 401 in FIG. 43A indicates the gain characteristics, and a curve 402 in FIG. 43B indicate the phase characteristics. Ideally, the anti-vibration frequency range has a flat gain and is free from any phase delay. However, in practice, the phase delays due to time delay from vibration detection until the output to the correction system, the response characteristics of mechanical members, and the like, as the frequency is higher. If a phase delay is caused by only time delay of a circuit system or processing system, a delay angle θ is given by:

θ(deg)=delay time (sec)*frequency (Hz)*360 (deg)  (8)

In practice, a filter and the like are designed to remove any phase delay around 3 Hz to 5 Hz, so as to obtain the highest anti-vibration effect in the frequency band for normal hand-held image sensing.

Reference numeral 403 denotes a frequency band in which anti-vibration can be attained in this embodiment. For example, frequency $f_a$=1 Hz, $f_b$=4 Hz, $f_c$=20 Hz, and $f_d$=30 Hz (a frequency band 404 that suffers gain drop corresponds to an anti-vibration impossible band). As shown in FIG. 43A, the gain is nearly flat, but the phase delay becomes larger as the frequency becomes higher, as shown in FIG. 43B.

In the characteristics shown in FIGS. 43A and 43B, a phase angle $θ_b$ is free from any phase delay at $f_b$, the phase leads by $θ_a–θ_b$ at $f_a$, and the phase lags behind by $θ_b–θ_c$ at $f_c$.

With this phase shift, the anti-vibration effect lowers. In order to improve suppression capability of anti-vibration for a frequency at which especially large phase delay occurs, the phase is advanced. As a method of advancing phase, in this embodiment, the band-limiting high-pass filters $315c_1$ and $315c_2$ for band limitation are also used, and their cutoff frequencies are changed to advance the phase.

The cutoff frequencies $f_C^{ref}$ of the high-pass filters $315c_1$ and $315c_2$, which compensate for the delay angle with respect to the frequency at which the phase delay is produced are stored in correspondence with the frequencies. During anti-vibration control, the cutoff frequency $f_C^{ref}$ to be phase-compensated is read out in accordance with the detected vibration frequency and is controlled, thus preventing deterioration of suppression capability of anti-vibration.

The cutoff frequency when the normalized correction amount=0% in FIGS. 44A to 44C correspond to the cutoff frequency $f_C^{ref}$ that compensates for a phase delay shown in FIGS. 43A and 43B. If it is determined that vibration acting on the camera is caused by hand-held image sensing, the characteristics shown in FIG. 44B are selected in step S609d, and the cutoff frequency is controlled in correspondence with the normalized correction amount. In case of FIG. 44B, the maximum value of the cutoff frequency set is around 6 Hz, and $f_C^{ref}$ is around 0.1 Hz. This is because ordinary shake frequency components fall within the range from about 3 Hz to 5 Hz, and there is no phase delay in that frequency band.

Band-limiting characteristics 503 are set to change the cutoff frequency as a quadratic function. With the characteristics 503, the cutoff frequency is controlled to increase sharply as the correction amount becomes larger, and to be as low as possible when the correction amount is around zero so as to improve the anti-vibration effect.

If on-vehicle image sensing is determined, the characteristics shown in FIG. 44A are selected in step S609c to control the cutoff frequency as a limiting amount. In case of on-vehicle image sensing, the vibration frequency becomes 20 Hz or higher, and the cutoff frequency that compensates for phase delay is set at $f_C^{ref}$.

In this embodiment, yaw and pitch characteristics 501 and 502 are illustrated to have identical $f_C^{ref}$, but they are merely illustrated overlapping each other for easy comparison of characteristic curves. In practice, since frequency components detected in units of vibration directions independently change from time to time, $f_C^{ref}$ in the yaw direction at a given time is often different from that if vibration mainly agrees with the pitch direction, and the limiting characteristics in the pitch direction are set, as indicated by 505, so as to suppress small vibration components.Note that the cutoff frequency fCref corresponding to the correction amhanged upon maneuvering, i.e., limitation is smaller than that in the yaw direction.

With such characteristics, even in an image sensing situation in which a vehicle bounces at joints of a road such as a bridge, image sensing can be done with a stable frame free from the influence of vibration, and camera work in the yaw direction can be prevented from being influenced by correction in the pitch direction.

If tripod image sensing is determined, the characteristics shown in FIG. 44C are selected in step S6ount=0% is set at 0.1 Hz or less since the vibration frequency is in the neighborhood of zero in the tripod mode. The limiting characteristics in the yaw direction are set, as indicated by 504. In the tripod mode since panning is done mainly in the horf vibration mainly agrees with the pitch direction, and the limiting characteristics in the pitch direction are set, as indicated by 505, so as to suppress small vibration components.

Note that the cutoff frequency $f_C^{ref}$ corresponding to the correction amount=0% is set at 0.1 Hz or less since the vibration frequency is in the neighborhood of zero in the tripod mode.

The limiting characteristics in the yaw direction are set, as indicated by 504. In the tripod mode since panning is done mainly in the horizontal direction, the characteristics are set to immediately obtain a maximum limiting amount upon panning if a still state is not detected.

Since the anti-vibration range of this embodiment has an upper limit near $f_d \approx 30$ Hz, as described above using FIGS. 43A and 43B, $f_C^{max}=50$ Hz is set to have no gain with respect to the frequency band below 30 Hz. In this embodiment, different limiting characteristics in the tripod mode are set in correspondence with the vibration direction. However, panning in the tripod mode is done not only in the horizontal direction but also in the vertical and oblique directions, although such panning is done not so frequently. In such image sensing situation, the correction system operates using the characteristics 505 in both the yaw and pitch directions, and upon detecting vibration (NO is determined in step S707 in FIG. 42), the limiting characteristics in the detected vibration direction are preferably switched to limiting characteristics 504.

In this case, the predetermined value ω in step S708 in FIG. 42 can be set to assure a time longer than the expected camera work, i.e., panning time. However, in such case, since the time required until the tripod mode is selected is also prolonged, different counters are preferably used for counter N for determining the tripod mode in place of a common counter so as to determine shift to the tripod mode and cancel of that mode, and predetermined values for mode shift determination are preferably independently set in these counters, as shown in FIG. 42. By selecting the limiting characteristics shown in FIG. 44C, a camera which allows the user to make smooth camera work while removing the influence of vibration at the location of the tripod can be provided.

Referring back to FIG. 41, the cutoff frequency determined based on different characteristics in units of image sensing situations in step S609 is set in the next band-limiting process to limit the angular velocity signal. For example, when the calculated cutoff frequency is high, the correction effect lowers with respect to vibration having a shake frequency below the cutoff frequency. In step S610, the shift target value command calculated in step S606 is output to the adder 316, thus ending this process (step S611).

As described above, according to the eighth embodiment, the panning characteristics corresponding to different image sensing situations are pre-stored as a plurality of limiting characteristics, and optimal limiting characteristics are selected in accordance with the current image sensing situation, thus realizing smooth panning and obtaining high anti-vibration effect. When the image sensing situation is discriminated based on the detected vibration amplitude and frequency, optimal limiting characteristics can be automatically determined.

By providing a mode that controls vibrations in the pitch and yaw directions using different anti-vibration characteristics, even in an environment under specific vibration condition other than shake, optimal anti-vibration characteristics that can independently correct vibrations in the pitch and yaw directions can be set. For example, even upon on-vehicle image sensing using a camera on a tripod, i.e., even when vibration of the vehicle and the influence of the road are reflected in only the pitch direction, a high-quality image sensing apparatus which can simultaneously satisfy high suppression capability of anti-vibration in the pitch direction and smooth camera work in the yaw direction can be provided. In addition, since optimal characteristics can be automatically set for an image sensing situation in which the anti-vibration effect cannot be obtained in the prior art, an image sensing apparatus which can broaden the image sensing region can be realized.

The eighth embodiment has been explained with reference to an optical anti-vibration system using a shift lens. However, the present invention is not limited to such specific arrangement. For example, correction may be done by controlling the position of the extracted image using a field memory, or electronic correction means that corrects vibration by controlling the extraction position using a large-scale or ultra high-resolution type CCD may be used. In this embodiment, angular velocity sensors are used as vibration detection means. Alternatively, a motion vector detection or acceleration sensor may be used. In case of an acceleration sensor, another integration process need only be added inside or outside the anti-vibration control microcomputer.

In the description of FIG. 40, vibration angular displacement calculation is implemented by software, but may be implemented by hardware.

Also, in the above description, the characteristics to be limited are determined as a function of the correction amount. Alternatively, as a characteristic determination method, the characteristics may be determined by calculating equations or may be pre-stored as a data table that can obtain desired characteristics.

Furthermore, high-pass filters have been exemplified as limiting means. However, the present invention is not limited to such specific means as long as a means can limit operation of the vibration correction means. For example, means for limiting the output from an integral filter by controlling the integral time constant of the integral filter may be used.

Modification of Eighth Embodiment . . . Second Modification

Figure 45:
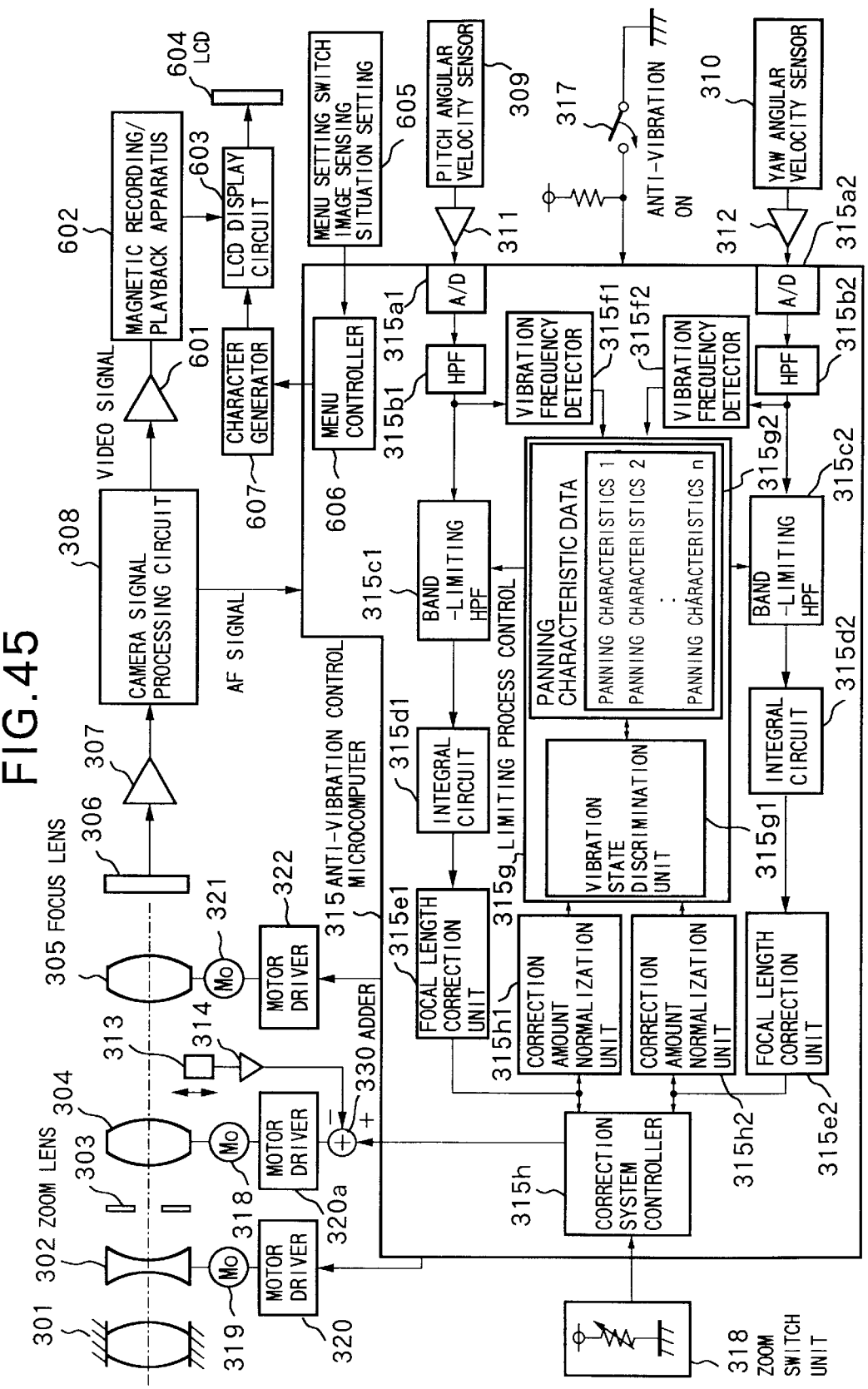
FIG. 45 is a block diagram showing the arrangement of a modification (second modification) of the eighth embodiment.

FIG. 45 shows the arrangement of a modification of the eighth embodiment, i.e., the second modification. In the eighth embodiment mentioned above, the limiting characteristics corresponding to the determined image sensing situation are automatically selected by the camera. However, in some image sensing situations, optimal characteristics can hardly be automatically determined. In the second modification, to obtain natural camera work and high anti-vibration effect in such special image sensing situation, the user can set optimal anti-vibration characteristics corresponding to the image sensing situation using a menu function provided to a television, video camera, home video recorder, or the like.

Note that the same reference numerals in FIG. 45 denote the same blocks as those in FIG. 40, and a detailed description thereof will be omitted. An image formed on the image sensing element 306 via the lens is photoelectrically converted into an electrical signal, and the signal is amplified to optimal level by the amplifier 307. The amplified signal is input to the camera signal processing circuit 308 and is converted into a standard television signal. After that, the standard television signal is amplified to optimal level by an amplifier 601, and the amplified signal is sent to a magnetic recording/playback apparatus 602. At the same time, the amplified signal is sent to an LCD display circuit 603, thus displaying a sensed image on an LCD 604.

Note that the LCD 604 makes display to inform the photographer of an image sensing mode, image sensing state, alert, and the like. The anti-vibration control microcomputer 315 controls a character generator 607 to mix the output signal from the generator 607 in the LCD display circuit 603, thus superposing that display on the sensed image.

Reference numeral 606 denotes a menu function controller in the microcomputer 315, which controls the character generator 607 in response to the operation state of a menu setting switch operated by the photographer to display a menu window on the LCD 604. The menu window displays a plurality of image sensing condition items (e.g., conditions such as white balance, remote-control reception, electronic zoom, and the like), and setting conditions (e.g., ON and OFF for electronic zoom) for the respective items, and the photographer selects the item to be set and sets its condition (selection means).

To attain menu operation, the menu setting switch 605 includes a mode switch for turning ON/OFF a menu function, a selection switch for selecting an item and its condition, and a determination switch for determining the selected contents. When the photographer operates these switches while observing the menu window, the menu controller controls menu window display in correspondence with key operation, thus recognizing the set contents.

For example, assume that the image sensing condition items of the menu function include item "select image sensing situation", and the setting conditions of that item include choice of image sensing locations such as "vehicle/ship/helicopter/footbridge". When the photographer selects and sets one of these conditions in accordance with his or her favor, the anti-vibration control microcomputer 315 selects anti-vibration characteristics suitable for the image sensing situation, and executes anti-vibration control.

Also, the photographer may be allowed to select an effective frequency range from the menu to obtain the highest anti-vibration effect against shake caused by the photographer himself or herself (the effective frequency normally ranges from 1 Hz to 3 Hz, and a frequency range from 3 Hz to 5 Hz is set as the target vibration frequency to be suppressed, but the effective frequency may be shifted toward higher frequency, or a main target vibration frequency to be suppressed may be selected from a plurality of frequencies), and may also be allowed to select vibration amplitude. For example, the gains of the amplifiers 311 and 312 that determine the amplified angular velocity sensor outputs may be optimized by selecting them from a plurality of gain candidates in correspondence with shake of the photographer. In this way, by inputting conditions selected by the photographer from the menu, an anti-vibration function optimal to the photographer can be provided.

Upon completion of menu setups, the vibration state discrimination unit 315$g_1$ of the limiting process controller 315$g$ selects optimal panning characteriotoelectrically converted into an electrical Signal, and the signal is amplified to optimal level by the amplifier 307. The amplified signal is input to the camera signal processing circuit 308 and is converted into a standard television signal. After thescribed above, according to the second modification, since the photographer can select and instruct an image sensing situation, optimal anti-vibration characteristics can be obtained even in an image sensing situation that can hardly be automatically discriminated.

When the effective frequency range is changed or the frequency band is limited in correspondence with the photographer, and the gain of vibration amplitude is optimized in correspondence with different shakes in units of photographers, a shake correction function suitable for each photographer can be realized. In the second modification, the photographer can select anti-vibration characteristics optimal to shake caused by himself or herself. However, the object to be subjected to anti-vibration control is not limited to shake caused by the photographer, and vibration at specific camera location may be removed by the same method.

According to the second modification, panning characteristics corresponding to image sensing situations are pre-stored as a plurality of limiting characteristics, and optimal limiting characteristics are selected in correspondence with the image sensing situation, thus obtaining smooth panning and high anti-vibration effect. Since the image sensing situation can be automatically discriminated on the basis of the detected vibration amplitude and frequency, optimal limiting characteristics can be automatically determined. When the photographer selects and instructs an image sensing situation, optimal anti-vibration characteristics can be set even in an image sensing situation that can hardly be automatically discriminated. By providing a mode that controls vibrations in the pitch and yaw directions using different anti-vibration characteristics, even in an environment under specific vibration condition other than shake, optimal anti-vibration characteristics that can independently correct vibrations in the pitch and yaw directions can be set. Hence, an image sensing apparatus that can implement natural camera work and high anti-vibration effect can be provided.

Advantages of Eighth Embodiment and the Like

To restate, according to the eighth embodiment and second modification, panning characteristics corresponding to different image sensing situations are pre-stored as a plurality of limiting characteristics, and optimal limiting characteristics are selected in correspondence with the current image sensing situation, thus obtaining smooth panning and high anti-vibration effect.

By providing a mode that controls vibrations in the pitch and yaw directions using different anti-vibration characteristics, even in an environment under specific vibration condition other than shake, optimal anti-vibration characteristics that can independently correct vibrations in the pitch and yaw directions can be set. As a result, optimal anti-vibration characteristics can be set even in a special image sensing situation. For example, even upon on-vehicle image sensing using a camera on a tripod, i.e., even when vibration of the vehicle and the influence of the road are reflected in only the pitch direction, a high-quality image sensing apparatus which can simultaneously satisfy high suppression capability of anti-vibration in the pitch direction and smooth camera work in the yaw direction can be provided. In addition, since optimal characteristics can be automatically set for an image sensing situation in which the anti-vibration effect cannot be obtained in the prior art, an image sensing apparatus which can broaden the image sensing region can be realized.

Since the photographer selects and instructs an image sensing situation, optimal anti-vibration characteristics can be set even in an image sensing situation that can hardly be automatically discriminated. Hence, optimal anti-vibration characteristics can be set even in a special image sensing situation.

Especially, by changing the effective frequency range or limiting the frequency band in correspondence with the photographer, and by optimizing the gain of vibration amplitude in correspondence with different shake amounts in units of photographers, a shake correction function suitable for each photographer can be implemented.

The present invention can be further modified into various modifications other than the embodiments as set forth above. For example, the embodiments alters the limiting characteristic to the image vibration correction in accordance with image sensing condition. It may be proposed to modify the embodiments in which the characteristics are automatically or manually altered in accordance with the condition. Further, the alteration of the limiting characteristics may be modified to be based on image-sensing condition other than those set forth in the above embodiments, on conditions other than image sensing conditions. Furthermore, the alteration may be modified to be made voluntarily.

Alternatively, the maximum range in which the correction can be made should not be limited to the embodiments, thus, may be altered as the need arises. The range may be set to a range which is not an actual maximum correction range.

Alternatively, the present invention can be applied into modifications where the hardware arrangement of the above embodiments be substituted with software arrangements, or vice versa.

Alternatively, the present invention can be applied into modifications which are any combinations of the above described embodiments, or any combinations of any elements of the embodiments that are required.

Alternatively, the present invention can be extended into one apparatus, an apparatus combined with another device, or any elements comprising a device, that comprise of whole or partial elements of the appended claims or embodiments.

The present invention can be applied to a video camcorder, video-still image camera, camera using silver-salt film, single-lens reflex camera, lens-shutter camera, observation camera, various types of cameras, any types of image sensing devices or optical devices other than cameras, and other types of devices. It can be further applied to a device which is applied to the cameras, optical devices and the other types of devices, or to any component comprising the cameras, the optical devices and the other types of devices.

As many apparently widely different embodiments of the present invention can be made without departing from the spirit and scope thereof, it is to be understood that the invention is not limited to the specific embodiments thereof except as defined in the appended claims.

What is claimed is:

1. An apparatus comprising:
    a vibration correction device for correcting a vibration of an image; and
    a limiting device for calculating a ratio of an amount of vibration correction to be effected by said vibration correction device in accordance with an image shake condition, to a maximum value of vibration correction by said vibration correction device, and limiting an operation of said vibration correction device in correspondence with a calculation result.

2. The apparatus according to claim 1, wherein said vibration correction device corrects vibration of the image by signal processing.

3. The apparatus according to claim 1, wherein said vibration correction device optically corrects vibration of the image.

4. The apparatus according to claim 1, further comprising vibration detection device for detecting vibration, and
    wherein said vibration correction device operates in accordance with an output from said vibration detection device, and
    said limiting device limits the operation of said vibration correction device in accordance with the output from said vibration detection device.

5. The apparatus according to claim 1, wherein said limiting device determines a value of a limiting amount in proportion to the n-th power (n is an integer not less than 1) of a value of the correction amount determined by said vibration correction device.

6. The apparatus according to claim 1, wherein said apparatus comprises an image sensing apparatus.

7. The apparatus according to claim 1, wherein said apparatus comprises a camera.

8. The apparatus according to claim 1, wherein said apparatus comprises an optical apparatus.

9. The apparatus according to claim 1, wherein said limiting device is a variable value device.

10. The apparatus according to claim 1, wherein said limiting device is adjusted to decrease anti-vibration correction during panning and adjusted to increase anti-vibration during normal image sensing.

11. The apparatus according to claim 1, wherein said limiting device changes in value to correspond with the changes in a focal length and vibration correction amounts.

12. A vibration correction method comprising the steps of:
    calculating a ratio of an amount of vibration correction to be effected by a vibration correction device in accordance with an image shake condition, to a maximum value of vibration correction by said vibration correction device; and
    limiting an operation of said vibration correction device in correspondence with a calculation result in said calculating step.

13. The method according to claim 12, wherein said vibration correction device corrects vibration of the image by signal processing.

14. The method according to claim 12, wherein said vibration correction device optically corrects vibration of the image.

15. The method according to claim 12, wherein said vibration correction device operates in accordance with an output from a vibration detecting device, and in said limiting step, the operation of said vibration correction device is limited in accordance with the output from said vibration detection device.

16. The method according to claim 12, wherein in said limiting step, a value of a limiting amount is determined in proportion to the n-th power (n is an integer not less than 1) of a value of the correction amount determined by said vibration correction device.

* * * * *

UNITED STATES PATENT AND TRADEMARK OFFICE
CERTIFICATE OF CORRECTION

PATENT NO.    : 6,630,950 B1
DATED         : October 7, 2003
INVENTOR(S)   : Hiroto Ohkawara et al.

It is certified that error appears in the above-identified patent and that said Letters Patent is hereby corrected as shown below:

<u>Column 5,</u>
Line 4, please delete "Y" and insert therefore -- $\gamma$ --

Signed and Sealed this

Twenty-third Day of March, 2004

JON W. DUDAS
*Acting Director of the United States Patent and Trademark Office*